United States Patent [19]
Hendrickson et al.

[11] 3,845,378
[45] Oct. 29, 1974

[54] ANALOG STEPPING MOTOR CONTROL SYSTEM

[75] Inventors: Kenneth E. Hendrickson; Steven D. Keidl; Warren A. Lopour, all of Rochester, Minn.

[73] Assignee: International Business Machines Corporation, Armonk, N.Y.

[22] Filed: Dec. 27, 1972

[21] Appl. No.: 319,088

[52] U.S. Cl. ............. 318/685, 318/696, 318/601, 318/603
[51] Int. Cl. ............................................. G05b 1/00
[58] Field of Search ........... 318/696, 885, 439, 601, 318/603, 561

[56] References Cited
UNITED STATES PATENTS

| | | | |
|---|---|---|---|
| 3,241,015 | 3/1966 | Allen | 318/696 |
| 3,328,658 | 6/1967 | Thompson | 318/685 |
| 3,345,547 | 10/1967 | Dunne | 318/696 |
| 3,378,741 | 4/1968 | Sutton | 318/594 |
| 3,414,785 | 12/1968 | Ovahood et al. | 318/594 |
| 3,423,658 | 7/1969 | Barrus | 318/685 |
| 3,458,786 | 7/1969 | Thompson | 318/594 |
| 3,466,520 | 9/1969 | Aylikci | 318/696 |
| 3,505,579 | 4/1970 | Leenhouts et al. | 318/696 |
| 3,514,680 | 5/1970 | Williams | 318/696 |
| 3,670,228 | 6/1972 | Crosby | 318/594 |

*Primary Examiner*—G. R. Simmons
*Attorney, Agent, or Firm*—Keith T. Bleuer

[57] ABSTRACT

A control system for a stepping motor operating on the bang-bang principle in which opposing torque is exerted on the rotor of the motor as the rotor oscillates across its desired or home position. After the rotor has first passed its desired or home position, positioning of the rotor in a fine home mode is initially under the control of a digital encoder which, as the rotor passes from its point of maximum oscillation back toward its home position, causes the application of no torque, reverse torque, or forward torque, until the rotor again passes through its home position. This action may be under the control of simple hardware or may be under the control of a microcontrol program unit. At this point, analog fine position control circuitry takes over and so controls the current through the drivers of the motor that the rotor is accurately positioned in its home position.

6 Claims, 29 Drawing Figures

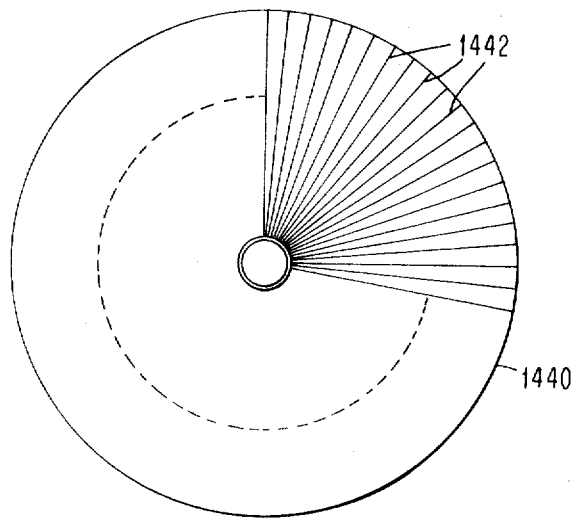
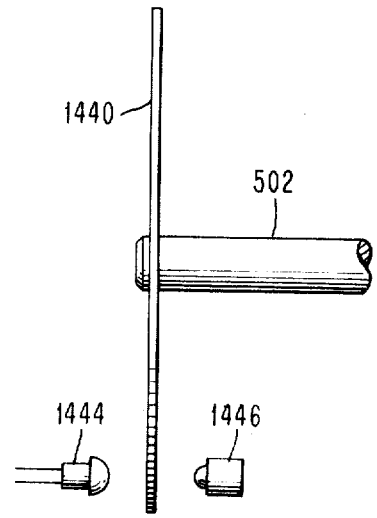
FIG. 4                  FIG. 5
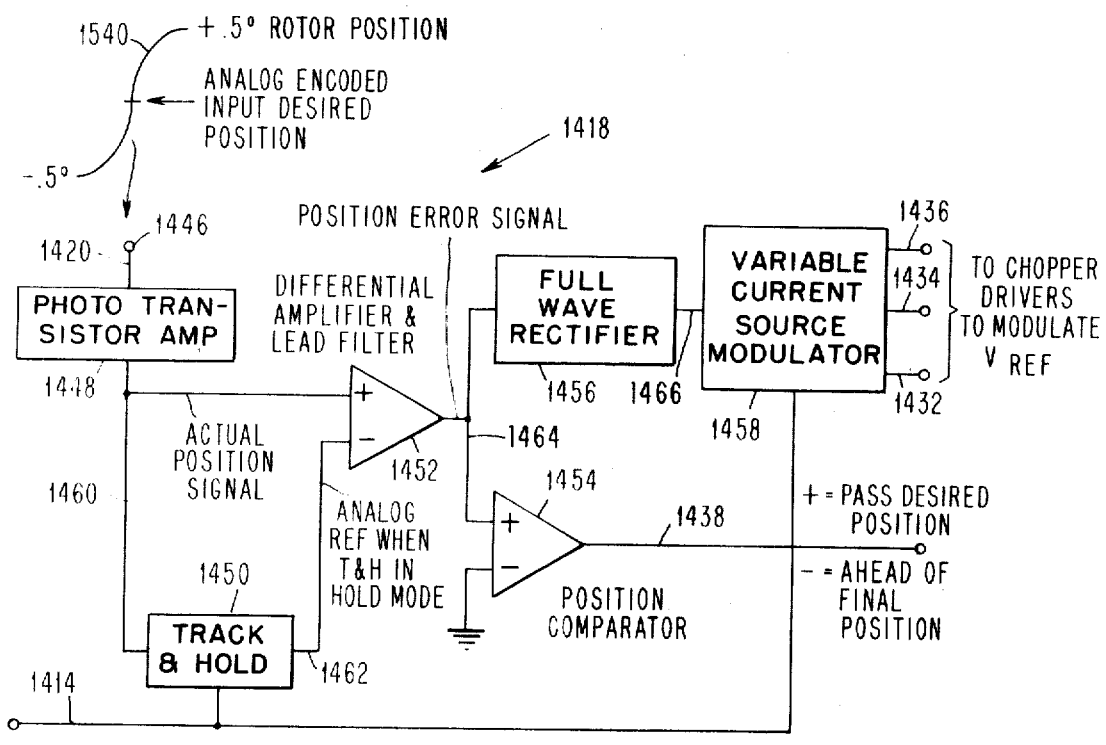
FIG. 6

↕ TWO DRIVERS ENERGIZED AT ONE TIME.

3,845,378

ANALOG STEPPING MOTOR CONTROL SYSTEM

CROSS REFERENCES TO RELATED APPLICATION

The invention disclosed herein is related to that disclosed in U.S. Pat. application Ser. No. 319,065 filed Dec. 27, 1972 for Digital Stepping Motor Control System.

BACKGROUND OF THE INVENTION

The invention relates to stepping motors and more particularly to a combined digital and analog control system for a stepping motor.

It has previously been suggested in the above mentioned copending application Ser. No. 319,065 filed Dec. 27, 1972 for Digital Stepping Motor Control System that a stepping motor be controlled by means of a digital encoder rotatable with the rotor of the motor for positioning the rotor in its desired or home position first in a slew mode and then in a fine home mode both under the control of the digital encoder. The encoder operates in conjunction with circuitry or a microcontrol program unit for (1) applying reverse torque on the rotor from the time it first passes through its home position until it again reaches its home position, under the condition in which the initial oscillation is less than that required for producing an output pulse of the encoder; (2) under the condition in which the rotor initially oscillates farther so that one encoder pulse but not two are produced, for applying reverse torque until the rotor moves back toward its home position to a point corresponding to a first encoder pulse and then applying no torque on the rotor until it reaches its home position in the reverse direction, with the application of the reverse torque being limited to a certain time period such as 120 microseconds; (3) under the condition in which the rotor initially moves still farther from its home position after first passing through its home position to the extent that two but not three encoder pulses are produced, reverse torque is applied under the control of the encoder until the rotor returns to a position spaced only one encoder pulse from home position and forward torque as well as reverse torque are applied at a point spaced two encoder pulses from home position of the rotor, with forward torque continuing until the rotor passes through its home position. Similar applications of torque under the control of the encoder are made if the rotor moves still farther from its home position in its initial oscillation after passing through its home position.

SUMMARY OF THE INVENTION

It is an object of the present invention to control the rotor of a stepping motor similarly as in said copending application during a slew mode and during an initial period of a fine home mode and then to control the exact positioning of the rotor by analog control after it has again passed through its home position on return movement for finally positioning the rotor, so that the rotor can be even more accurately positioned than possible under pure digital control. More particularly, in a preferred form of the invention, it is contemplated that on control from a microprogram unit, for example, a track and hold circuit retains the signal level present on an analog encoder input, which like the digital encoder, rotates along with the rotor. Once the hold command is given, a special comparator circuit begins to issue commands to the microprogram unit and the drivers for the motor. The desired torque direction is constantly supplied to the microprogram unit, and the microprogram unit carries the responsibility of energizing the proper driver of the motor to give the desired torque which is possible since the microprogram unit always contains the knowledge of the exact position of the rotor by counting the digital encoder output pulses. The maximum current available from each of the drivers is also controlled by the analog circuit and if the track and hold circuit is not in a hold state, maximum current is available from each of the drivers. Once the desired position has been reached, however, the current available is decreased under the control of the analog circuit and approaches zero, the latter occurring when the analog encoder signal matches the signal output of the track and hold circuit. The actual control of the desired torque direction and current limit are functions of rotor velocity as well as rotor position (for a given error in rotor position, the correction applied will be greater at higher velocities).

BRIEF DESCRIPTION OF THE DRAWINGS

FIGS. 4 and 5 are respectively side elevational and front elevational views of an analog encoder forming a part of the circuit of FIGS. 3a to 3f;

FIG. 6 is a diagrammatic illustration of an analog portion of the circuitry illustrated in FIGS. 3a to 3f;

FIG. 21 is a flowchart illustrating a clockwise driver control routine; and

DESCRIPTION OF PREFERRED EMBODIMENTS

Figure 1:
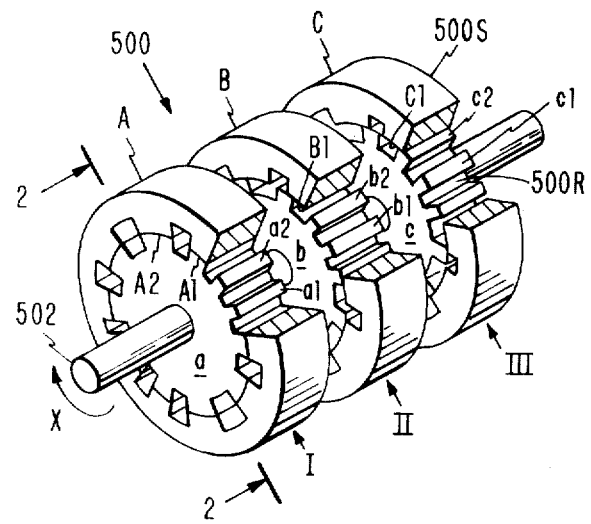
FIG. 1 is an exploded perspective view of a stepping motor with which the controls of the invention may be used.
Figure 2:
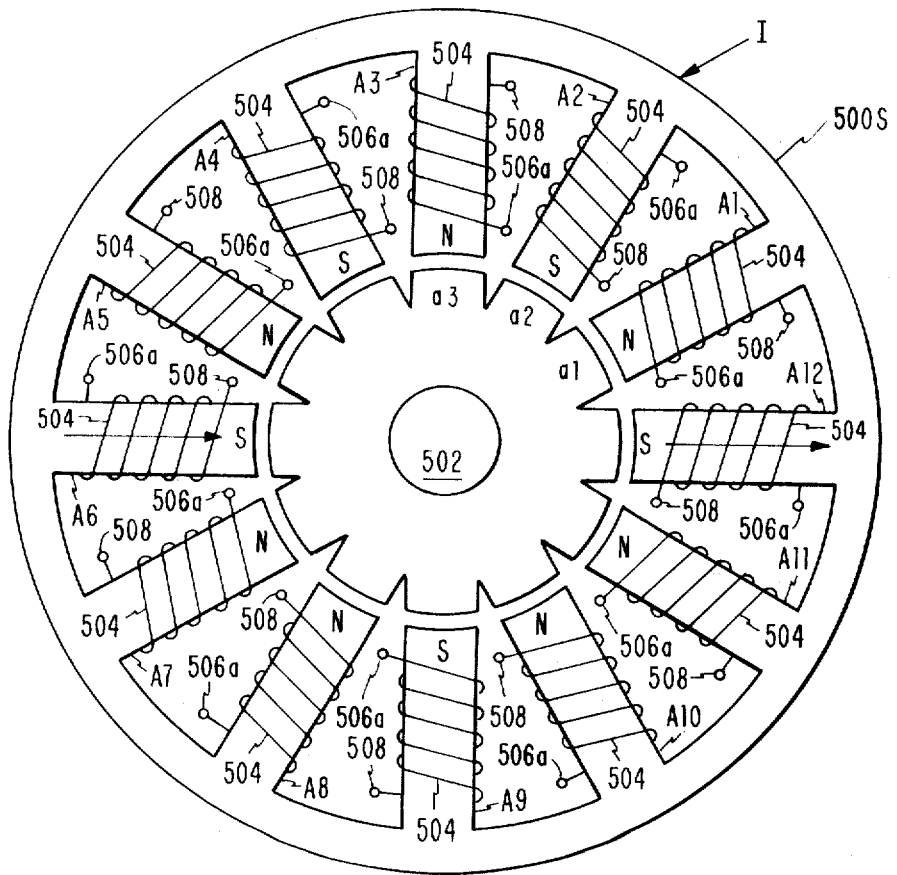
FIG. 2 is a sectional view on an enlarged scale taken on line 2—2 of FIG. 1.

Referring now to the drawings and in particular to FIGS. 1 and 2, a multiple stack variable reluctance stepping motor 500 is illustrated having a stator 500S and a rotor 500R. The stator is composed of parts A, B and C; and the rotor is composed of an equal number of parts $a$, $b$ and $c$. The stator parts A, B and C each have 12 inwardly extending poles or teeth A1, A2, A3, B1, C1, etc.; and the rotor parts $a$, $b$ and $c$ each have the same number of outwardly extending poles or teeth $a1$, $a2$, $b1$, $c1$, etc., which align with the stator poles of the same phase, the rotor poles $a1$ to $a12$ aligning with the stator poles A1 to A12 of Phase I, for example. The stator parts A, B and C are magnetically and electrically independent; and the same is true of the rotor parts $a$, $b$ and $c$ except that the rotor parts are fixed on a common shaft 502. The rotor teeth $a1$ to $a12$ are in alignment with the teeth $b1$ to $b12$ and teeth $c1$ to $c12$ except that the rotor teeth of adjacent Phases I, II, and III are offset by one third of a tooth pitch. Phase I is formed by parts A and $a$; Phase II is formed by parts B and $b$; and Phase III is formed by parts C and $c$. The tooth $b1$ is, for example, advanced one third of a tooth pitch with respect to the rotor tooth $c1$, and the rotor tooth $a1$ is advanced one third of a tooth pitch with respect to the rotor tooth $b1$. As the motor 500 is illustrated, with the rotor teeth $a1$ to $a12$ in alignment with the stator teeth A1 to A12, Phase I of the motor 500 is illustrated, with the rotor teeth $a1$ to $a12$ in alignment with the stator teeth A1 to A12, Phase I of the motor 500 is energized to cause this alignment, When Phase I is de-energized and Phase II is energized, the rotor parts $a$, $b$ and $c$ and shaft 102 turn clockwise in the direction of arrow X until the rotor teeth $b1$ to $b12$ are aligned with the stator teeth B1 to B12. If stator Phases, I, II and III are energized in the I, II, III, I, II sequence, the rotor parts $a$, $b$ and $c$ and shaft 502 step clockwise. In the 12 tooth design shown for motor 500, each step represents a 10 degree rotation of the shaft 502 or 36 steps for each full revolution.

Figure 3A:
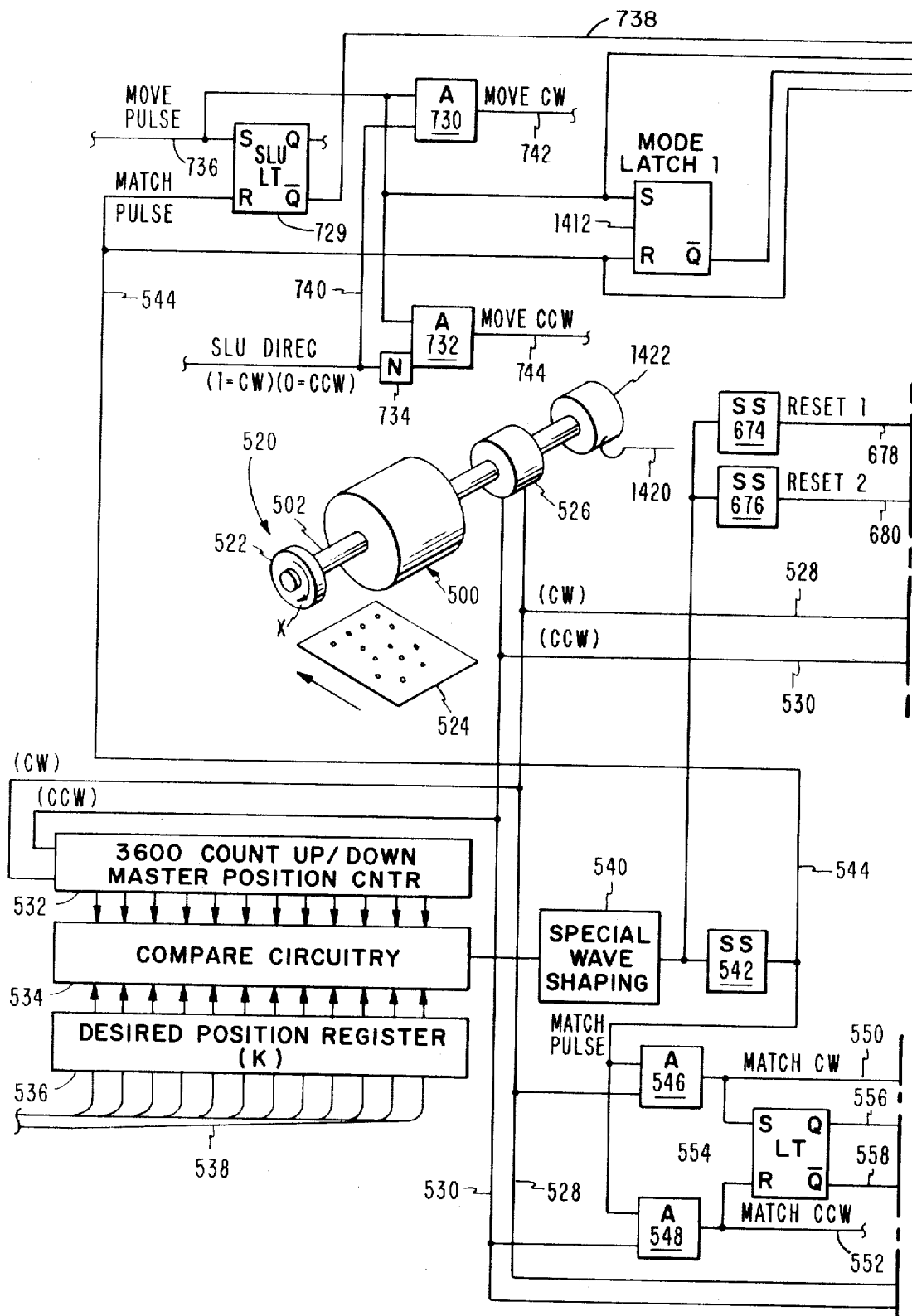
FIG. 3 is a table indicating the manner in which FIGS. 3a to 3f may be placed together in order to form a control circuit for controlling the stepping motor.
Figure 3B:
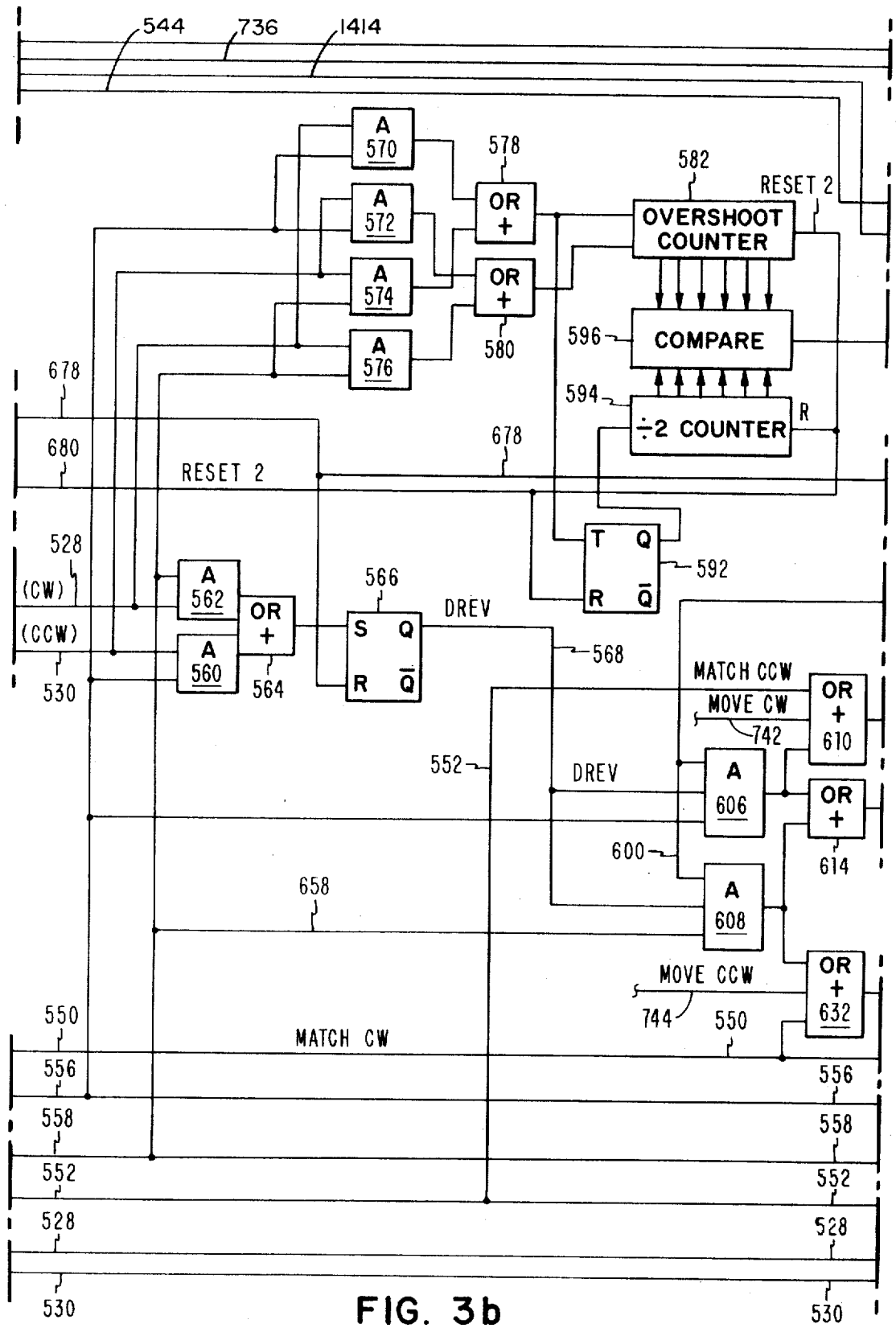
Figure 3C:
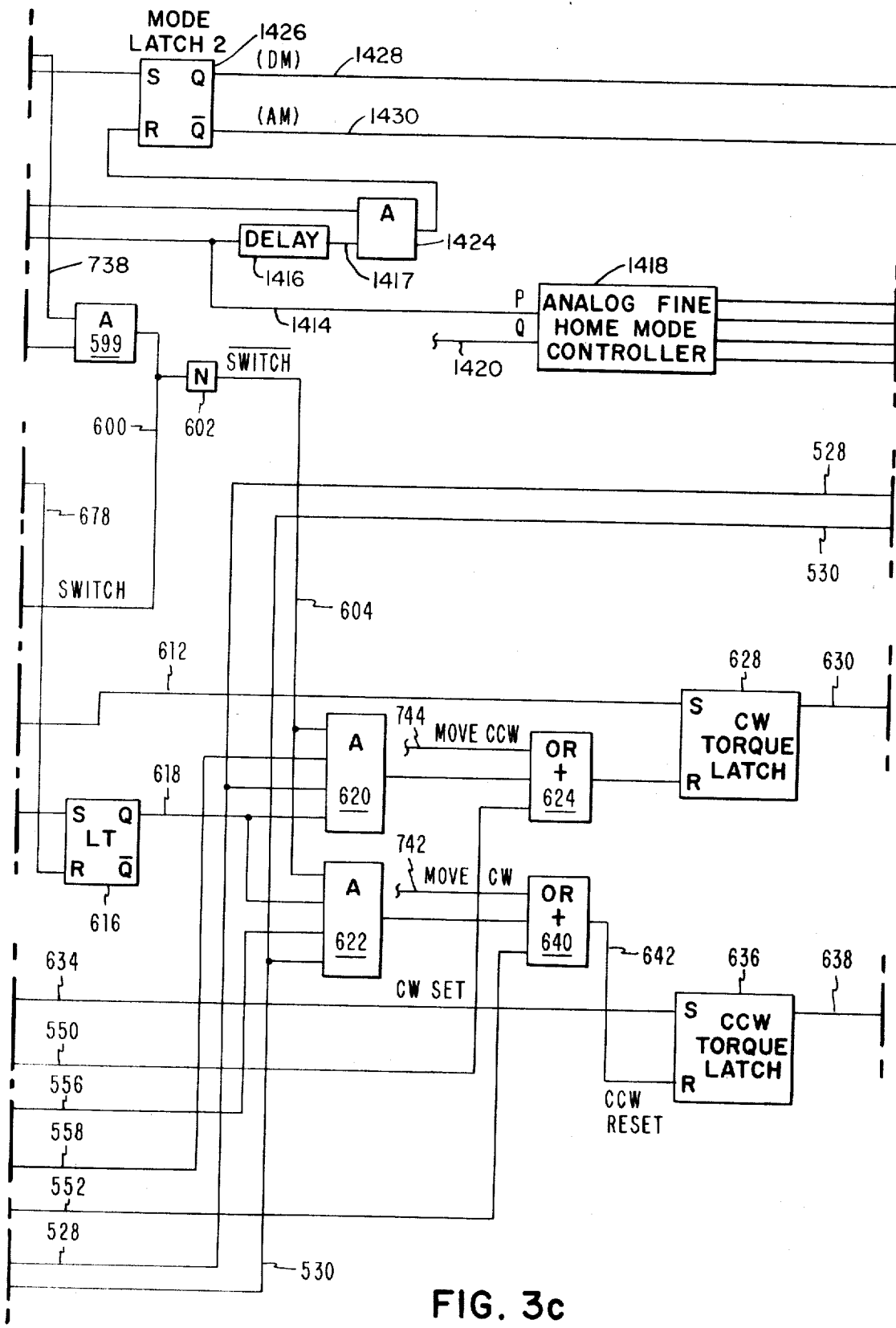
Figure 3D:
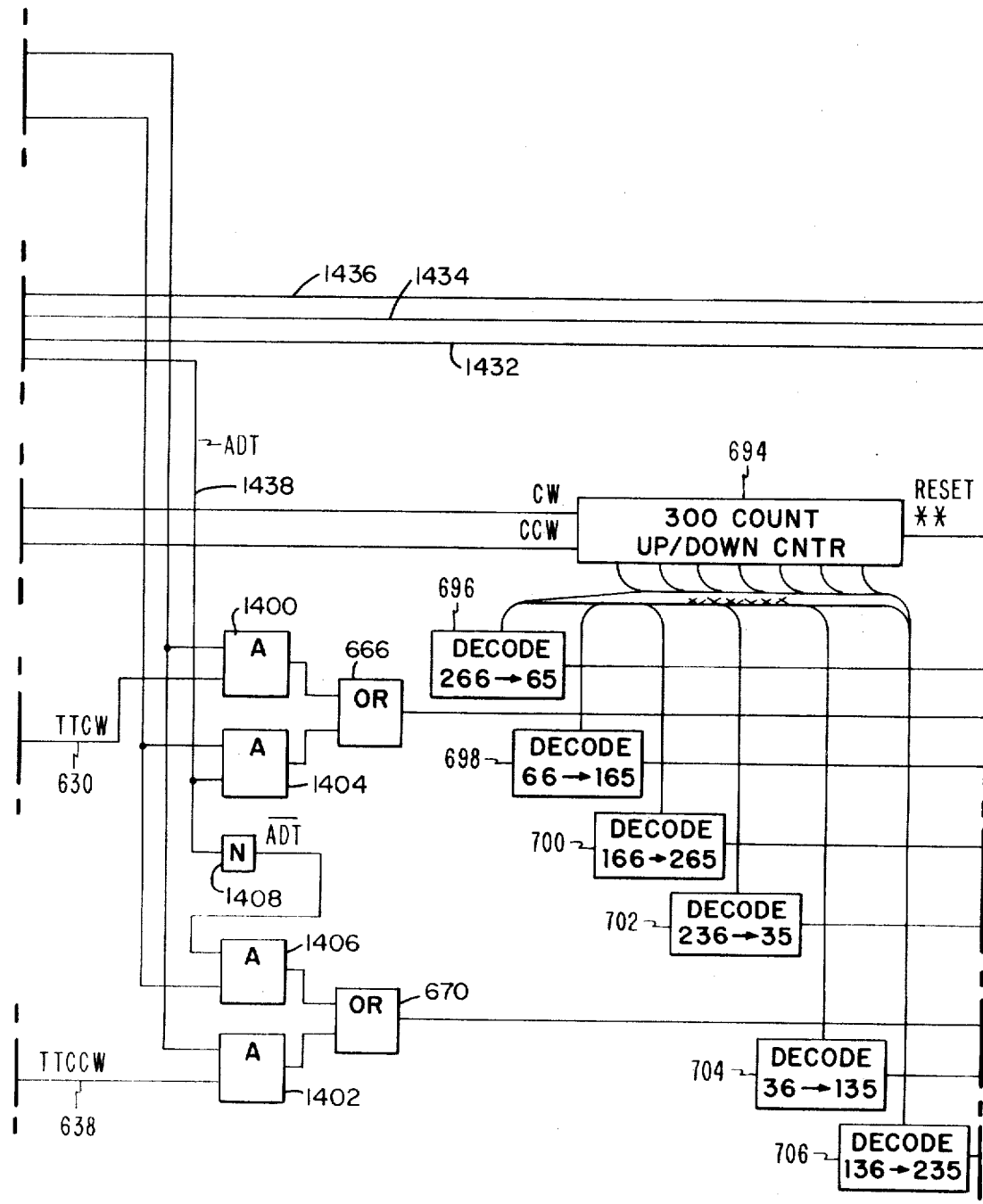
Figure 3E:
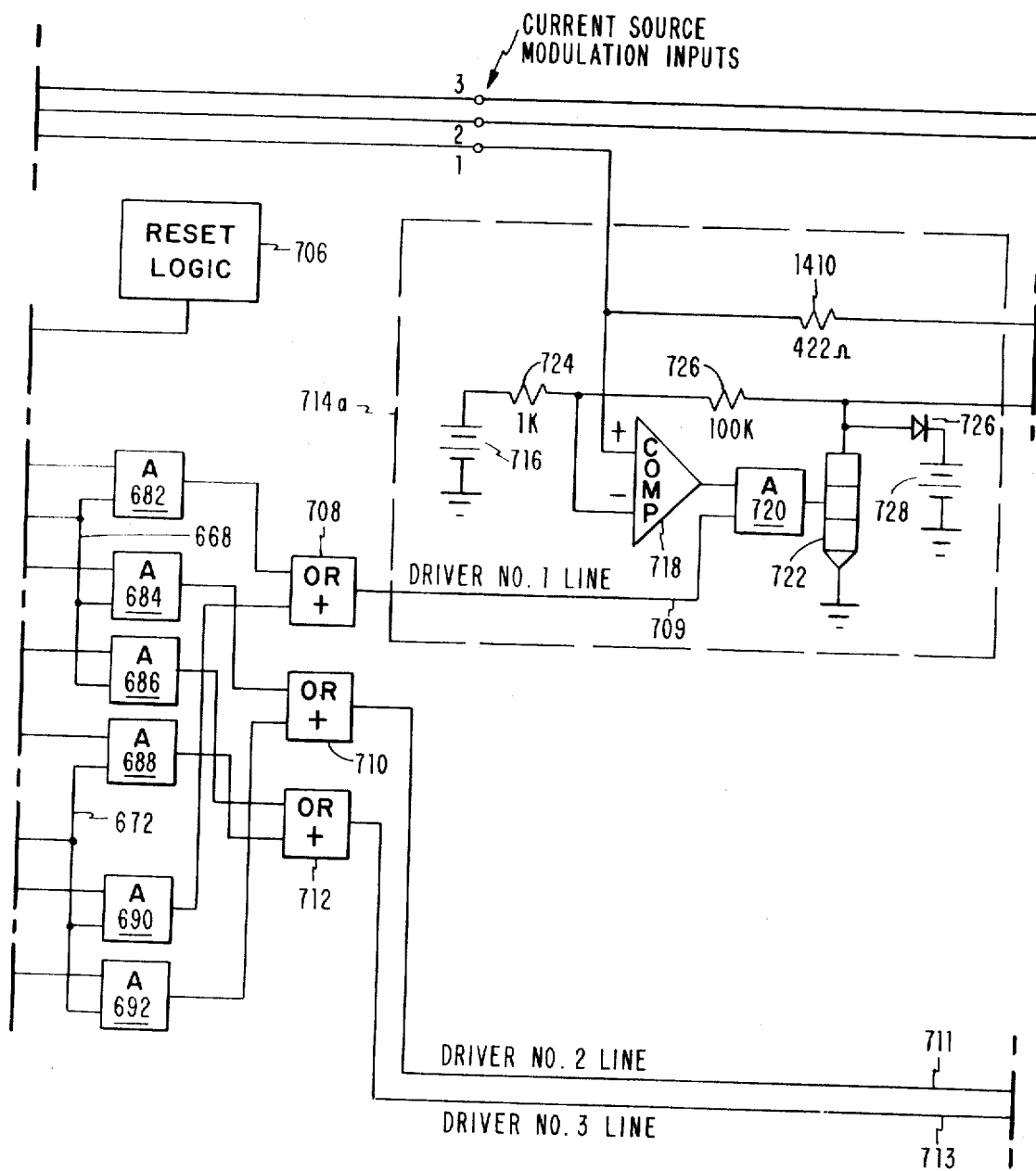
Figure 3:
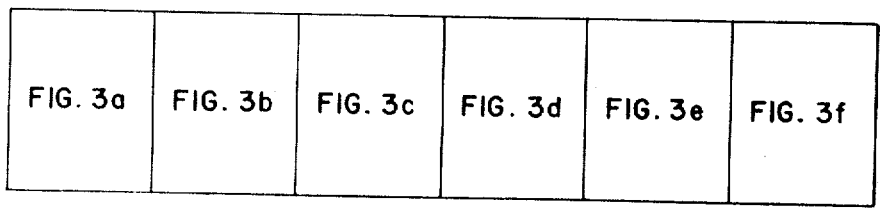
Figure 3F:
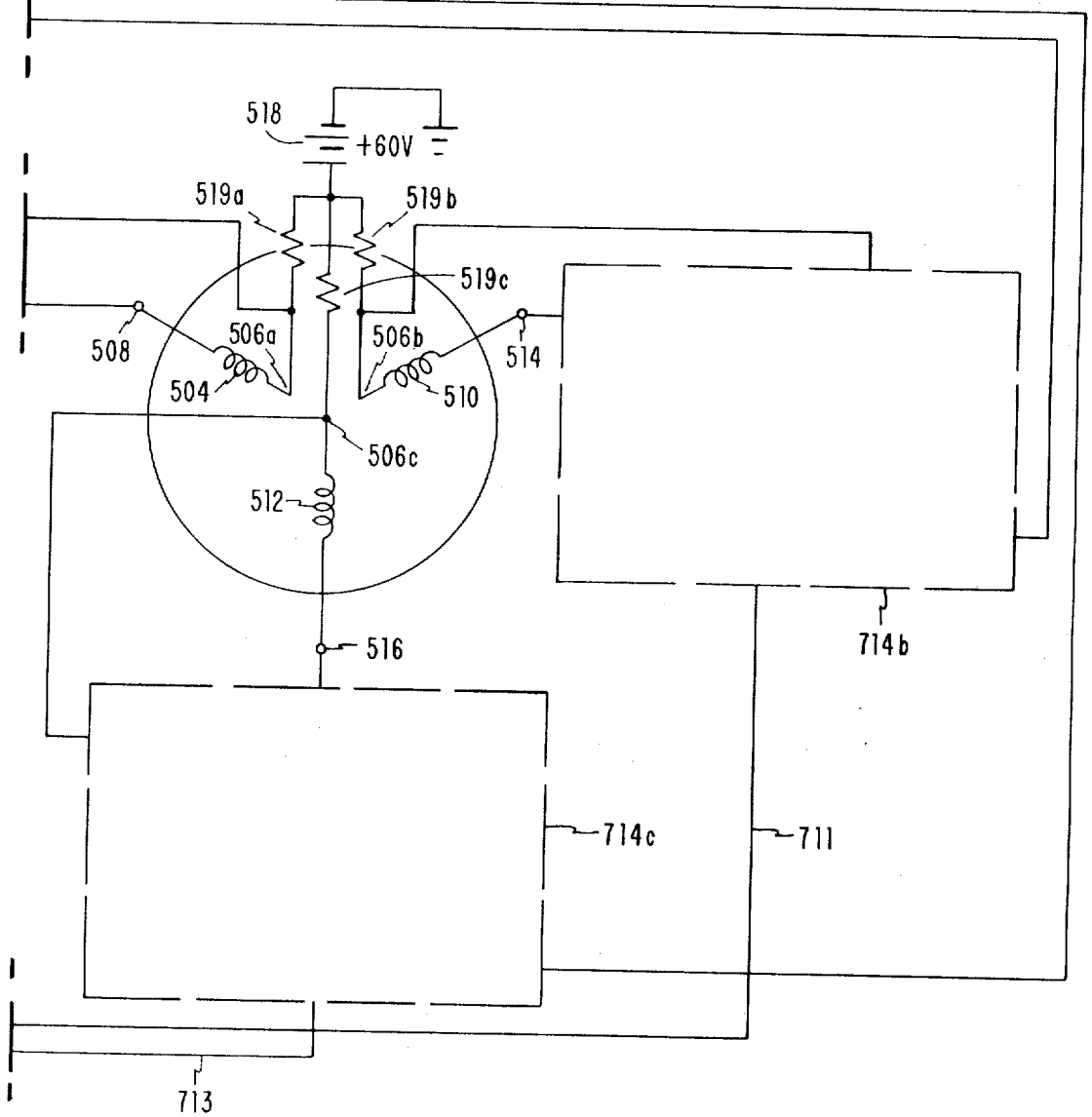

The stator poles A1 to A12 each have a winding 504 on them, and these windings are connected in parallel between terminals 506a and 508. It will be noted that half of the windings 504 have their inner ends connected to the terminal 508 while the remaining ones of the windings 504 have their inner ends connected to the terminal 506a. Thus, when a direct current voltage is connected between the terminals 508 and 506a, half of the stator poles A1 to A12 have their north ends at the center while the remaining ones of these stator poles have their south ends at the center. Phases II and III of motor 500 respectively have stator coils 510 and 512 (see FIG. 3f), and these have the same connections as the stator coils 504. The coils 510 are connected between terminals 506b and 514, and the coils 512 are connected between terminals 506c 516. A source of direct current voltage 518 is connected between ground and terminals 506a, 506b and 506c through resistors 519a, 519b, and 519c.

The motor 500 is connected by means of its shaft 502 with any desired mechanism 520 (see FIG. 3a) which should be given a certain rotation for less than 360°. Such a mechanism 520 may comprise an incrementer wheel 522 for propelling a punched document card 524 forwardly for certain distances. The motor 500 and wheel 522 may, for example, propel the card 524 forwardly for allowing the card 524 to be punched in adjacent columns between increments, utilizing any conventional punching machine.

An emitter or encoder 526 is driven by the motor shaft 502. The emitter provides clockwise pulses on line 528 and counterclockwise pulses on line 530 as the shaft 502 rotates and may, for example, provide such pulses for every tenth degree rotation of shaft 502. The emitter 526 may be of any suitable construction and may for example be an Itek, Digisec, R1-15C series encoder presently for sale by the Wayne-George Division, Christina Street, Newton, Mass.

Referring to FIGS. 3a to 3f, the circuitry for controlling the motor 500 may be seen to comprise a 3,600 count up/down master position counter 523, which is driven by the CW and CCW pulses on lines 528 and 530 connected to counter 532. The counter 532 may be a binary counter, and the various latches or positions in the counter are connected to compare circuitry 534. A desired position register 536, which may be a counter similar to the counter 532, has its various positions or latches connected with the compare circuitry 534 in the same manner as are the outputs of counter 532, and the register 536 may be loaded with information by means of a bus 538.

A special wave shaping network 540, the operation and results of which will be subsequently described, is connected to the output remains the compare circuitry 534. A single shot 542 is connected to the output of the shaping network 540 and provides a "match" pulse on its output line 544. The line 544 is applied as inputs to AND circuits 546 and 548, and AND circuits 546 and 548 respectively also have the CW and CCW pulses applied to them by means of lines 528 and 530. The AND circuits 546 and 548 respectively have output lines 550 and 552 which respectively carry the signals "match CW" and "match CCW."

The lines 550 and 552 are respectively applied to the set and reset sides of a latch 554. The latch 554 has the output lines 556 and 558, with a signal being present on the line 556 when the latch 554 is in its set condition. Lines 556 and 558 respectively carry "CWMT" and "CCWMT" signals.

The lines 556 and 558 are respectively applied onto AND circuits 560 and 562 which also have the lines 528 and 530 carrying the CW and CCW signals as inputs. The AND circuits 560 and 562 have their outputs connected to an OR circuit 564, and the OR circuit 564 has its output connected to the set side of a latch 566. The latch 566 provides a DREV (direction reversed) signal on an output line 568 when the latch 566 is set.

The line 556 carrying the CWMT signal is also connected to a pair of AND circuits 570 and 572, and the line 558 carrying the CCWMT signal is connected to AND circuits 574 and 576. The AND circuits 570 and 576 also have the line 528 carrying the CW signal as inputs, and the circuits 572 and 574 also have the line 530 carrying the CCW signal as inputs.

The outputs of the AND circuits 570 and 574 are connected with an OR circuit 578, and the outputs of the AND circuits 572 and 576 are connected with an OR circuit 580. An overshoot counter 582 has its "up" terminal connected to the output of the OR circuit 578 and has its "down" terminal connected to the output of the OR circuit 580. The counter 582 is, like the counter 532 and register 536, composed of a series of positions or latches.

A trigger 592 has its triggering input connected to the output of the OR circuit 578, and the output of the trigger 592 is connected to the "up" input terminal of a divide by two counter 594. The counter 594, like the counters 582, 532 and 536, is composed of a series of positions or latches; and the individual outputs of these positions are connected to a compare circuit 596. The outputs of the individual positions of the counter 582 are likewise individually connected to the compare circuit 596. The output of the compare circuit 596 is connected through an AND circuit 599 to a line 600 which carries a "SWITCH" signal. Line 600 is connected to the input of an inverter 602 to provide a $\overline{\text{SWITCH}}$ signal on a line 604 constituting the output of the inverter 602.

The line 600 carrying the SWITCH signal is applied onto AND circuits 606 and 608. The AND circuit 606 also has the lines 568 and 556 carrying the DREV and CWMT signals as inputs, and the AND circuit 608 has the line 568 and the line 558 carrying the CCWMT signal applied to it as inputs. The AND circuit 606 has its output applied to an OR circuit 610, and the OR circuit 610 also has the line 552 carrying the signal "match CCW" applied to it as an input. The line 612 is connected to the output of the OR circuit 610 and carries a signal CWSET which will be hereinafter described in greater detail. The outputs of the AND circuits 606 and 608 are applied onto an OR circuit 614, and the output of the OR circuit 614 is connected to the set terminal of a latch 616. A lead 618 is connected to the positive output of the latch 616, and the lead 618 constitutes inputs to AND circuits 620 and 622. The AND circuit 620 also has the heads 558, 604 and 528 as inputs, these leads respectively carrying the CCWMT, $\overline{\text{SWITCH}}$, and CW signals. The output of the AND circuit 620 is connected to an OR circuit 524, and the lead 550 carrying the MATCH CW signal constitutes a second input to the circuit 624. A line 626 is connected to the output of the OR circuit 624 and carries the signal CW RESET which will hereinafter be described in greater detail. The lines 612 and 626 are respectively connected to the set and reset sides of a CW TORQUE LATCH 628. The lines 612 and 626, as previously mentioned, respectively carry the signals CW SET and CW RESET. A line 630 is connected to the output of the latch 628 and carries the signal TTCW which will hereinafter be described in greater detail.

An OR circuit 632 is connected to the output of the AND circuit 608 and in addition has the lead 550 carrying the signal MATCH CW as an input. A line 634 is connected to the output of the OR circuit 632 and carries the signal CCW SET which will be hereinafter described in greater detail. The line 634 is connected to the set side of a CCW torque latch 636, and a line 638 carrying the signal TTCCW, which will be hereinafter described in greater detail, is connected to the output of the latch 636. An OR circuit 640 is connected to the output of AND circuit 622 and also has the line 552 carrying the signal MATCH CCW as an input. A line 642 is connected to the output of the OR circuit 640 and also with the reset side of the latch 636.

The leads 630 and 638 carrying the TTCW and TTCCW signals respectively are connected with the AND circuits 1400 and 1402. Two other AND circuits 1404 and 1406 are included in this series of circuits along with an inverter 1408. The AND circuits 1400 and 1404 have their outputs connected with an OR circuit 666, and a line 668 is connected to the output of the OR circuit 666 and carries the signal "torque CW" to be hereinafter described in greater detail. And OR circuit 670 has the outputs of the two AND circuits 1402 and 1406 as its inputs, and a line 672 is connected to the output of the OR circuit 670 and carries the signal "torque CCW" to be hereinafter described in greater detail.

Certain of the components previously described are reset under the control of single shots 674 and 676. Single shots 674 and 676 are connected to the output of the special wave shaping circuitry 540 and respectively provide the signals RESET 1 and RESET 2 on lines 678 and 680. The reset 1 on line 678 is applied to the latch 566 and the latch 616. The reset 2 signal on line 680 is applied to the trigger 592 and to the counter 582 and 594. The single shots 674 and 676 have different timing characteristics for providing the two reset signals of different duration as will be hereinafter described in greater detail.

The line 668 carrying the TORQUE CW signal is connected to AND circuits 682, 684 and 686; and the line 672 carrying the TORQUE CCW signal is connected to AND circuits 688, 690 and 692. A 300 count up-down counter 694 is driven from the lines 582 and 530, and the counter 694 drives decodes 696, 698, 700, 702, 704 and 706. The decodes 696, 698, 700, 702, 704 and 706 respectively have their outputs connected to AND circuits 682, 684, 686, 688, 690 and 692. The decodes respectively have the ranges illustrated in FIG. 3d and decode the outputs of the counter 694 as will be hereinafter described in greater detail. The counter 694 is reset from the reset logic 706.

The AND circuits 682 and 690 are connected to an OR circuit 708 having an output line 709; the AND circuits 684 and 692 are connected with a second OR circuit 710 having an output line 711; and the AND circuits 686 and 688 are connected with a third OR circuit 712 having an output line 713. Line 709 is connected with a chopper circuit 714a which may also be considered a "driver." The chopper circuit 714a comprises a source of direct current voltage 716, a compare circuit 718, an AND circuit 720, a transistor 722, resistors 724 and 726, a diode 727 and a direct current voltage source 728. The resistor 724 is connected between the voltage source 716 and the minus input of the compare circuit 718. The plus input of the circuit 718 is connected to the terminal 506a through the resistor 1410. The resistor 726 has one end connected with the resistor 724 and has its other end connected with the collector of the transistor 722 and with the terminal 508. The output of the compare circuit 718 is connected to one of the two inputs of the AND circuit 720, and the other input of AND circuit 720 is connected to the output of the OR circuit 708. The output of the AND circuit 720 is connected to the base of transistor 722. The diode 727 and battery 728 are connected in parallel with transistor 722.

A similar chopper circuit or driver 714b is connected to the coils 510 and to line 711 constituting the output of the OR circuit 710, and a similar chopper circuit 714c or driver is connected to the coils 512 and to line 713 constituting the output of the OR circuit 712. Chopper 714a may be said to constitute a driver No. 1; and similarly chopper 714b constitutes driver No. 2; and chopper 714c constitutes driver No. 3.

Slew mode control circuitry comprising a slew latch 729, AND circuits 730 and 732 and an inverter 734 is provided for causing the motor 500 to operate in a slew mode. The latch 729 has set and reset input terminals. The reset terminal is connected to the "match" pulse line 544, and the set terminal is connected to a line 736 adapted to have a "move" pulse applied to it. The negative output of the slew latch 728 is applied to a lead 738 which constitutes one of the two inputs to AND circuit 599.

The AND circuit 730 has the lead 736 as one of its two inputs and has a lead 740 as its second input. The lead 740 is adapted to carry the "slew" direction signal which may be high or a logical one for clockwise rotation or rotor 500R and low or logical zero for counterclockwise rotation of rotor 500R. The line 740 is the input of the inverter circuit 734, and the output of the inverter circuit 734 constitutes one of the two inputs of the AND circuit 732. The lead 736 constitutes the second input of the AND circuit 732. Leads 742 and 744 are respectively connected to the outputs of the AND circuits 730 and 732 and respectively carry the signals "move CW" and "move CCW." The "move CCW" lead 742 is connected with the OR circuits 610 and 640 to be inputs thereof, and the "move CCW" lead is connected with the OR circuits 632 and 624 to be inputs to these OR circuits.

A first mode latch 1412 has the lead 736 carrying the move pulse applied to it on its set side and has its reset side connected with the lead 544 carrying the match pulse. The latch 1412 has its negative output connected by means of a lead 1414 with the input side of a delay circuit 1416 having an output line 1417 and with an input to an analog fine home mode controller 1418. The controller 1418 has a second input which is connected by means of a lead 1420 with the output of an analog emitter 1422. An AND circuit 1424 has the output of the delay circuit 1416 as an input and has the lead 544 carrying the match pulse as a second input. The output of the AND circuit 1424 is connected to the reset side of a second mode latch 1426, and the set side of the latch 1426 is connected to the lead 736 carrying the move pulse.

The latch 1426 has its positive output connected with a lead 1428 and has its negative output connected to a lead 1430. The lead 1428 carries the signal DM (digital mode), and the lead 1430 carries the AM (analog mode) signal. The lead 1428 is connected as inputs to AND circuits 1400 and 1402, and the lead 1430 is connected as input to AND circuits 1404 and 1406.

The controller 1418 has four output lines 1432, 1434, 1436 and 1438. The lines 1432, 1434 and 1436 control the drivers 714a, 714b and 714c and respectively carry current limit number 1, number 2 and number 3 signals. The line 1438 carries an ADT (analog desired torque) signal, and this line provides inputs to the AND circuit 1404 and the inverter circuit 1408. The output of the inverter circuit 1408 constitutes an input of the AND circuit 1406.

Referring to FIGS. 4 and 5, the analog emitter 1422 may be seen to comprise, for example, a disk 1440 of transparent material having a plurality of radial lines 1442 of opaque material thereon. The disk 1440 is mounted on the shaft 502 to rotate therewith. A light source 1444 is positioned on one side of the disk 1440, and a phototransistor 1446 is positioned on the other side of the disk 1440 so that the phototransistor is actuated by the light beam from the source 1444 as it is interrupted by the lines 1442.

The analog fine home mode controller 1418 is shown diagrammatically in FIG. 6 and may be seen to comprise a phototransistor amplifier 1448 connected to the phototransistor 1446, track and hold logic 1450, a differential amplifier and lead filter 1452, compare circuitry 1454, a fullwave rectifier 1456 and a variable current source modulator 1458. The lead 1460 constitutes the output of the amplifier 1448 and is applied as an input to the track and hold logic 1450 and also to the plus input of the differential amplifier and lead filter 1452. The lead 1462 constitutes the output of the track and hold logic 1450 and is applied to the minus input of the differential amplifier 1452. The lead 1464 constitutes the output of the differential amplifier 1452, and this lead is connected to the plus input of the compare logic 1454 and also to the fullwave rectifier 1456. The lead 1466 is connected to the output of the rectifier 1456 and to the input of the variable current source modulator 1458. It will be observed that the lead 1414 from the first mode latch 1412 is connected to constitute an input to both the track and hold logic 1450 and also the variable current source modulator 1458.

The purpose of the variable current source modulator 1458 is to decrease the current in its output lines 1432, 1434 and 1436 as the voltage applied to the input lead 1466 increases. The modulator 1458 comprises an amplifier module 1468 (see FIG. 7b) having its output connected to the bases of transistors 1470, 1472 and 1474. The collectors of these transistors are respectively connected to the lines 1432, 1434 and 1436. The emitter of transistor 1470 is connected to series connected resistors 1476 and 1478; and the emitter of transistor 1472 is connected to series connected resistors 1480 and 1482; and the emitter of transistor 1474 is connected to series connected resistors 1484 and 1486. These groups of resistors are connected to a gate 1488 which is connected to the line 1414 so as to be under the control of a signal on this line. A diode 1490 and a resistor 1492 connect a source of voltage to the junction between the amplifier 1468 and the transistor 1470, and a resistor 1494 connects the emitter of transistor 1470 with the upper end of resistor 1492. A resistor 1496 connects the lead 1466 with the resistor 1494 and with an input to the amplifier 1468, and a resistor 1498 is connected to another input of the amplifier 1468.

Figure 7A:
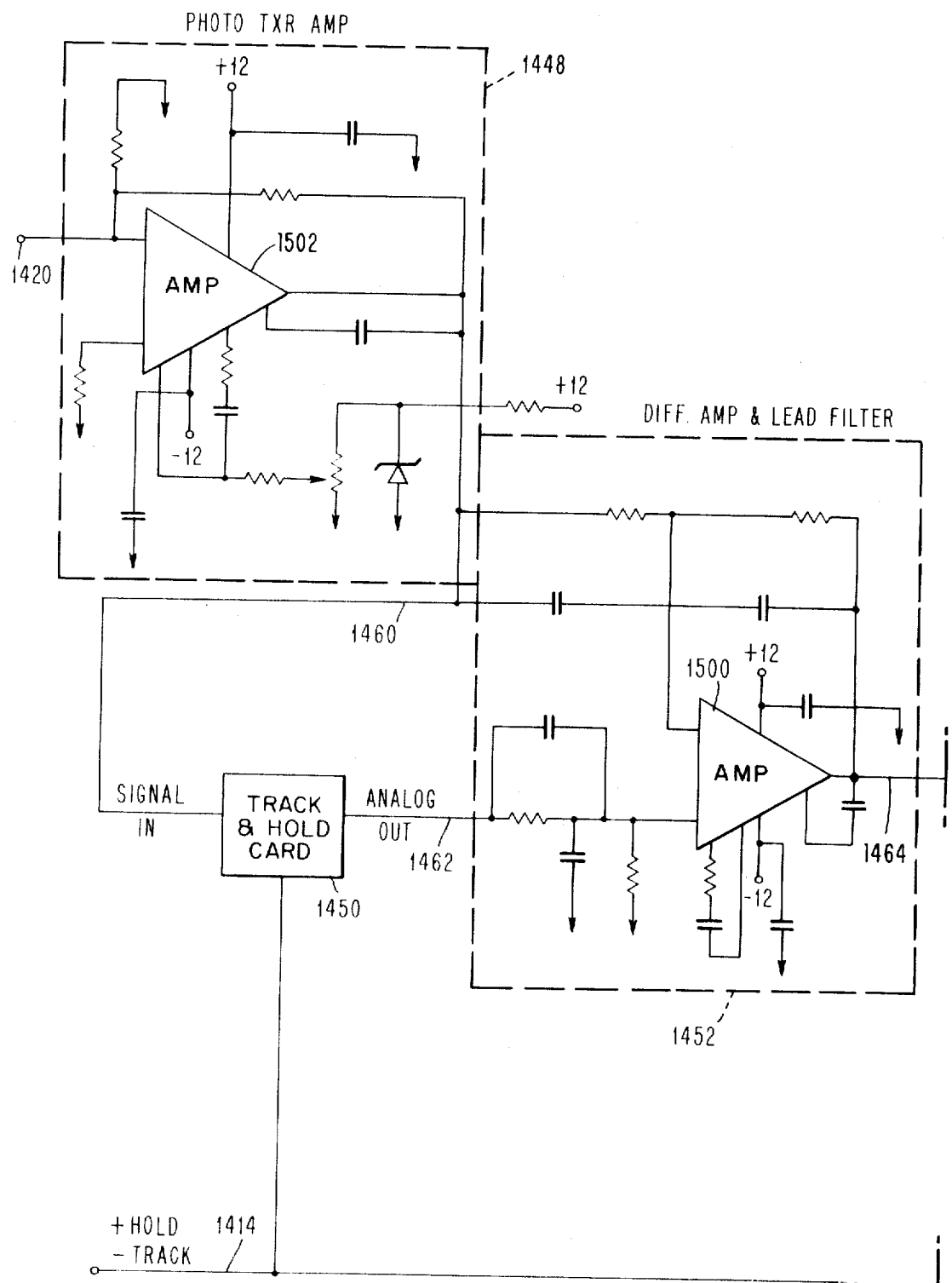
FIGS. 7a and 7b, taken together, with FIG. 7a on the left and FIG. 7b on the right, constitute a circuit digram of this analog portion of the circuitry.

The differential amplifier and lead filter 1452 is conventional component and hence will not be described in detail, although an exemplary circuit for the amplifier 1452 is set forth in FIG. 7a. The amplifier 1452 may be more accurately described as an active lead filter with gain. Specifically, the circuit 1452 utilizes the analog output of the track and hold logic 1450 on lead 1462 and compares this signal with that existing on the signal in line 1460, amplifies the difference and also passes it through a lead filter. The lead filter is necessary for stability in the analog feedback loop of the system which includes the FIGS. 7a and 7b circuitry, the analog emitter 1422, the motor 500 and the rest of the circuity shown in FIgS. 3a to 3f. The component 1500 in the differential amplifier is simply an amplifier module.

The track and hold logic 1450 is also conventional and is a two state unit having a hold condition and a track condition. When track mode of the logic 1450 exists, the input line 1414 has a minus signal on it, and in this case, the output of the circuitry 1450 on line 1462 is identical to the input on line 1414. The output thus tracks the input identically. The logic 1450 is switched to its hold condition when a plus signal is applied on the input lead 1414; and, in this case, the output on line 1462 stays at the particular level of voltage that the input line 1460 had at the particular time that a change was made from minus to plus on the lead 1414. This voltage remains on the output lead 1462 until another change is made of the voltage level on line 1414 from plus hold to minus track. Such track and hold logic has previously been used in the IBM 1285, 1287 and 1288 optical card readers and circuitry is described in the manuals published on these readers.

The phototransistor amplifier 1448 also is a conventional component, although specific exemplary circuitry for this component is set forth in FIG. 7a. For the amplifier 1448, the input is a current on the lead 1420 while the output on the lead 1460 is a voltage. The output voltage is proportional to the input current. The component 1502 is simply an amplifier module.

Figure 7B:
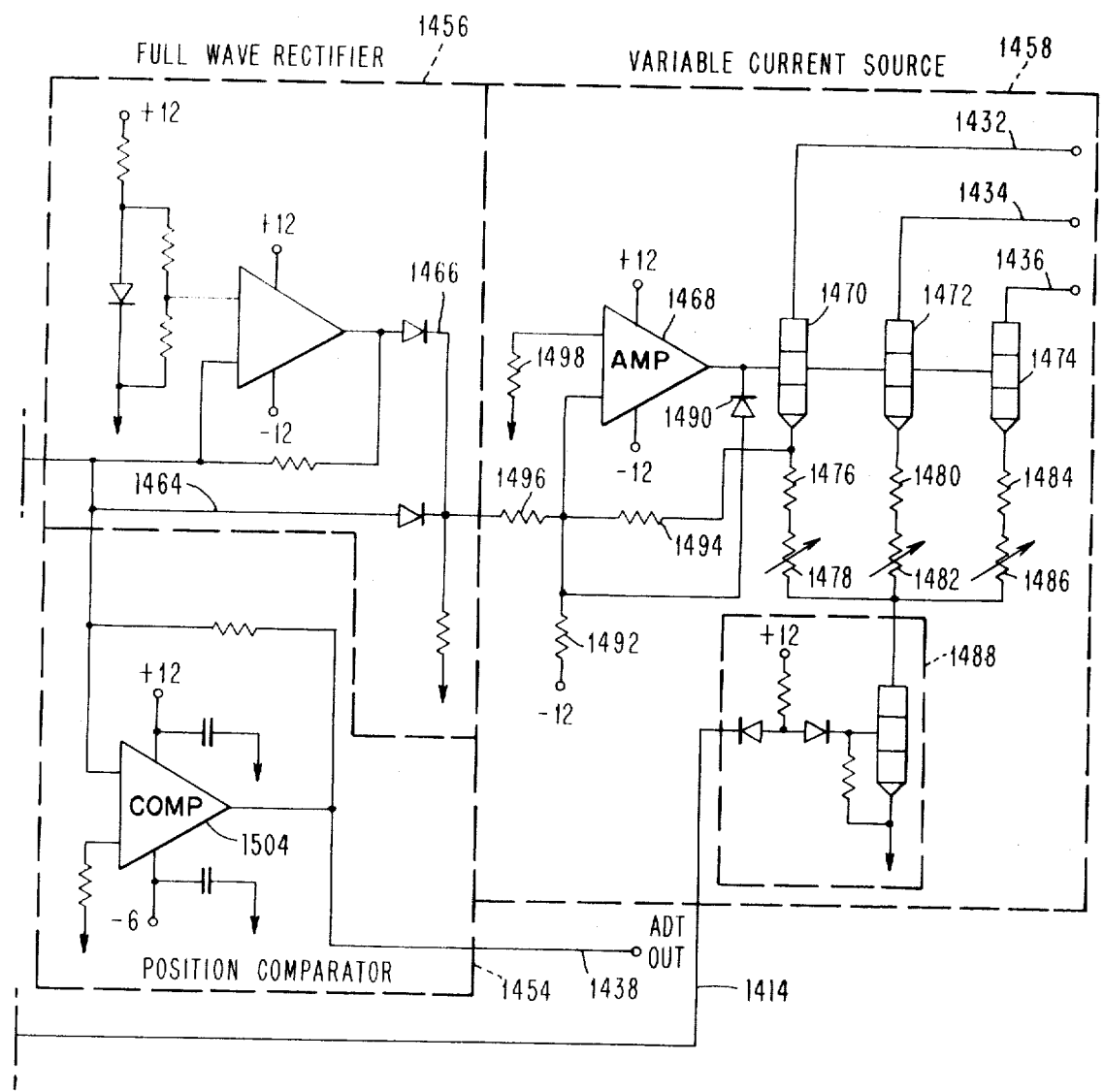

The fullwave rectifier 1456 is a conventional unit, and exemplary circuitry for this unit is shown in FIG. 7b. The position comparator 1454 also is a conventional unit, and exemplary circuitry is shown in FIG. 7b for this unit also. The comparator 1454 compares the voltage on the input lead 1464 with ground. If the signal level on lead 1464 has a voltage below ground, the output of the comparator 1454 on lead 1438 is negative; while, if the voltage level on input lead 1464 is above ground, the voltage level on output lead 1438 is positive. The component 1504 in this circuitry is a comparator module.

In operation, the register 536 is provided with a count in it through the bus 538 that corresponds with the desired position of the rotor 500R. It is assumed that the rotor 500R has an initial position at zero degrees, and the register 536 may be provided with 1 to 3,600 counts. It will be assumed, for the sake of simplicity, that the rotor travels initially in the X clockwise direction, although the rotor may be made to travel in the opposite direction. The rotor is initially driven in a slew mode under the control of the slew mode circuitry which comprises the slew latch 729 and AND circuits 730 and 732. The latch 729 is under the control of a "move" pulse applied to line 736; and such a pulse, for example, can originate in punching equipment (not shown) for punching document cards 524, supplying this pulse when a punching action has been completed. The direction of movement of the rotor 500R is determined by a slew direction signal applied to lead 740 and inverter 734, with an up or logical 1 signal on lead 740 indicating the clockwise direction of rotation and a down or logical zero signal on lead 740 indicating a counterclockwise direction of rotation. The signal on lead 740 may be under the control of the human operator.

The "move" pulse applied to the slew latch 729 causes a setting of this latch so that there is no signal on line 738, and AND circuit 599 is thus disabled. This disabling prevents a "switch" signal appearing on lead 600 and thus prevents a fine home mode function of the circuitry which will be subsequently described. It is assumed that clockwise direction of rotation is desired, and there is thus at this time a signal on lead 740 in addition to the move pulse on line 736, so that the AND circuit 730 is effective to provide the "move CW" signal on line 742. The move CW signal on line 742 is applied to AND circuits 610 and 640 so that the "CW set" signal on line 612, the TTCW signal on line 630 and the "torque CW" signal on line 668 are provided. The CW torque latch 628 is set by the signal on line 612, and the CCW torque latch 636 is held in reset condition by the move CW signal applied to the OR circuit 640. The torque CW signal is applied to the AND circuits 682, 684 and 686, enabling these AND circuits.

The counter 694, together with the decode circuits 696, 698, 700, 702, 704 and 706 determine which of the various stator windings of the motor 500 are energized for providing the applications of torque necessary for moving the rotor 500R. For clockwise direction of rotation, the decode circuits 696, 698 and 700 are effective. When the rotor 500R is in its zero degree position, the decode 696 would be effective to satisfy the AND circuit 682 and to provide a signal through the OR circuit 708 to the driver 714a for energizing the windings 504 for causing initial movement of the rotor 500R in the clockwise direction.

The emitter 526 provides a clockwise pulse on line 528 or a counterclockwise pulse on line 530, depending on whether the rotation of the rotor 500R is clockwise or counterclockwise, one such pulse being provided for each tenth degree of rotation of the rotor 500R. The rotor 500R is assumed to travel initially in the clockwise direction, and the content of the master position counter 532 thus increases with the angle of rotation of rotor 500R, the CW pulses on line 528 being applied to counter 532 and causing it to count up. During this time, the windings 504, 510 and 512 are energized in a predetermined sequence due to the action of the counter 694, the decodes 696, 698 and 700 and the AND circuits 682, 684 and 686, so as to cause rotation of rotor 500R from its 0° position toward its position corresponding to 50 counts, for example, in the counter 532. A count of 50 counts corresponds to a rotation of 5° of rotor 500R, assuming that the emitter 526 provides a pulse output for each tenth degree of rotation of rotor 500R, and the end position of the rotor 500R may be at or between stator poles. The energization of the windings 504, 510 and 512 is from the voltage source 518, under the control of the 300 count up-down counter 694, and the drivers 714a, 714b and 714c. The CW pulses on line 528 are effective on the counter 694 so as to cause the counter to count up as the rotor 500R rotates and to cause the different decodes 696, 698 and 700 to be effective for clockwise rotation of the rotor. More specifically, when the count in counter 694 reaches the count of 66 (on a rotation of the rotor for 6.6° from its zero position) decode 696 becomes inactive, and decode 698 becomes active. The output of decode 698 maintains the AND circuit 684 enabled for the next 10° of rotor rotation (corresponding to 100 counts in the counter 694) and during this time OR circuit 710 has an output so as to maintain the stator windings 510 energized and to maintain a clockwise torque on rotor 500R. Subsequently, decode 700 becomes effective after the count in counter 694 reaches the count of 166, and at this time OR circuit 712 has an output to maintain the windings 512 of stator 500R energized.

In the event that the rotor 500R is rotating in the counterclockwise direction, the counterclockwise pulses on line 530 exist in lieu of any CW pulses on line 528; the counter 694 counts downwardly; and the decodes 702, 704 and 706 are effective in the same manner as just described in connection with decodes 696, 698 and 700.

If the circuitry calls for a torque to be applied in the counterclockwise direction, the torque CCW signal is present on line 672 instead of the torque CW signal on line 668; and in this case, the AND circuits 688, 690 and 692 are effective. Assuming that the rotor 500R is in its zero position, with a count of zero existing in the counter 694 the decode 702 will first be effective, producing an output that enables AND circuit 688 and provides an output from OR circuit 712 on to the windings 512 of stator 500R. The decode 702 is effective for counts of 236 to 35; the decode 704 is effective for counts of 36 to 135 and the decode 706 is effective for counts of 136 to 235 for respectively enabling AND circuits 688, 690 and 692 and for respectively energizing the stator windings 512, 504 and 510. The decodes 702, 704 and 706 function basically substantially the same as the decodes 696, 698 and 700, the operation of which has been described in some detail.

The driver or chopper 714a, when activated by a signal on its input line 709, operates to provide a current through the coils 504 that varies between predetermined limits, such as between 5 amperes and 7 amperes, so as thus to in effect regulate current flow through these coils. In the analog portion of the fine mode control to be hereinafter described, the chopping action is regulated by means of the analog fine home mode controller 1418; however, in slew mode, the analog fine home mode controller has no effect on the voltage appearing on the plus input terminal of the comparator 718 and thus has no effect on the driver or chopper 714a. When the driver number 1 signal on line 709 is "up," the comparator 718 provides a second input signal on AND circuit 720 when the plus input to comparator 718 is higher than the minus input to the comparator. The output of the AND circuit 720 is thus satisfied, and its output is effective on the base of the transistor 722, so that the transistor 722 at this time conducts. Current then flows through the coils 504 and resistor 519a. The effect of this current flow, however, through resistor 519a is to lower the plus input to the comparator 718 so that the AND circuit 720 is disabled and conduction ceases through the transistor 722. At this time, current passing through coils 504 changes to diode 727 from transistor 722 and begins to decrease in amplitude. This continues until the drop across resistor 519a is such that the plus input of comparator 710 is greater than the negative input, and at this time the transistor turns on again and the current through coils 504 begins to increase.

It should be noted that when the current is increasing in coils 504, the plus input of the comparator 718 is falling. The voltage at which the comparator 718 switches is set by the reference emf source 716 modified by a delta voltage produced by resistors 724 and 726. When the transistor 722 is on, the voltage of the negative input to the comparator 718 is reduced below the reference voltage (from battery 716) by the voltage divider formed by resistors 724 and 726. As soon as the transistor 722 is turned off, the voltage input to the comparator 718 from resistor 519a is increased above the reference voltage derived from resistors 724 and 726. The delta voltage across the comparator minus input side due to resistors 724 and 726 establishes the delta current variation which is allowed in coils 504 and also, along with the inductance of coil 504, determines the period of the chopper 714a. The choppers 714b and 714c are of similar construction and operation as chopper 714a.

The content of the master position counter 532 increases as the rotor 500R approaches its desired or home position, since the CW pulses on line 528 are effective on the counter. When the rotor 500R passes through its home position, the count in the counter 532 equals the count in the desired position register 536, and the compare circuitry 534 produces a "match" pulse on line 544 by means of the wave shaping circuitry 540 and the single shot 542. The output signal from the compare circuitry is of substantial length timewise, and the function of the special wave shaping circuitry 540 is to produce a much shortened pulse that occurs at the rise of the compare circuitry 534. The "match" signal on line 544 is in the form of a spike which is due to the single shot 542.

Figure 8:
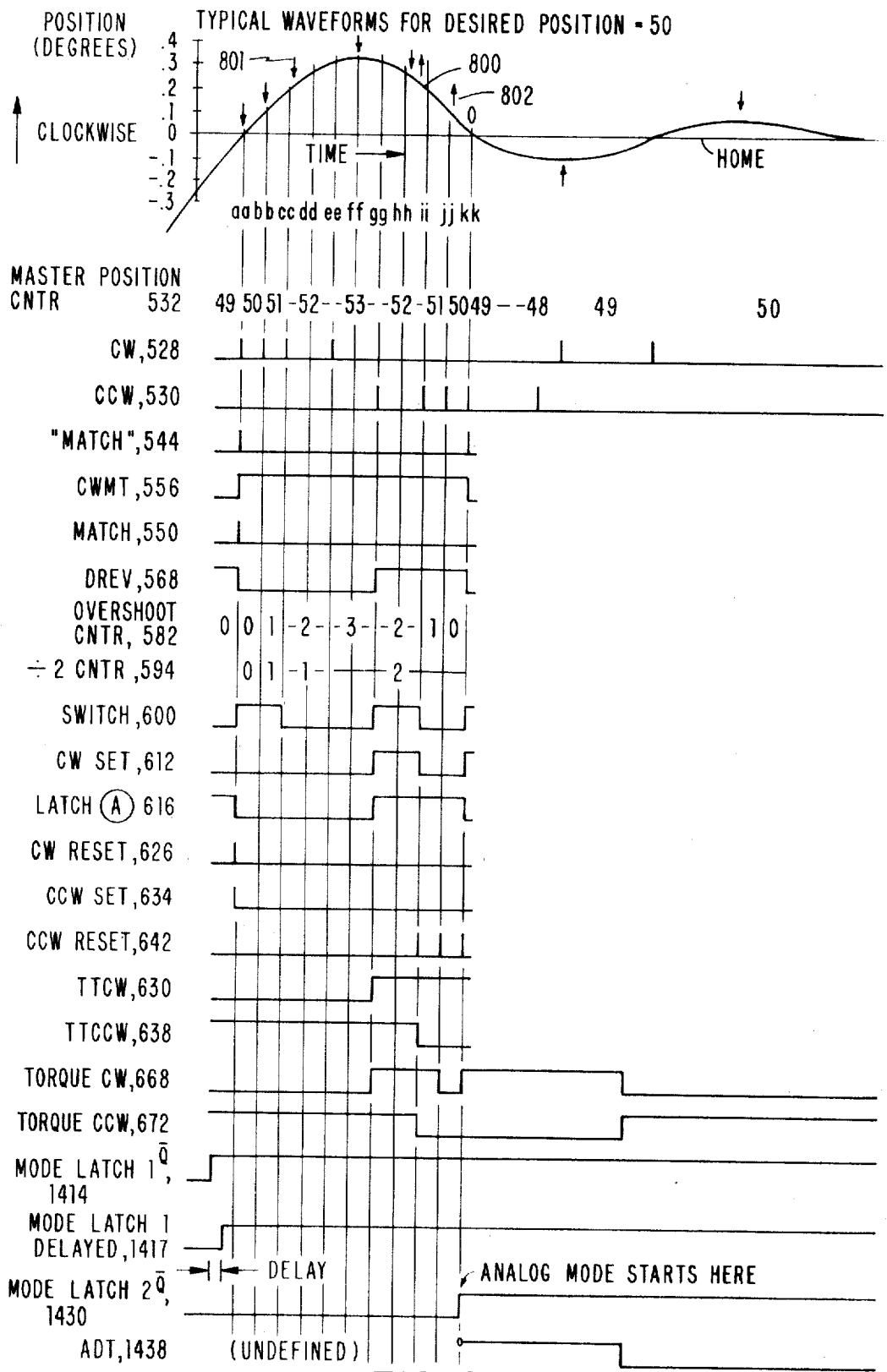
FIG. 8 is a diagram illustrating the manner in which various signals in the control circuitry vary.

Referring to FIG. 8, the curve 800 shows the position of the rotor 500R with respect to time, just prior to the subsequent to the first crossing of the desired or home position of the rotor in its clockwise direction. The desired or home rotor position is indicated by the zero ordinate, and it will be observed that the illustrated ordinates are from zero to plus 0.4 and from zero to −0.3. Assuming that the emitter 526, as before mentioned, provides an output clockwise or counterclockwise pulse on lines 528 and 530 for each tenth degree of rotation, a CW pulse or a CCW pulse is provided each time that the curve 800 crosses one of the tenth degree ordinates. This is illustrated by the CW curve 528 and CCW curve 530 in FIG. 8, the CW pulses occurring for clockwise rotation of the rotor 500R and the CCW pulses occurring for counterclockwise rotation of the rotor 500R. The match pulses 544 are indicated below the crossings of the curve 800 with the abscissa, being caused by a matching of the counts within the counter 532 and register 536 as previously described. On the occurrence of the first match pulse on line 544, the slew latch 729 is reset. A signal then raises on line 738, and the AND circuit 599 is then enabled insofar as the output of the compare logic 596 is concerned. The circuitry may then function in a fine home mode which consists initially of a digital submode and finally an analog submode.

The mode latches 1412 and 1426 function to control the circuitry in fine home mode. The latches 1412 and 1426 are both set by a move pulse on line 726, and this is illustrated in FIG. 8 showing that the signals on leads 1414 and 1430 are initially low. A DM (digital mode) signal exists at this time on the output line 1428 from the second mode latch 1426, and this signal is applied to AND circuits 1400 and 1402 which function to gate the TTCW and TTCCW signals on lines 630 and 638 for digital mode which will now be described in greater detail.

The digital portion of the fine home mode occurs between the first and second crossings of the rotor 500R of its home position (between the times aa and kk of FIG. 8). During this time, reverse torque as indicated by the arrows 801 is applied onto the rotor 500R; and, as the rotor 500R reapproaches and is oscillating back toward home position, a forward torque 802 is applied onto the rotor. Approximately halfway between its point of maximum oscillation and home position, both of the torques 801 and 802 are applied onto the rotor. It is assumed that, as previously mentioned, the desired position register 536 has been loaded with the count of 50, and the desired home position is between the counts of 49 and 50, which would respectively be provided by 49 and 50 CW pulses on line 528 after the rotor has left its initial position. Under these conditions, when the counter 532 has its contents going from 49 to 50 or from 50 to 49, the curve 800 crosses the zero ordinate indicating the desired or home position.

Still referring to FIG. 8, the CWMT or "clockwise match" signal 556 is derived from a match pulse on line 544 and a clockwise pulse on 528. These two signals are applied to the AND circuit 546, and the circuit 546 thus provides an output signal and sets the latch 554 so as to provide the CWMT signal. The latch 554 also provides a counterclockwise match signal on the line 558 and this is just the inverse of the CWMT signal on line 556. The latch 554 is reset by the action of a match pulse together with the counterclockwise pulse (on line 530) both applied to the AND circuit 548 which provides the reset signal to latch 554.

The output of the AND circuit 546 on the line 550 is a "match clockwise" or "match CW" pulse which simply constitutes a match pulse gated through by a clockwise pulse. A match pulse on line 544 occurs whenever the rotor 500R passes through its home position, and the match clockwise pulse on line 550 occurs only when the rotor 500R passes through the home position in the clockwise direction. Likewise, the AND circuit 548 produces a match counterclockwise or CCW pulse on line 552 only when the rotor 500R passes through its home position going in the counterclockwise position.

The signal "direction reversed" or DREV on line 568 indicates that the rotor direction of rotation was reversed and, referring to FIG. 8, may be seen to go low when the rotor 500R crosses the desired home position when traveling in the clockwise direction. This signal goes high subsequently on the occurrence of the first counterclockwise pulse on line 530, indicating that the direction of the rotor has reversed and that the rotor 500R has passed its peak point of clockwise travel. The latch 566 produces the DREV signal on its output line 568, and the latch 566 is set to cause the DREV signal to go to its upper value on the clockwise match and counterclockwise match signals on lines 556 and 558. These signals are applied onto AND circuits 560 and 562, and the AND circuit 560 having the CWMT and CCW signals applied to it provides a set signal through OR circuit 564 to set the latch 566 and provide the DREV signal on line 568 on the first counterclockwise pulse occurring when the latch 566 is in unset condition. Likewise, the AND circuit 562 will provide a raised DREV signal on the first clockwise pulse occurring when the latch 566 is in unset condition. The latch 566 is reset under control of the single shot 674, substantially at the time the rotor 500R passes through its home position.

The two counters 582 and 594, like the counter 532, are actuated by the clockwise and counterclockwise pulses on lines 528 and 530; however, the counters 582 and 594 may be substantially smaller than the counter 532 since they need only to measure the maximum overshoot that the rotor 500R may have. The counter 582 is an up-down counter and counts along with the master position counter 532 except for the fact that the content of the overshoot counter 582 is zero when the master counter contains the count of 50 and when the rotor 500R is rotating in the clockwise direction, or when the master position counter 532 contains the count of 49 and the rotor 500R is rotating in the counterclockwise direction. Thus, the content of the overshoot counter 582 is zero on either side of the desired position which in this case is between the counts of 49 and 50 in the master position counter 532. The count in the overshoot counter 582 goes up when the rotor 500R is traveling away from the desired position and goes down when the rotor is traveling toward the desired position. The divide by two counter 594 has a content of zero at the same time as the content of zero exists in the counter 582, and the counter 594 counts up along with the counter 582. The first count in the counter 594 comes at the same time as the first count in the counter 582 but subsequently the up counts in the counter 594 come every second count in the counter 582. Referring to FIG. 8, the corresponding contents of the counters 582 and 594 are indicated; and, as will be observed, as the overshoot counter 582 counts up 1, 2, 3, 4, the corresponding counts in the counter 594 are 1, 1, 2.

The AND circuits 570 and 574 account for the up-counting action within the overshoot counter 582, and the AND circuits 572 and 576 account for the down-counting action of the counter 582. The signals from these AND circuits are directed through the OR circuits 578 and 580 to the up and down input terminals of the counter 582 as is apparent. The AND circuit 570 will cause an up counting action by counter 582 due to the CW pulses on line 528 when the clockwise match signal exists in line 556 due to the setting of the latch 554, and the AND circuit 574 also causes an up-counting to occur under the action of the counterclockwise signals in line 530 assuming that the latch 554 is not set and therefore that the CCWMT signal is up. The down-counting action of the counter 582 is caused to occur when the clockwise match signal is up on line 556, and rotation of the rotor in the counterclockwise direction causes the CCW signal on line 530, thus satisfying AND circuit 572. A similar down-counting action occurs when the CCWMT signal is up, due to the latch 554 being reset, under the action of the clockwise signals on line 528 to satisfy AND circuit 576.

The trigger 592 is of such construction that the leading edge of a pulse applied to it reverses the state of Q and $\bar{Q}$, its outputs. Thus, the first output from OR circuit 578 triggers the trigger 592 providing an output pulse applied to the counter 594; however, the subsequent pulse output of OR circuit 578 simply reverses the state of the trigger 592 without providing an input to the counter 594, causing the counter 594 to have the counting action above described. The counters 582 and 594 are reset by the reset 2 signal on line 680 which is derived from the single shot 676 that is in turn energized from the compare circuitry 534 through the wave shaping circuitry 540.

The "switch" signal on line 600 exists when the contents of the overshoot counter 582 equals the contents of the divide by two counter 594. This condition may occur after the overshoot counter 582 has reached its maximum count and has started coming down in content so that the contents of the counters 582 and 594 match, bearing in mind that the counter 594 does not count upwardly as fast as the counter 582. In particular, the compare circuitry 596 produces the switch signal under these conditions, causing the switch signal to raise when rotor 500R has become back to about one-half the distance from maximum overshoot to home position. The switch signal on line 600 thus raises at times aa and gg, for example, as shown in FIG. 8.

The AND circuit 606 combines the clockwise match, switch and direction reversed signals and produces the "clockwise set" or "CW set" signal on line 612 when these three signals are all up. The DREV signal is produced, as previously described, just subsequent to a reversal in direction of the rotor 500R the switch signal is up as just described shortly after the direction of rotation of the rotor 500R reverses; and the clockwise match signal is up subsequent to a passage of the rotor over its home position, so that the clockwise set signal on line 612 raises at this time, such as at time kk. The CW set signal passes from the AND circuit 606 through the OR circuit 610 to line 612. The CW set signal on line 612 is similarly raised at time gg when the switch signal raises; however, it will be noted that the DREV signal has raised previously, indicating the time at which the rotor 500R has just passes a point of maximum oscillation. The switch and DREV signals do not raise in this case in exact correspondence, since the rotor 500R has overshot its desired position to a greater extent at this time than at the previous time. The switch signal indicates, due to the action of the two counters 582 and 594, the time at which the rotor 500R has come back approximately one-half the distance from a maximum overshoot to the desired home position, providing a switch point of torque as will be subsequently explained; and the switch signal on line 600 is controlling as compared to the DREV signal in producing the CW set signal.

It will be noted that the match counterclockwise signal on line 552 is also applied onto the OR circuit 610 to produce the CW set signal. The match CCW signal is a pulse, similar to the match CW pulses on line 550, that occurs when the rotor 500R passes across its desired home position and in the counterclockwise direction. For both cases in which the clockwise set or CW set signal appears, it functions so as to produce a clockwise torque on the rotor 500R due to the particular energizations given the stator windings 504, 510 and 512. To produce this result, the CW set signal on line 612 is applied to and sets the CW torque latch 628, thus producing the signal "total torque clockwise" (TTCW) on line 630.

The CW torque latch 628 is reset under the action of the latch 616 and AND circuit 620 producing a reset signal on line 626 through OR circuit 624. The latch 628 should be reset at a time when the rotor 500R has just crossed, gone beyond and is on its way back to the home position. It will be noted that the latch 616 is set through the OR circuit 614 whenever the CW set signal appears on line 612 (due to the action of AND circuit 606) so as to provide one of the necessary input signals to AND circuit 620. The counterclockwise match signal must also be present on line 558 indicating that the rotor 500R is passing over home position in the counterclockwise direction; the clockwise signal on line 528 also applied to the AND circuit 620 indicates that the rotor is moving in the clockwise direction; and the SWITCH signal also on AND circuit 620 indicates that there is no correspondence of the contents of the counters 582 and 594. At this time, the latch 628 is reset, reducing the TTCW signal to zero.

The AND circuit 608, the OR circuit 632, the CCW torque latch 636, the AND circuit 622 and the OR circuit 640 correspond to and function the same as the components 606, 610, 628, 620 and 624, the operation of which has just been described, except that the latch 636 is effective for producing the total torque counterclockwise (TTCCW) signal on line 638 which is indicated on FIG. 8.

Figure 10:
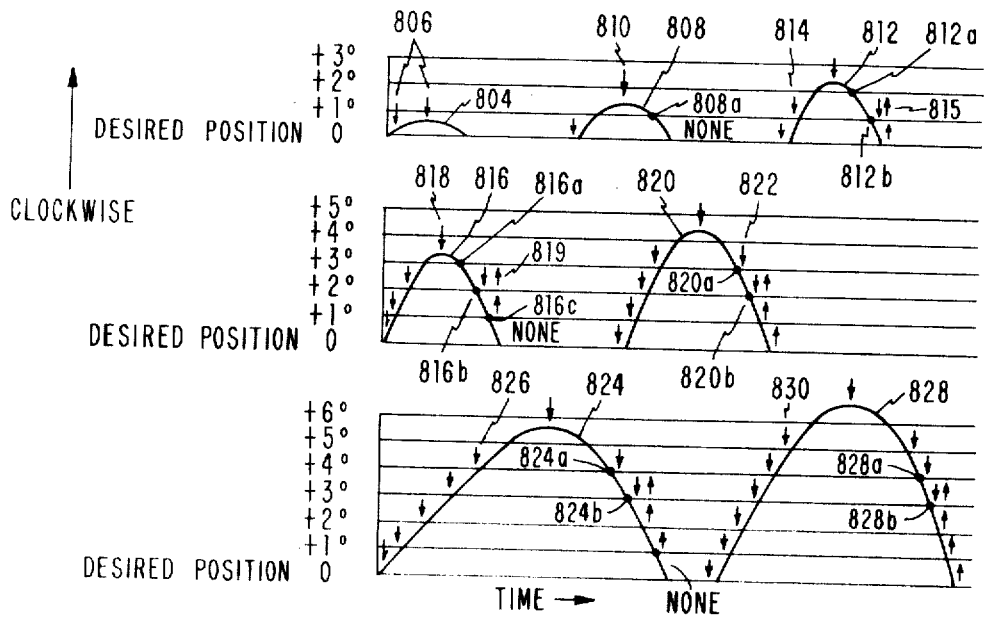
FIG. 10 is a graph illustrating the manner in which the torque varies on the rotor of the stepping motor in order to bring the rotor toward home position.

FIG. 10 may be referred to for an understanding of the manner in which the applications of torque to the rotor 500R differ for different amplitudes of oscillation of the rotor after the rotor initially passes through its desired or home position until the rotor again reaches the home position. The desired rotor position in each of the cases is shown as zero on the ordinates scale, with the rotor 500R being shown as initially passing through its desired position in the clockwise direction to a maximum oscillation of less than plus one-tenth degree, plus two-tenths degree, plus three-tenths degree, etc. The abscissa in each case represents time, similarly to the abscissa for the curve 800 in FIG. 8.

Curve 804 shows the conditions existing after the rotor has passed its desired position, traveling in the clockwise direction, with the rotor 500R oscillating less than puls one-tenth degree from the desired position. As the rotor 500R passes its home position, counterclockwise torque is applied to the rotor, this being represented by the arrows 806. The torque CCW signal goes low, and the application of counterclockwise torque on the rotor 500R ceases when rotor 500R crosses its home position, since at this time the DREV signal goes low, this signal being impressed on the AND circuit 606 for this purpose.

Curve 808 illustrates the condition in which the rotor 500R oscillates for more than one-tenth degree after initially passing through its desired home position. The counterclockwise torque as shown by the arrows 810 is applied to the rotor 500R, tending to return it to its home position; and this counterclockwise torque is maintained until the rotor returns to its plus one-tenth degree position (point 808a) at which the encoder 526 emits a counterclockwise pulse on line 530. At this time the SWITCH signal comes up to provide the CCW reset signal on line 642 for this purpose.

Curve 812 illustrates the application of counterclockwise torque on the rotor 500R by means of the arrows 814 under the conditions in which the rotor 500R oscillates initially beyond 0.2° in the clockwise direction. Approximately midway between the point of maximum rotor oscillation and the rotor home position, between points 812a and 812b, clockwise as well as counterclockwise torque is applied to the rotor. The clockwise torque is represented by the arrows 815. The point 812a may be termed a "switch point" and the application of clockwise torque begins at this point. Clockwise torque alone is applied between the point 812b at +0.1° rotor position and home position.

Curve 816 illustrates the application of counterclockwise torque on the rotor by the arrows 818 under the condition in which the rotor oscillates more than 0.3° after crossing its home position going in the clockwise direction. Both clockwise and counterclockwise torque represented by arrows 818 and 819 is applied between the switch point 816a and point 816b which is 0.1° later (at +0.3° and +0.2°). The positions of the points 816a and 816b may be contrasted with the positions of the points 812a and 812b at +0.2° and at +0.1°, and the earlier application of the clockwise torque in the case of curve 816 is due to the earlier incidence of the DREV and SWITCH signals on lines 568 and 600 applied to AND circuit 606. In the zero band, between +0.1° at point 816c and home position, there is no application of torque onto the rotor.

Curve 820 illustrates the application of counterclockwise torque designated by arrows 822 in the case in which the rotor 500R oscillates more than 0.4° after passing the home position. This is much the same as the previous case, and both clockwise and counterclockwise torques are applied between points 820a and 820b.

Curve 824 illustrates the condition in which the rotor 500R initially moves more than 0.5° after initially crossing its desired position, with the counterclockwise restoring torque applied being indicated by the arrows 826. The curve 824 is much like the curve 816 except that in this case, the points 824a and 824b between which both clockwise and counterclockwise torques are applied onto the rotor, exist at +0.4° and +0.3°. Clockwise torque is applied on to the rotor 500R at the higher switch point 824a because of the action of the counters 582 and 594 in hastening the SWITCH signal on lead 600.

Curve 828 illustrates the condition in which the rotor 500R moves more than +0.6° in oscillation 1 after initially passing through its home position going in the clockwise direction. In this case, the counterclockwise restoring torque on the rotor is indicated by the arrows 830. Overlapping torques are applied onto the rotor between points 828a and 828b which correspond with the points 820a and 820b previously mentioned, but the points 828a and 828b occur earlier, respectively at +0.4° and +0.3°. The circuits 582, 594 and 596 cooperate as before in producing the switch signal on line 600 at the +0.4° position of the rotor in providing this result.

In the event that the rotor 500R oscillates more than +0.7° from its home position after initially passing therethrough going in the clockwise direction, the curves showing the rotor position with respect to time will be substantially the same as curves 824 and 828 in that the points between which both clockwise and counterclockwise torques are applied to the rotor on its return oscillation will be approximately midway between home position and the point of maximum rotor oscillation.

The algorithm for carrying the rotor 500R to approximately its desired or home position (at which the circuitry of FIGS. 7a and 7b will take over to accurately position the rotor at home position) is apparent particularly from FIG. 10 and may be concisely stated as follows:

1. If the rotor 500R oscillates in the clockwise direction for less than one clockwise pulse or 0.1° from home position (note curve 804), counterclockwise torque is applied onto the rotor until the rotor again crosses it zero degree position.

2. If the rotor 500R oscillates farther than that at which a first clockwise pulse is provided by emitter 526 but less than 0.2° (note curve 808), counterclockwise torque is applied onto the rotor beginning at the time the rotor initially crosses its home position. When the rotor in its returning motion crosses the +0.1° position going in the counterclockwise direction, no torque is applied onto the rotor thereafter until it reaches its home position.

3. Referring to curve 812, if the rotor 500R oscillates more than +0.2°, counterclockwise torque is maintained on the rotor until the rotor returns about halfway between its point of maximum oscillation and its home position. At that time, both counterclockwise and clockwise torques are applied onto the rotor, between switch point 812a and point 812b. Clockwise torque remains applied on the rotor until the rotor reaches its home position.

4. If the rotor 500R has a maximum initial oscillation from home position of $X=(Y \times 0.1°)$ but less than $+(X+0.1°)$, where $Y$ is an odd integer greater than or equal to 3, restoring counterclockwise torque only is applied until the switch point is reached. The switch point is that point which occurs at a tenth degree position of the rotor after the rotor has changed direction and as emitter 526 is producing a counterclockwise pulse and which is further determined by the equation $S=(X+0.3°)/2$. Curves 816 and 824 are illustrative of such oscillations and have switch points 816a and 824a. At the switch point, clockwise torque is initiated and counterclockwise torque remains applied. These torques are maintained until the next counterclockwise pulse occurs at position $(S-0.1°)$ points 816b and 824b. At the latter point, only clockwise torque is applied until the zero band is reached, the zero band being between +0.1° and −0.1°. When the zero band is reached, all of the drivers are de-energized, and no torque is applied to the rotor.

5. If the rotor 500R oscillates to $X=(Y \times 0.1°)$ but less than $+(X+0.1°)$, where $Y$ is an even integer greater than or equal to 4, restoring counterclockwise torque is applied until the switch point is reached. The switch point is similar to the switch points just above mentioned and occurs after the rotor 500R has changed direction and when the emitter 526 is producing a counterclockwise pulse. In particular, the switch point in this case is determined by the equation $S=(X+0.2°)/2$. Curves 820 and 828 are illustrative of this condition. At the switch point (points 820a and 828a), both counterclockwise and clockwise torques are applied and these are maintained until the next counterclockwise pulse $(S-0.1°)$ is received. This is at points 820b and 828b on the curves 820 and 828. At the latter points, only clockwise torque is applied as will be noted from these curves, until the zero band is reached.

The reason that no torque is applied as the rotor nears its home position after initially crossing an odd tenth degree position as in paragraph 4 above, while torque is applied as the rotor nears its home position after the rotor has initially oscillated to an even tenth degree as in paragraph 5 above, is so that the clockwise and counterclockwise torques on a movement of the rotor toward its home position after the point of maximum oscillation may nearly balance. This is desirable, since the point of maximum oscillation of the rotor after initially crossing its home position is a zero energy position; and it is desired that, as the rotor subsequently comes to its home position, the rotor has zero energy at this point also, in order that the rotor shall nearly come to rest at its home position. The clockwise and counterclockwise torque arrows at and subsequent to the point of maximum oscillation for each of curves 816, 820, 824 and 828 are equal in number in each case illustrating this balancing of torques. In all of these cases, the rotor 500R has very nearly zero energy and zero speed as it crosses its home position after returning from its point of maximum oscillation in the clockwise direction. At this second crossing of the home position by the rotor 500R, the first mode latch 1412 and the second mode latch 1426 together control the change from digital sub-mode to analog sub-mode.

Both of the mode latches 1412 and 1426 are set by the move pulse on line 736. The mode latch 1412 is reset by the first match pulse on line 544 as the rotor 500R first crosses its desired or home position when traveling in a slew mode in the clockwise direction for the particular example given. As previously explained, a match pulse is produced when the content of the desired position register 536 and the master position counter 532 are equal. The delay circuit 1416 prevents the AND circuit 1424 from being satisfied at this time, and the mode latch 1426 remains in set condition in which the digital sub-mode remains in effect and the analog sub-mode is prevented from being effective.

At the second crossing of the home position by the rotor 500R, a second match pulse is produced and passes through the AND circuit 1424 to reset the second mode latch 1426. This results in the DM signal on line 1428 going low and one the inverse AM signal on line 1430 going high. The AND circuits 1400 and 1402 are disabled by the DM signal going low so that the TTCW and TTCCW signals cannot be passed therethrough, taking the system out of its digital sub-mode. The system is at the same time put into analog sub-mode by the application of the AM signal on line 1430 to the AND circuits 1404 and 1406, and the analog fine home mode controller 1418 is now operative to cause the rotor 500R to be moned to its home position in an analog manner. The circuitry of FIGS. 7a and 7b accomplishes this by regulating the action of the drivers 714a, 714b and 714c. FIG. 8, which shows the output signals of the first and second mode latches 1412 and 1426, may be referred to for an understanding of the manner in which a change is made from digital sub-mode to analog sub-mode.

The track and hold logic 1450 is changed from its tracking condition to its holding condition by the signal on the line 1414 raised when the mode latch 1412 is reset, and this occurs at the first match pulse as the rotor 500R passes through its home position after leaving its initial position. The analog encoder 1422 produces an output current as indicated by the curve 1540 in FIG. 6 as shaft 502 rotates, and the amplifier 1448 produces an output voltage on lead 1460 that is proportional to the input current shown by curve 1540. It will be observed that the output current of the encoder 1422 gradually varies for positions between −0.5° and +0.5° from home position of the rotor 500R. This output may be contrasted with the outputs of the encoder 526 which are in the shape of spikes (see signals 528 and 530 in FIG. 8).

When the track and hold logic 1450 is in its track mode, with a plus signal being applied to line 1414, the output of the logic 1450 on line 1462 is identical with the input on line 1460 which is a voltage proportional to the current 1540. In other words, the output on line 1462 tracks the input on line 1460. When the logic 1450 is switched to its hold mode by a negative signal on the control lead 1414, the output of the logic 1450 on line 1462 stays at the particular voltage level that existed on line 1460 when the switch was made from track to hold signal levels on line 1414. This voltage remains on line 1462 until the logic 1450 is again switched back to its track mode by changing the control voltage on line 1414 from minus to plus. Thus, the track and hold logic 1450 produces an analog reference voltage on its output line 1462 when in hold mode, and a position signal exists on line 1460 at all times that varies with the actual position of the rotor 500R.

The differential amplifier 1452 has impressed on it, as an input, the analog reference voltage on line 1462 which is obtained when the track and hold logic 1450 is moved into its hold mode. In addition, amplifier 1452 has impressed on it, as another input, the voltage signal on line 1460 which corresponds with the actual position of the rotor 500R. The differential amplifier 1452 compares these two signals, amplifies the difference, passes this difference through a lead filter and thus produces a position error signal on its output lead 1464. The signal on line 1464 is thus indicative of the degree difference between the final desired position of the rotor and its actual position.

The position comparator 1454 compares the error signal present on line 1464 with ground; and, if the error signal is of higher voltage than ground, the comparator 1454 produces a plus signal on its output lead 1438, while if the error signal is lower in potential than ground, the comparator 1454 produces a minus signal on its output lead 1438. Plus and minus signals on lead 1438 indicate respectively that the rotor is passed or is ahead of its desired position. The lead 1438 is applied to the AND circuit 1404 and the inverter 1408 so that, if the signal on line 1438 is plus, the torque CW signal on line 668 may be raised from the analog fine home mode controller 1418; while, if the signal on line 1438 is minus, the torque CCW signal on line 672 may be raised by the controller 1418.

The position error signal on line 1464 may be either plus or minus, and the fullwave rectifier 1456 changes this to a variable plus voltage on line 1466. The variable current source modulator 1458 functions to decrease the current in its output lines 1432, 1434 and 1436 as the voltage input on line 1466 increases, indicating a greater error between the actual position of the rotor 500R and its desired position. More particularly, if the voltage on the input line 1466 is much larger than zero, the current through the armature coils 504, 510 and 512 is a maximum, and the current through these coils decreases as the voltage on line 1466 decreases.

Referring to FIG. 7b, a voltage on the input line 1466 is amplified by the amplifier 1468 and is impressed in amplified form on the base of transistor 1470. The current flow through transistor 1470 increases with increased voltage on the base of transistor 1470. At the same time, the current flow through resistor 1410 increases; therefore, the voltage drop across resistor 1410 increases. Because of the increase in voltage drop across resistor 1410, the driver 714a functions to cause the average current flow through the resistor 519a and coil 54 to decrease due to the action of the transistor 722 and comparator 718 which have been previously described in operation. As rotor 500R approaches closer to its home position, the voltage on line 1466 is decreasing, the current through resistor 1410 is increasing, and the average current through resistor 519a and coil 504 is decreasing toward zero.

The current flow through the transistors 1472 and 1474 varies in the same manner as the current flow through the transistor 1470 as just described, and the transistors 1472 and 1474 have the same effect on their respective drivers 714b and 714c as does the transistor 1470 on its driver 714a.

The gate 1488 is caused to be open or conductive when the plus hold signal exists on the line 1414 so as to render the transistors 1470, 1472 and 1474 effective as just described. When the plus hold signal on line 1414 does not exist, the gate 1488 is closed or nonconductive to render the transistors 1470, 1472 and 1474 ineffective for their operation as described.

The amplifier 1468 is so constructed as to cause a voltage inversion from the voltage on lead 1466 to the voltage impressed on the base of transistors 1470, 1472 and 1474; and transistors 1470, 1472 and 1474 translate the voltage applied to the bases of these transistors to a current change. The diode 1490 is provided so as to keep the amplifier 1468 out of saturation when line 1466 goes negative. The resistors 1494, 1496 and 1492 are provided so that the amplifier 1468 provides the proper voltage translation.

Thus, the signal from the analog encoder 1422 causes the choppers 714a, 714b and 714c to decrease the current flow through the stator coils 504, 510 and 512 as the rotor 500R approaches its desired or home position. Until the analog circuitry is so effective, the track and hold logic 1450 is in its tracking mode; and maximum current flows in the coils 504, 510 and 512, although the drivers 714a, 714b and 714c function as choppers as has been previously described. Once the desired or home position of the rotor has been reached, however, the current flow through the coils 504, 510 and 512 goes to zero, this occurring when the analog encoder voltage on line 1460 matches the signal output on line 1462 of the track and hold logic 1450. The analog circuitry above described allows a more accurate final positioning of the rotor 500R to its desired position, and this may be at or between stator poles. Although the desired position of rotor 500R is shown at the center of the curve 1540 in FIG. 6, it will be understood that the desired position could be anywhere on the curve 1540. The accuracy of positioning rotor 500R at its home position is limited only by the precision of the analog circuit of FIGS. 7a and 7b.

Figure 11:
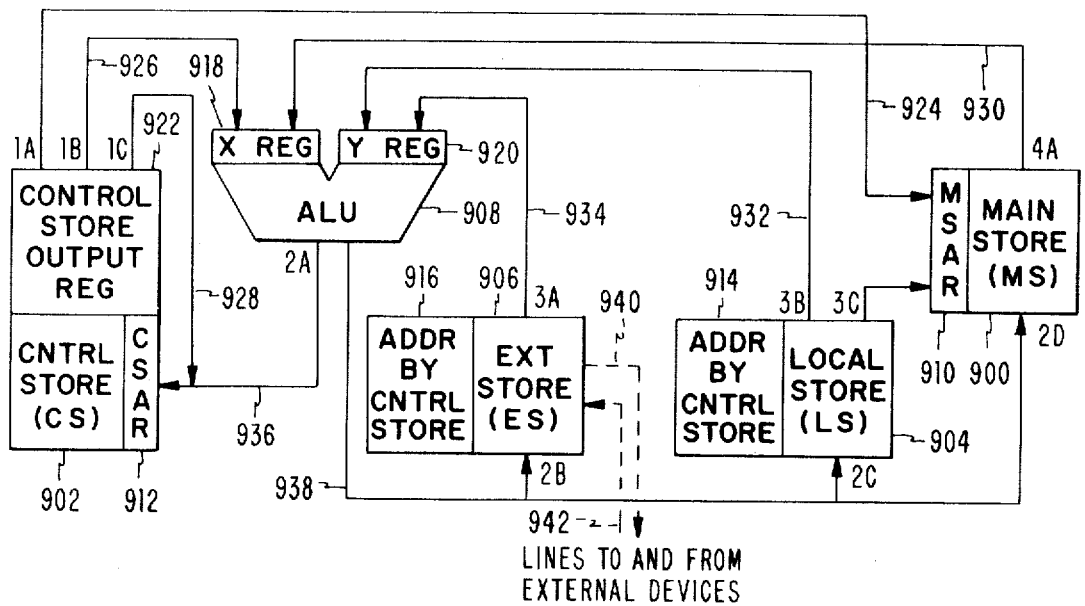
FIG. 11 is a diagrammatic illustration of a microcontrol unit usable in lieu of the circuitry of FIGS. 3a to 3f.

The positioning of the rotor 500R in its desired position may also be accomplished by using a microcontrol program unit which will now be described, referring particularly to FIG. 11. The microcontrol program unit may be seen to comprise a main store 900, a control store 902, a local store 904, an external store 906, and an arithmetic and logic unit (ALU) 908. A main store address register 910 is provided in connection with the main store, a control store address register 912 is provide in connection with the control store 902; a local store address register 914 is provided in connection with the local store 904; and, an external store control register 916 is provided in connection with the external store 906. An X register 918 is provided at one input of the ALU 908, and a Y register 920 is provided at the outer input of the ALU 908. A control store output register 922 is provided in connection with the control store 902.

The control store 922 is provided with outputs 1A, 1B and 1C, respectively connected with buses 924, 926 and 928 to provide inputs for the main store address register 910, the X register 918 and the control store address register 912. The main store 900 has an output 4A connected by a bus 930 to provide an input to the X register 918. The local store 914 has an output 3C connected by a bus 932 to provide an input for the Y register 920. Another bus 934 connects the store 906 with the Y register 920. The ALU 908 hs an output 2A connected by a bus 936 to provide an input to the control store address register 912. The stores 906, 904 and 900 respectively have inputs 2B, 2C and 2D; and these inputs are connected by a bus 938 with another output of the ALU 908. Lines 940 and 942 respectively constitute lines to and from external devices controlled by the microcontoller, such as a document card punch. The punch would supply a "move" pulse, such as has been described in connection with line 736. The emitter lines 528, 530 and 1420 also constitute inputs to the microcontrol program unit (see FIG. 12). The outputs from the microcontrol program unit are the driver lines 709, 711 and 713, and also the holdtrack line 1414.

The instruction cycle for the microcontrol program unit may be made up of eight clock pulses for a total time duration of 400 nanoseconds. The microcontrol program unit may include 64 registers, 32 being allocated to local store 904 and 32 being allocated to external store 906. It will be noted that communication with the outside world is done via external store 906. The local store 904 is generally used to address the main store 900 and hold temporary information.

The following abbreviations may be used for the various registers and stores in the microcontrol program unit:

CSAR = Control Store Address Register
ES = External Store (Registers)
LS = Local Store (Registers)
MAR = Main Address Register
X REG = X Register
Y REG — Y Register
CS = Control Store
MS = Main Store The following instructions may be used with the microcontrol program unit, and these respective instructions to provide the following information flow:

Instruction Summary — Information Flow

Branch Unconditional (BRU)
   Instruction contains address of next instruction. Low order 8 bits of new address transferred to ALU X REG via 1B, then X REG from ALU to CSAR via 2A. High order 4 bits of new address to CSAR via 1C.

Branch And Load X Register (BALX)

Instruction contains an address. Low order 8 bits of this address transferred to X REG via 1B, then Y REG transferred from ALU to CSAR via 2A. High order 4 bits of new address to CSAR via 1C.

Load X Register (LDX)

Instruction loads contents of a specified Local Store Register into MAR via 3C. Contents of this location sent to X REG via 4A. CSAR incremented by 1.

Store (ST)

Instruction loads contents of a specified L.S. Register into MAR via 3C. ALU output is then stored in this location. CSAR incremented by 1. Contents of X REG and Y REG are unchanged. Output of ALU specified by OP CODE which is part of this instruction.

Modify Register (MODR)

Contents of a specified LS (ES) register loaded into Y REG via 3B (3A). Contents of Y REG combined with X REG as specified by Op Code. Output of ALU returned to the same specified LS (ES) via 2C (2B). CSAR incremented by 1. Besides Standard Op Codes, incrementing by 1 or 2 or an end-around Shift Right available via ALU Modifier. X REG unchanged, Y REG is left with old contents of LS (ES) register.

Store Register (STRG)

Contents of ALU combined as specified by Op Code and ALU Modifier. Output of ALU stored in specified L.S. (E.S.) Register via 2C (2B) CSAR incremented by 1.

Set Bits 0-3 (SB03)

Instruction contains a 4-bit mask which is loaded into the low order 4 bits of X REG (Exception — MASK of 0000 does not modify X REG) via 1B. Contents of a specified L.S. (E.S.) register are loaded into Y REG via 3B (3A). Low order 4 bits of X REG combined per Op Code with low order 4 bits of Y REG in ALU. High Order 4 bits of Y REG are unchanged. Output of ALU returned to the same specified L.S. (E.S.) register via 2C (2B). CSAR incremented by 1.

Set bits 4-7 (SB47)

Same as SB03 except that the 4 high order bits are modified and low order 4 bits unchanged.

Skip on Bits 0-3 (SK03):

Contents of a specified LS (ES) register are stored in Y REG via 3B (3A). The instruction contains a MASK which is loaded into the low order 4 bits of X REG (Exception — MASK of 0000 does not modify X REG) via 1B. Low order 4 bits of X REG combined per Op Code with low order bits of Y REG. If the resulting 4 low order bits of the ALU contain any 1's, the CSAR is incremented by 2. If the 4 low order bits of the ALU contain all zeros, the CSAR is incremented by 1. The contents of the specified LS (ES) register remain unchanged. Exception — When "Exclusive-Or" is specified, CSAR is incremented by 2 if resulting low order bits of ALU contain all zero's.

Skip on Bits 4-7 (SK47)

Same as SK03 except masking and comparisons performed on 4 high order bits.

The various routines, using the microcontrol program unit, which effectively provide the same control of motor 500 as the above-described circuitry, are set forth hereinafter in Tables B to K; and the following information may be used for interpreting these tables:

THE LANGUAGE

Source language input to the microprogram assembler is described in mnemonic form below.

Comments

Comments are identified by an asterisk in column one. The actual comment may be located in columns 2-80 inclusive (e.g., Steps 1 through 51 are all comments).

FIELD DESCRIPTIONS

Labels

An entry, other than a comment, may contain a label. Labels may be one to six characters long, and must always begin with an alphabetic character in column one (e.g. Step 70 is labeled 'TSB'). The characters in columns two through six may be alphanumeric.

Operation Code (Op Code)

The op code must begin in column eight and may extend throough column 11.

Operand 1

Operand 1 must begin in column 13 and may extend through column 18.

Operand 2

Operand 2 must begin in column 20 and end in column 21 for all instructions except the BALX instruction. Operand 2 of a BALX instruction starts in column 20 and ends in column 23.

Operand 3

Operand 3 must begin in column 23, and end in column 24.

Comments

Comments may begin in column 26 and continue through column 80.

Operand Mnemonics

| Operand 1 | |
|---|---|
| MSM$h$ | Main Store Module $h$, where $h$ is a 0 or 1. Used in the LDX and ST instructions. |
| +0 | ALU modifier indicating that no modification is to be performed. |
| +1 | ALU modifier indicating that the ALU is to be incremented by one. |
| +2 | ALU modifier indicating that the ALU is to be incremented by 2. |
| SR1 | ALU modifier indicating that the ALU is to be shifted right one position. |
| +0, +1, +2 and SR1 are used in the MODR and STRG instructions. | |
| MASK=$m$ | A four bit mask, where $m$ is a hex digit 0-F. Used in the SB03, SB47, SK03, and SK47 instructions. |
| Label | Any valid step label. Used in BRU instruction. |

| Operand 2 | |
|---|---|
| CSM$h$ | Control Store Module $h$, where $h$ is a hex digit in the range 0 to F. Used in BALX instruction. |
| rr | Register specification given by two hex digits in the range of 00-3F to identify the sixty-four, one byte control unit registers. Used in LDX, ST, MODR, STRG, SB03, SB47, SK03 and SK47 instructions. |

| Operand 3 | |
|---|---|
| NO | No Operation in ALU. Output equals 00. |
| X | ALU output equals the $X$ Register. |
| Y | ALU output equals the $Y$ Register. |
| OR | ALU output equals the OR of the $X$ and $Y$ registers. |
| A | ALU output equals the And of the $X$ and $Y$ registers. |
| NY | ALU output equals the And of the $X$ register and the Not of the $Y$ register. |
| NX | ALU output equals the And of the Not of the $X$ Register and the $Y$ Register. |
| EO | ALU output equals the Exclusive OR of the $X$ register and the $Y$ register. |

NO, X, Y, OR, A, NY, NX and EO are known as ALU Control Parameters and are used in the ST, MODR, STRG, SB03, SB47, SK03 and SK47 instructions.

Instructions

Branch Unconditional (BRU)
Label Field — Any valid label
Op Code — BRU
Operand 1 — A defined label
Operands 2 & 3 — Blank
CommExample:
  HERE BRU THERE (instruction labeled HERE produces an unconditional branch to instruction labeled THERE).

Branch And Load X Register (BALX)
Label Field — Any valid label
Op Code — BALX
Operand 1 — A defined label
Operand 2 — CSM$h$
Operand 3 — Blank in last position
Example:
  THERE BALX HERE CSM1 (instruction labeled THERE creates unconditional branch to instruction HERE in C.S. module 1. 'HERE' remains in X REG).

Load X Register (LDX)
Label Field — Any valid label
Op Code — LDX
Operand 1 — MSM$h$ (specified Main Store Module being addressed)
Operand 2 — $rr$ (specifies L.S. register containing address)
Operand 3 — ALU Control
Example:
  LABEL 1 LDX MSM0 3E NO (instruction labeled LABEL loads XREG with contents of MSM0, location specified by contents of L.S. register 3E)

Store (ST)
Label Field — Any valid label
Op Code — ST
Operand 1 — MSM$h$ (specified Main Store Module being addressed)
Operand 2 — $rr$ (specified L.S. register containing address)
Operand 3 — ALU Control
Example:
  LABEL2 ST MSM1 3B NO (instruction labeled LABEL2 stores output of ALU "00" in MSM1 at location specified by L.S. register 3B)

Modify Register (MODR)
Label Field — Any valid label
Op Code — MODR
Operand 1 — ALU Modifier
Operand 2 — $rr$ (specifies L.S. or E.S. register being modified)
Operand 3 — ALU Control
Example:
  LABEL3 MODR +0 04 A (instruction labeled LABEL3 And's contents of register 04 with contents of XREG and returns result to register 04)

Store Register (STRG)
Label Field — Any valid label
Op Code — STRG
Operand 1 — ALU Modifier
Operand 2 — $rr$ (specified L.S. or E.S. register being stored)
Operand 3 — ALU Control
Example:
  LABEL4 STRG +0 OA X (instruction labeled LABEL4 stores contents of XREG in register OA)

Set Bits 0-3 (SB03)
Label Field — Any valid label
Op Code — SB03
Operand 1 — MASK=$m$
Operand 2 — $rr$ (specifies L.S. or E.S. register whose bits are to be set)
Operand 3 — ALU Control
Example:
  LABEL5 SB03 MASK=B 10 EO (instruction labeled LABEL5 Exclusive Or's bits 0-3 of register 10 with a mask=B. Bits 4-7 remain unmodified)

Set Bits 4-7 (SB47)
Label Field — Any valid label
Op Code — SB47
Operand 1 — MASK=$m$
Operand 2 — $rr$ (specifies L.S. or E.S. register whose bits are to be set)
Operand 3 — ALU Control
Example:
  LABEL6 SB47 MASK=7 23 A (instruction labeled LABEL6 And's bits 4-7 of register 23 with a mask=7. Bits 0-3 remain unmodified.)

Skip On Bits 0-3 (SK03)
Label Field — Any valid label
Op Code — SK03
Operand 1 — MASK=$m$
Operand 2 — rr (specifies L.S. or E.S. register being tested)
Operand 3 — ALU Control
Example:
  LABEL7 SK03 MASK=C 34 A (instruction labeled LABEL 7 And's bits 0-3 of register 34 with a mask=C, if result of this operation contains any one's, the next instruction is skipped, otherwise the next instruction is executed).

Skip On Bits 4-7 (SK47)
Label Field — Any valid label
Op Code — SK47
Operand 1 — MASK=$m$
Operand 2 — $rr$ (specifies L.S. or E.S. register being tested)
Operand 3 — ALU Control
Example:
  LABEL8 SK47 MASK=3 04 A (instruction labeled LABEL8 And's bits 4-7 of register 04 with a mask=3, if this results in any 1's, the next instruction is skipped. Otherwise the next instruction is executed).

End (END)
Label Field — Any valid label
Op Code — END
Operands 1, 2 and 3 — Blank The following Tables B to K set forth the various routines that may be used with the microcontrol program unit illustrated in FIG. 6 for providing substantially the same control of the motor 500 as is provided by the circuitry above-described, and the following Table A sets forth the register assignments that may be used in connection with these routines:

```
                  O
                  P
S
T  C       C
E  O       O     O         O  O
P  L       D     P         P  P
S  1       E     1         2  3    COMMENTS 0
1  ********************************************************************
2  *                                                                  *
3  *    DIGITAL/ANALOG CONTINUOUSLY POSITIONABLE STEPPER MOTOR CONTROL *
4  *                                                                  *
5  ********************************************************************
6  *                                                                  *
7  *    REGISTER ASSIGNMENTS                                          *
8  *                                                                  *
9  *      00   LOW ORDER 8 BITS OF MASTER POSITION COUNTER            *
10 *      01   HIGH ORDER 4 BITS OF MASTER POSITION COUNTER           *
11 *      02   STATUS BIT                                             *
12 *             BIT 5  DIGITAL MODE BIT (0= ANALOG  1=DIGITAL FINE HOME) *
13 *             BIT 7  MEMORY BIT (MONITORS ANALOG MODE DIR. CHANGES)*
14 *      03   BIT PATTERN FOR DESIRED TORQUE 0=NONE,1=CW,2=CCW       *
15 *      04   STATUS BITS                                            *
16 *             BIT 0  TWO BIT (PEAK OVERSHOOT OF TWO UNITS)         *
17 *             BIT 2  CL (CHANGE LIMIT) BIT                         *
18 *             BIT 3  FINE HOME MODE INDICATOR (1= FINE HOME MODE)  *
19 *             BIT 4  OO (ONCE ONLY) BIT -- CHANGE DIRECTION ONLY ONCE *
20 *             BIT 5  FTT (FIRST TIME THRU) BIT -- SET BY FIRST PULSE *
21 *                    AFTER INITIAL CHANGE OF DIRECTION             *
22 *             BIT 6  COAST BIT (TURNS OFF ALL DRIVERS)             *
23 *             BIT 7  DIRECTION BIT, INDICATES DIRECTION THAT DESIRED *
24 *                    POSITION WAS CROSSED                          *
25 *      05   FINE HOME MODE POSITION COUNTER (LIMITED CAPACITY)     *
26 *      08   STATUS BITS                                            *
27 *             BIT 0  READY-TO-PUNCH BIT                            *
28 *             BIT 4  SLEW MODE 'FLOAT' INDICATOR                   *
29 *             BIT 6  DRIVER CONTROL INDICATOR (1=CW,0=CCW)         *
30 *      09   SLEW COUNTER - COUNTS NUMBER OF POSITIONS TO BE MOVED  *
31 *      0F   DUMMY REGISTER USED FOR NO OP INSTRUCTIONS             *
32 *      11   BOUNDARY COUNTER                                       *
33 *      12   BOUNDARY COUNTER PLUS ONE                              *
34 *      13   ADDRESS REGISTER FOR MAIN STORE                        *
35 *             MSM0 = FF                                            *
36 *      14   USED FOR ADDRESSING MAIN STORE FOR LOADING SWITCH LIMIT*
37 *      27   INPUT REGISTER                                         *
38 *             BIT 0  START BIT INDICATOR                           *
39 *      30   INPUT REGISTER                                         *
40 *             BIT 2  OVERSPEED INDICATOR FROM EXTERNAL DEVICE      *
41 *             BIT 3  MOVE BIT - INDICATES EXTERNAL ACTUATOR READY FOR *
42 *                    NEXT MOVE                                     *
43 *             BIT 5  CCW INPUT BIT                                 *
44 *             BIT 6  SIGNAL (DIRECTION) BIT FROM ANALOG CONTROL,   *
45 *                    1=CW, 0=CCW TORQUE DESIRED                    *
46 *             BIT 7  CW INPUT BIT                                  *
47 *      3A   OUTPUT REGISTER                                        *
48 *             BIT 0  SIGNAL TO EXTERNAL ACTUATOR THAT MOVE IS COMPLETE *
49 *             BIT 1  DRIVER #1                                     *
50 *             BIT 2  DRIVER #2                                     *
51 *             BIT 3  DRIVER #3                                     *
52 *             BIT 4  SIGNAL TO ANALOG CONTROLLER TO TAKE OVER      *
53 *                                                                  *
54 ********************************************************************
```

TABLE A

| STEPS | OP CODE 1 | OP CODE 1 | OP 2 | OP 3 | COMMENTS |
|---|---|---|---|---|---|
| 55 | ************************************************************** | | | | |
| 56 | * | | | | * |
| 57 | * INITIALIZATION ROUTINE - INITIALIZE REGISTERS | | | | * |
| 58 | * | | | | * |
| 59 | ************************************************************** | | | | |
| 60 | MODR | +0 | 00 | NO | CLEAR REGISTER 00 |
| 61 | SB47 | MASK=C | 3A | X | SET THE READY TO PUNCH BIT & ANALOG CNTRL. BIT |
| 62 | MODR | +0 | 01 | NO | CLEAR REGISTER 01 |
| 63 | MODR | +0 | 02 | NO | CLEAR REG 02 |
| 64 | MODR | +0 | 03 | NO | RESET REG 3 |
| 65 | MODR | +1 | 03 | Y | INCREMENT REG 3 |
| 66 | MODR | +0 | 04 | NO | CLEAR REG 4 |
| 67 | MODR | +0 | 05 | NO | CLEAR REG 5 |
| 68 | SB03 | MASK=1 | 3A | X | TURN ON COIL 1 |
| 69 | MODR | +0 | 08 | NO | CLEAR REG 8 |
| 70 | MODR | +0 | 09 | NO | CLEAR REG 9 |
| 71 | MODR | +0 | 11 | NO | CLEAR REGISTER 11 |
| 72 | MODR | +0 | 12 | NO | RESET REG 12 |
| 73 | MODR | +1 | 12 | Y | INCREMENT REGISTER 12 |
| 74 | SB47 | MASK=F | 13 | X | SET REG 13 TO FF   LO ORDER BITS |
| 75 | SB03 | MASK=F | 13 | X | SAME - HI ORDER BITS |
| 76 | MODR | +0 | 13 | Y | PLACE CONTENTS OF REG 13 IN Y REG |
| 77 | ST | MSM0 | 13 | Y | STORE CONTENTS OF Y REG IN MAIN STORE FF |
| 78 | SB47 | MASK=E | 14 | X | PRESET REG 14 TO FE |
| 79 | SB03 | MASK=F | 14 | X | SAME |
| 80 | MODR | +0 | 27 | NO | CLEAR REGISTER 27 |
| 81 | MODR | +0 | 30 | NO | CLEAR REGISTER 30 |
| 82 TSB | SK03 | MASK=8 | 27 | A | TEST FOR START BIT ON |
| 83 | BRU | TSB | | | NO/BRANCH TO TEST START BIT |
| 84 | MODR | +0 | 27 | NO | YES/CLEAR REG 27 |

TABLE B

| STEPS | COL1 | OPCODE | OP1 | OP2 | OP3 | COMMENTS |
|---|---|---|---|---|---|---|
| 85 | ************************************************************************** |
| 86 | * | | | | | |
| 87 | * | TEST INPUT BIT ROUTINE -- CHECKS FOR PRESENCE OF A CW OR CCW * |
| 88 | * | INPUT BIT AND TAKES APPROPRIATE ACTION. ALSO CHECK FOR * |
| 89 | * | OVERSPEED CONDITION TO PREVENT ENCODER BEING OVERDRIVEN: * |
| 90 | * | | | | | |
| 91 | ************************************************************************** |
| 92 | TBR | SK03 | MASK=2 | 30 | A | TEST FOR OVER SPEED CONDITION |
| 93 |  | BRU | LOOP |  |  | NOT OVERSPEED/BRANCH TO LOOP |
| 94 |  | SB03 | MASK=D | 30 | A | OVERSPEED/RESET OVERSPEED BIT |
| 95 |  | SB03 | MASK=8 | 3A | A | RESET ALL DRIVER BITS |
| 96 | LOOP | SK47 | MASK=5 | 30 | A | TEST FOR BITS 5,6,OR 7 ON IN REG 30 |
| 97 |  | BRU | NVT |  |  | BRANCH TO NEW VALUE TEST |
| 98 |  | SK47 | MASK=1 | 30 | NY | ANY ON?/ IS CW BIT ON? |
| 99 |  | BRU | INCR |  |  | YES - BRANCH TO INCREMENT ROUTINE |
| 100 |  | BRU | DECR |  |  | NO - BRANCH TO DECREMENT ROUTINE |
| 101 | NVT | SK03 | MASK=1 | 30 | A | TEST FOR MOVE BIT ON |
| 102 |  | BRU | ANALG |  |  | NO/BRANCH TO ANALOG CHECK |
| 103 |  | SB47 | MASK=8 | 3A | OR | YES/SET ANALOG HOLD BIT |
| 104 |  | SB47 | MASK=2 | 08 | OR | SET DRIVER CONTROL SELECT BIT FOR CW |
| 105 |  | SB47 | MASK=8 | 08 | OR | SET SLU FLOAT BIT |
| 106 |  | MODR | +0 | 04 | NO | CLEAR REG 4 - STATUS BITS |
| 107 |  | SB03 | MASK=E | 30 | A | RESET MOVE BIT |
| 108 |  | SB47 | MASK=4 | 02 | OR | SET DIGITAL FINE HOME MODE BIT |
| 109 |  | BRU | XXX |  |  | BRANCH TO XXX |
| 110 | ANALG | SK03 | MASK=1 | 04 | A | FINE HOME MODE? |
| 111 |  | BRU | LOOP |  |  | NO/BRANCH TO LOOP |
| 112 |  | SK47 | MASK=1 | 02 | A | MEMORY BIT ON OR OFF LAST TIME? |
| 113 |  | BRU | A1 |  |  | OFF/BRANCH TO A1 |
| 114 |  | SK47 | MASK=2 | 30 | A | IS SIGNAL BIT ON OR OFF THIS TIME? |
| 115 |  | BRU | A2 |  |  | OFF/BRANCH TO A2 |
| 116 |  | SB47 | MASK=D | 30 | A | RESET SIGNAL BIT |
| 117 |  | SB47 | MASK=1 | 02 | OR | SET MEMORY BIT |
| 118 |  | BRU | LOOP |  |  | BRANCH TO LOOP |
| 119 | A2 | SB47 | MASK=2 | 03 | X | SELECT CCW TORQUE |
| 120 |  | SB47 | MASK=E | 02 | A | RESET MEMORY BIT |
| 121 |  | BRU | LDB |  |  | BRANCH TO LOAD DRIVER BITS |
| 122 | A1 | SK47 | MASK=2 | 30 | A | IS SIGNAL BIT ON OR OFF? |
| 123 |  | BRU | A3 |  |  | OFF/BRANCH TO A3 |
| 124 |  | SB47 | MASK=D | 30 | A | ON/RESET SIGNAL BIT |
| 125 |  | SB47 | MASK=1 | 02 | OR | SET THE MEMORY BIT |
| 126 |  | SB47 | MASK=1 | 03 | X | SELECT CW TORQUE |
| 127 |  | BRU | LDB |  |  | BRANCH TO LOAD DRIVER BITS |
| 128 | A3 | SB47 | MASK=E | 02 | A | RESET MEMORY BIT |
| 129 |  | BRU | LOOP |  |  |  |

TABLE C

```
                  O
                  P
    S
    T  C          C
    E  O          O            O   O
    P  L    O     P            P   P
    S  1    D     1            2   3      COMMENTS
            E

130 ****************************************************************************
    131 *                                                                           *
    132 *        CW ROTATION, INCREMENT MASTER POSITION COUNTER AND BOUNDARY        *
    133 *                          COUNTER                                          *
    134 *                                                                           *
    135 ****************************************************************************
    136 INCR   MODR +1        09 Y    INCREMENT SLU COUNTER
    137        SK47 MASK=F    00 EO   DO THE X BITS EQUAL F?
    138        BRU  IR0               NO/ BRANCH TO INCREMENT REG 00
    139        SK03 MASK=F    00 EO   YES/TEST Y BITS FOR F
    140        BRU  IR0               NO/ BRANCH TO INCR REG 00 ROUTINE
    141        MODR +1        01 Y    YES/ INCREMENT REG 01
    142        MODR +0        00 NO   RESET REG 00
    143        BRU  CLR               BRANCH TO CLEAR ROUTINE
    144 IR0    MODR +1        00 Y    INCR REG 00
    145        SK47 MASK=E    01 EO   DO Z BITS EQUAL MAX VALUE?
    146        BRU  CLR               NO/ BRANCH TO CLEAR ROUTINE
    147        SK03 MASK=1    00 EO   YES/DO Y BITS EQUAL MAX VALUE?
    148        BRU  CLR               NO/BRANCH TO CLEAR ROUTINE
    149        SK47 MASK=F    00 A    YES/DO X BITS EQUAL MAX VALUE?
    150        BRU  ZERO              YES/BRANCH TO ZERO ROUTINE
    151        BRU  CLR               NO/BRANCH TO CLEAR ROUTINE
    152 ZERO   MODR +0        00 NO   CLEAR POSITION COUNTER - LO BITS
    153        MODR +0        01 NO   SAME - HI BITS
    154 CLR    MODR +0        0F Y    NO OPERATION
    155        SB47 MASK=2    08 OR   SET DRIVER CONTROL SELECT BIT
    156        SB47 MASK=E    30 A    RESET INPUT BITS
    157        LDX  MSM0      12 NO   LOAD X AND Y BITS OF CW BOUNDARY
    158        SK47 MASK=0    00 EO   DO X BITS MATCH?
    159        BRU  TBC               NO/BRANCH TO TEST BOUNDARY COUNTER
    160        SK03 MASK=0    00 EO   YES/ DO Y BITS MATCH?
    161        BRU  TBC               NO/BRANCH TO TEST BOUNDARY COUNTER
    162        LDX  MSM0      11 NO   YES/ LOAD Z AND DRIVER BITS
    163        SK47 MASK=0    01 EO   DO Z BITS MATCH?
    164        BRU  TBC               NO/BRANCH TO TEST BOUNDARY COUNTER
    165        MODR +2        11 Y    YES/INCREMENT BOUNDARY COUNTER
    166        MODR +2        12 Y    INCREMENT BC+1
    167        BRU  FHCW              BRANCH TO FINE HOME CW
    168 TBC    SK47 MASK=F    11 A    TEST BC FOR 144    LO ORDER BITS
    169        BRU  BB                YES   BRANCH TO BB - TEST HI ORDER BITS
    170        BRU  FHCW              NO/BRANCH TO FINE HOME CW
    171 BB     SK03 MASK=9    11 EO     TEST BC FOR 144  HI ORDER BITS
    172        BRU  FHCW              NO/BRANCH TO FINE HOME CW
    173        MODR +0        11 NO   YES/RESET BC
    174        MODR +0        12 NO   RESET  BC+1
    175        MODR +1        12 Y    SAME
    176 FHCW   SK03 MASK=1    04 A    FINE HOME MODE?
    177        BRU  SLU               NO/BRANCH TO SLEW CHECK
```

TABLE D

| STEP | C O L 1 | O P C O D E | O P 1 | O P 2 | O P 3 | COMMENTS |
|---|---|---|---|---|---|---|
| 178 | ************************************************************************ |
| 179 | * | | | | | * |
| 180 | * | | FINE HOME MODE | - | CLOCKWISE ROTATION | * |
| 181 | * | | | | | * |
| 182 | ************************************************************************ |
| 183 | | SK47 | MASK=4 | 02 | A | YES/DIGITAL FINE HOME MODE? |
| 184 | | BRU | CWDC1 | | | NO/ BRANCH |
| 185 | | SK03 | MASK=F | 09 | A | YES/CHECK FOR MATCH WITH DESIRED POSITION |
| 186 | | BRU | TCXB | | | HI ORDER BITS 0, TEST/CHECK LO ORDER (X) BITS |
| 187 | | BRU | FLCK | | | NO/BRANCH TO FLOAT CHECK |
| 188 | TCXB | SK47 | MASK=F | 09 | A | DO LO ORDER BITS EQUAL ZERO? |
| 189 | | BRU | RFHPC | | | YES/BRANCH TO RESET FINE HOME POS. COUNTER |
| 190 | | BRU | FLCK | | | NO/BRANCH TO FLOAT CHECK |
| 191 | RFHPC | MODR | +0 | 05 | NO | YES/RESET FHPC |
| 192 | | SB47 | MASK=D | 04 | OR | SET DIRECTION, FTT AND OO STATUS BITS |
| 193 | | SB47 | MASK=2 | 03 | X | SET TORQUE TO CCW |
| 194 | | BRU | CWDC | | | BRANCH TO CW DRIVER CONTROL |
| 195 | FLCK | SK47 | MASK=8 | 04 | A | IS THE ONCE ONLY BIT ON? |
| 196 | | BRU | ACT | | | NO/BRANCH TO ACT |
| 197 | | SK47 | MASK=1 | 04 | NY | TEST DIRECTION BIT FOR CCW |
| 198 | | BRU | PS | | | NO/BRANCH TO POSITIVE SLOPE ROUTINE |
| 199 | ENT | SK47 | MASK=4 | 04 | A | YES/IS THIS THE FIRST TIME THRU? |
| 200 | | BRU | NFT | | | NO/BRANCH TO NOT FIRST TIME |
| 201 | | SK47 | MASK=E | 05 | A | YES/DO LO ORDER BITS OF FHPC=1 OR 0 |
| 202 | | BRU | HOBT | | | YES/BRANCH |
| 203 | | BRU | TFT | | | NO/BRANCH TO TFT |
| 204 | HOBT | SK03 | MASK=F | 05 | A | DO HI ORDER BITS OF FHPC=0? |
| 205 | | BRU | SNT | | | YES/BRANCH TO SELECT NO TORQUE |
| 206 | TFT | SK47 | MASK=2 | 05 | EO | DO LO ORDER BITS OF FHPC=2? |
| 207 | | BRU | CSL | | | NO/BRANCH TO CALC SWITCH LIM |
| 208 | | SK03 | MASK=F | 05 | A | YES/DO HI ORDER BITS =0? |
| 209 | | BRU | SET2 | | | YES/BRANCH TO SET 2 |
| 210 | | BRU | CSL | | | BRANCH TO CALC SW LIM |
| 211 | SET2 | SB03 | MASK=8 | 04 | OR | SET TWO BIT |
| 212 | | MODR | +0 | 05 | NO | SET SW LIM = 0 |
| 213 | | MODR | +1 | 05 | Y | SET SW LIM =1 |
| 214 | | MODR | +0 | 05 | Y | LOAD SW LIM INTO Y REG |
| 215 | | ST | MSM0 | 14 | Y | LOAD SW LIM INTO MAIN STORE |
| 216 | | BRU | ART | | | BRANCH TO ART |
| 217 | SNT | MODR | +0 | 03 | NO | SELECT NO TORQUE |
| 218 | CSL | MODR | SR1 | 05 | NO | NO/DIVIDE FHPC BY 2 |
| 219 | | SB03 | MASK=7 | 05 | A | CLEAR HI ORDER BIT |
| 220 | | MODR | +0 | 05 | Y | LOAD SW LIMIT INTO X REG |
| 221 | | ST | MSM0 | 14 | Y | LOAD SW LIMIT INTO MAIN STORE |
| 222 | | SK47 | MASK=1 | 05 | EO | DO LO ORDER BITS OF SW LIMIT =1? |
| 223 | | BRU | ISB1 | | | NO/BRANCH |
| 224 | | SK03 | MASK=F | 05 | A | YES/DO HI ORDER BITS OF SW LIMIT =0? |
| 225 | | BRU | ART | | | YES/BRANCH |
| 226 | ISB | SB47 | MASK=9 | 04 | A | NO/RESET COAST AND FTT BITS |
| 227 | | MODR | +0 | 05 | NO | CLEAR FHPC |
| 228 | | MODR | +1 | 05 | Y | INCREMENT FHPC |
| 229 | | BRU | CWDC | | | BRANCH TO CW DRIVER CONTROL |
| 230 | ART | SB47 | MASK=3 | 03 | X | SELECT BOTH TORQUES |
| 231 | | SB03 | MASK=2 | 04 | OR | SET CL BIT |
| 232 | | BRU | ISB | | | BRANCH |
| 233 | ISB1 | SB47 | MASK=1 | 03 | X | SELECT CW TORQUE |
| 234 | | BRU | ISB | | | |
| 235 | NFT | MODR | +1 | 05 | Y | INCREMENT FHPC |
| 236 | | SK47 | MASK=2 | 04 | A | IS THE COAST BIT ON? |
| 237 | | BRU | RT | | | NO/BRANCH TO REVERSE TORQUE |

TABLE E-1

| STEPS | COL1 | OPCODE | OP1 | OP2 | OP3 | COMMENTS |
|---|---|---|---|---|---|---|
| 238 |  | SB47 | MASK=2 | 03 | X | YES/SELECT CCW TORQUE |
| 239 |  | LDX | MSM0 | 14 | NO | LOAD SWITCH LIMIT X REG |
| 240 |  | SK47 | MASK=0 | 05 | EO | DO LO ORDER BITS MATCH? |
| 241 |  | BRU | CWDC |  |  | NO/BRANCH TO SET CW DRIVER CONTROL |
| 242 |  | SK03 | MASK=0 | 05 | EO | YES/DO HI ORDER BITS MATCH? |
| 243 |  | BRU | CWDC |  |  | NO/BRANCH TO CW DRIVER CONTROL |
| 244 |  | MODR | +0 | 03 | NO | YES/SELECT NO TORQUE |
| 245 |  | BRU | CWDC |  |  | BRANCH TO CW DRIVER CONTROL |
| 246 | RT | SK03 | MASK=2 | 04 | A | IS THE CL BIT ON? |
| 247 |  | BRU | DD |  |  | NO/BRANCH TO DD |
| 248 |  | SB47 | MASK=2 | 03 | X | YES/SELECT CCW TORQUE |
| 249 |  | SB03 | MASK=D | 04 | A | RESET CL BIT |
| 250 |  | SB47 | MASK=2 | 04 | OR | SET COAST BIT |
| 251 |  | MODR | +0 | 05 | NO | CLEAR FHPC |
| 252 |  | BRU | CWDC |  |  | BRANCH TO CWDC |
| 253 | DD | LDX | MSM0 | 14 | NO | LOAD SWITCH LIMIT FROM MAIN STORE FOR COMPARE |
| 254 |  | SK47 | MASK=0 | 05 | EO | DO LO ORDER BITS MATCH? |
| 255 |  | BRU | CWDC |  |  | NO/BRANCH TO CWDC |
| 256 |  | SK03 | MASK=0 | 05 | EO | YES/DO HI ORDER BITS MATCH? |
| 257 |  | BRU | CWDC |  |  | NO/BRANCH TO CWDC |
| 258 |  | SB47 | MASK=3 | 03 | X | YES/SELECT BOTH TORQUES |
| 259 |  | SB03 | MASK=2 | 04 | OR | SET CL BIT |
| 260 |  | BRU | CWDC |  |  | BRANCH TO CW DRIVER CONTROL |
| 261 | PS | MODR | +1 | 05 | Y | INCREMENT FHPC |
| 262 |  | SB47 | MASK=2 | 03 | X | SELECT CCW TORQUE |
| 263 |  | SK47 | MASK=4 | 04 | NY | IS THE FTT BIT OFF? |
| 264 |  | BRU | CWDC |  |  | NO/BRANCH TO CWDC |
| 265 |  | SB47 | MASK=7 | 04 | A | YES/RESET THE OO BIT |
| 266 |  | BRU | CWDC |  |  | BRANCH TO CWDC |
| 267 | ACT | SK47 | MASK=1 | 04 | A | DOES DIRECTION BIT SHOW CW? |
| 268 |  | BRU | NOW |  |  | NO/BRANCH TO NOW |
| 269 |  | SB47 | MASK=2 | 03 | X | YES/SELECT CCW TORQUE |
| 270 |  | BRU | CWDC1 |  |  | BRANCH TO CWDC |
| 271 | NOW | SB47 | MASK=1 | 03 | X | SELECT CW TORQUE |
| 272 |  | BRU | CWDC1 |  |  | BRANCH TO CWDC |
| 273 | SLU | SK03 | MASK=C | 09 | EO | CHECK FOR MATCH WITH DESIRED POS.- Y BITS |
| 274 |  | BRU | TURN |  |  | NO/BRU TO TURN TORQUE AROUND |
| 275 |  | SK47 | MASK=8 | 09 | EO | CHECK FOR MATCH WITH DESIRED POS. - X BITS |
| 276 |  | BRU | TURN |  |  | NO/BRU TO TURN TORQUE |
| 277 |  | MODR | +0 | 09 | NO | YES/RESET SLU POSITION COUNTER |
| 278 |  | SB47 | MASK=7 | 3A | A | RESET ANALOG HOLD BIT |
| 279 |  | SB47 | MASK=D | 04 | X | SET STATUS BITS |
| 280 |  | SB47 | MASK=7 | 08 | A | RESET SLU FLOAT BIT |
| 281 |  | SB03 | MASK=1 | 04 | X | SET FHM BIT |
| 282 |  | MODR | +0 | 05 | NO | RESET FHPC |
| 283 |  | SB47 | MASK=2 | 03 | X | SELECT CCW TORQUE |
| 284 |  | SB03 | MASK=8 | 08 | OR | SET READY-TO-PUNCH BIT |
| 285 |  | BRU | CWDC |  |  | BRANCH TO CWDC |
| 286 | XXX | SK47 | MASK=2 | 08 | A | WHAT DIRECTION WAS THE INCOMING BIT? |
| 287 |  | BRU | ACT2 |  |  | CCW/BRANCH TO ACT2 |
| 288 |  | BRU | ACT |  |  | CW/BRANCH TO ACT |
| 289 | TURN | SK03 | MASK=B | 09 | EO | HAS REV.TORQUE POINT BEEN REACHED? |
| 290 |  | BRU | AFLT |  |  | NO/BRANCH TO ANTI-FLOAT |
| 291 |  | SB47 | MASK=2 | 03 | X | YES/SELECT CCW TORQUE |
| 292 |  | SB47 | MASK=7 | 08 | A | RESET SLU FLOAT BIT |
| 293 |  | SB03 | MASK=D | 30 | A | RESET OVERSPEED BIT |
| 294 | AFLT | SK47 | MASK=8 | 08 | A | IS THE SLU FLOAT BIT ON? |
| 295 |  | BRU | CWDC |  |  | NO/BRANCH TO CWDC |
| 296 |  | BRU | ACT |  |  | YES/BRANCH TO ACT |

TABLE E-2

| STEPS | COL1 | CODE | OPD E | OP 1 | OP 2 | OP 3 | COMMENTS |
|---|---|---|---|---|---|---|---|
| 297 | \*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\* | | | | | | |
| 298 | \* | | | | | | \* |
| 299 | \* | | DRIVER SELECT CONTROL - RESPONDS TO TORQUE COMMANDS AND POSITION | | | | | \* |
| 300 | \* | | | INFORMATION | | | | \* |
| 301 | \* | | | | | | | \* |
| 302 | \*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\* | | | | | | |
| 303 | CWDC | SK47 | MASK=2 | 08 | A | | CHECK DRIVER CONTROL BIT FOR PROPER ROUTINE |
| 304 | | BRU | CCWDC | | | | BIT OFF/ BRANCH TO CCW DRIVER CONTROL |
| 305 | CWDC1 | MODR | +0 | 0F | Y | | NO OPERATION |
| 306 | LDB | SK47 | MASK=1 | 03 | A | | WHICH TORQUE IS DESIRED ? |
| 307 | | BRU | CND | | | | CCW OR NONE |
| 308 | | LDX | MSM0 | 11 | NO | | CW / LOAD CW DRIVER BITS |
| 309 | | SB03 | MASK=0 | 3A | X | | SAME |
| 310 | | SK47 | MASK=2 | 03 | A | | CCW ALSO? |
| 311 | | BRU | TBR | | | | NO/BRANCH TO TBR |
| 312 | | LDX | MSM1 | 11 | NO | | YES/LOAD CCW DRIVER BITS |
| 313 | | SB03 | MASK=0 | 3A | OR | | ADD CCW AND CW DRIVER BITS |
| 314 | | BRU | TBR | | | | BRANCH TO TBR |
| 315 | CND | SK47 | MASK=2 | 03 | A | | CCW OR NONE? |
| 316 | | BRU | OFF | | | | NONE |
| 317 | | LDX | MSM1 | 11 | NO | | CCW / LOAD CCW DRIVER BITS |
| 318 | | SB03 | MASK=0 | 3A | X | | SAME |
| 319 | | BRU | TBR | | | | BRANCH TO TEST BIT ROUTINE |
| 320 | OFF | SB03 | MASK=8 | 3A | A | | RESET ALL DRIVER BITS |
| 321 | | BRU | TBR | | | | BRANCH TO TEST BIT ROUTINE |

TABLE F

| STEPS | LABEL | OP CODE | OP 1 | OP 2 | OP 3 | COMMENTS |
|---|---|---|---|---|---|---|
| 322 | ********************************************************************** |
| 323 | * | | | | | * |
| 324 | * | CCW ROTATION - DECREMENT MASTER POSITION COUNTER AND BOUNDARY | | | | * |
| 325 | * | COUNTER | | | | * |
| 326 | * | | | | | * |
| 327 | ********************************************************************** |
| 328 | DECR | LDX | MSM0 | 13 NO | | DECREMENT SLU COUNTER |
| 329 | | MODR | +0 | 09 EO | | SAME |
| 330 | | MODR | +1 | 09 Y | | SAME |
| 331 | | MODR | +0 | 09 EO | | SAME |
| 332 | | SK47 | MASK=F | 00 A | | TEST X BITS FOR 0 |
| 333 | | BRU | CYB | | | YES/BRANCH TO CHECK Y BITS |
| 334 | | BRU | DR0 | | | NO/BRANCH TO DECREMENT REG 00 |
| 335 | CYB | SK03 | MASK=F | 00 A | | CHECK Y BITS FOR 0 |
| 336 | | BRU | CZB | | | YES/BRANCH TO CHECK Z BITS |
| 337 | DR0 | SB47 | MASK=F | 00 EO | | NO / DECREMENT REG 00 - COMPLIMENT X BITS |
| 338 | | SB03 | MASK=F | 00 EO | | COMPLIMENT Y BITS |
| 339 | | MODR | +1 | 00 Y | | INCREMENT REGISTER 00 |
| 340 | | SB47 | MASK=F | 00 EO | | COMPLIMENT X BITS |
| 341 | | SB03 | MASK=F | 00 EO | | COMPLIMENT Y BITS |
| 342 | | BRU | RST | | | BRANCH TO RESET INPUT BITS |
| 343 | CZB | SK47 | MASK=F | 01 A | | CHECK Z BITS FOR 0 |
| 344 | | BRU | PRE | | | YES/BRANCH TO PRESET ROUTINE |
| 345 | | SB47 | MASK=F | 01 EO | | NO / COMPLIMENT Z BITS |
| 346 | | MODR | +1 | 01 Y | | INCREMENT REGISTER 01 |
| 347 | | SB47 | MASK=F | 01 EO | | COMPLIMENT Z BITS |
| 348 | | SB47 | MASK=F | 00 OR | | SET X BITS TO F |
| 349 | | SB03 | MASK=F | 00 OR | | SET Y BITS TO F |
| 350 | | BRU | RST | | | BRANCH TO RESET INPUT BITS |
| 351 | PRE | SB47 | MASK=F | 00 OR | | PRESET COUNT - SET X BITS TO F |
| 352 | | SB47 | MASK=E | 01 OR | | SET Z BITS TO E |
| 353 | RST | SB47 | MASK=B | 30 A | | RESET CCW AND HOME BITS |
| 354 | | SB47 | MASK=D | 08 A | | CLEAR DRIVER CONTROL BIT |
| 355 | | LDX | MSM1 | 12 NO | | LOAD X AND Y BITS OF CCW BOUNDARY |
| 356 | | SK47 | MASK=0 | 00 EO | | DO X BITS MATCH? |
| 357 | | BRU | CBC | | | NO/BRANCH TO CHECK BOUNDARY COUNTER |
| 358 | | SK03 | MASK=0 | 00 EO | | YES/DO Y BITS MATCH? |
| 359 | | BRU | CBC | | | NO/BRANCH TO CHECK BOUNDARY COUNTER |
| 360 | | LDX | MSM1 | 11 NO | | YES/LOAD Z AND DRIVER BITS |
| 361 | | SK47 | MASK=0 | 01 EO | | DO Z BITS MATCH? |
| 362 | | BRU | CBC | | | NO/BRANCH TO CHECK BOUNDARY COUNTER |
| 363 | | LDX | MSM0 | 13 NO | | YES/DECREMENT BOUNDARY COUNTER ROUTINE |
| 364 | | MODR | +0 | 11 EO | | COMPLIMENT BC |
| 365 | | MODR | +2 | 11 Y | | INCREMENT BC |
| 366 | | MODR | +0 | 11 EO | | COMPLIMENT BC |
| 367 | | MODR | +0 | 12 EO | | COMPLIMENT BC+1 |
| 368 | | MODR | +2 | 12 Y | | INCREMENT |
| 369 | | MODR | +0 | 12 EO | | COMPLIMENT BC+1 |
| 370 | | BRU | FHCCW | | | BRANCH TO FINE HOME CCW |
| 371 | CBC | SK47 | MASK=F | 11 A | | TEST BC FOR 00 LOW ORDER BITS |
| 372 | | BRU | CHB | | | BRANCH TO CHECK HI ORDER BITS ROUTINE |
| 373 | | BRU | FHCCW | | | BRANCH TO FINE HOME CCW |
| 374 | CHB | SK03 | MASK=F | 11 A | | TEST BC FOR 00 HI ORDER BITS |
| 375 | | BRU | RRR | | | BRANCH TO RESET REGISTER ROUTINE |
| 376 | | BRU | FHCCW | | | BRANCH TO FINE HOME CCW |
| 377 | RRR | SB47 | MASK=F | 11 NX | | SET BC TO MAX   LO ORDER BITS |
| 378 | | SB03 | MASK=9 | 11 X | | SAME    HI ORDER BITS |
| 379 | | SB47 | MASK=1 | 12 X | | SET BC+1 TO MAX   LO ORDER BITS |
| 380 | | SB03 | MASK=9 | 12 X | | SAME    HI ORDER BITS |

TABLE G

| STEPS | OP COL 1 | OP CODE | OP 1 | OP 2 | OP 3 | COMMENTS |
|---|---|---|---|---|---|---|
| 381 | \*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\* | | | | | |
| 382 | * | | | | | * |
| 383 | * | FINE HOME MODE - CCW ROTATION | | | | * |
| 384 | * | | | | | * |
| 385 | \*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\* | | | | | |
| 386 FHCCW | SK03 | MASK=1 | 04 | A | | FINE HOME MODE? |
| 387 | BRU | AFLT2 | | | | NO/BRANCH TO SLU MODE ANTI FLOAT CONTROL |
| 388 | SK47 | MASK=4 | 02 | A | | YES/DIGITAL FINE HOME MODE? |
| 389 | BRU | CWDC1 | | | | NO/ BRANCH TO CWDC1 |
| 390 | SK03 | MASK=F | 09 | EO | | YES/CHECK FOR DESIRED POS,Y BITS = F ? |
| 391 | BRU | FLCK2 | | | | DON'T MATCH/BRANCH TO FLOAT CHECK |
| 392 | SK47 | MASK=F | 09 | EO | | MATCH/DO X BITS = F ? |
| 393 | BRU | FLCK2 | | | | DON'T MATCH/BRANCH TO FLOAT CHECK |
| 394 | MODR | +0 | 05 | NO | | YES/RESET FHPC |
| 395 | SB47 | MASK=B | 02 | A | | RESET DIGITAL FINE HOME MODE BIT |
| 396 | SB47 | MASK=C | 04 | OR | | SET FTT AND OO STATUS BITS |
| 397 | SB47 | MASK=E | 04 | A | | CLEAR DIRECTION BIT |
| 398 | SB47 | MASK=2 | 03 | X | | SELECT CCW TORQUE |
| 399 | SK03 | MASK=8 | 08 | A | | IS THE READY-TO-PUNCH BIT ON? |
| 400 | BRU | CWDC | | | | NO/BRANCH TO CW DRIVER CONTROL |
| 401 | SB47 | MASK=B | 3A | A | | YES/RESET PUNCH BIT - EXTERNAL |
| 402 | SB03 | MASK=7 | 08 | A | | RESET THE READY-TO-PUNCH BIT |
| 403 | SB47 | MASK=4 | 3A | OR | | SET EXTERNAL PUNCH BIT |
| 404 | BRU | CWDC | | | | BRANCH TO CW DRIVER CONTROL |
| 405 FLCK2 | SK47 | MASK=8 | 04 | A | | IS THE ONCE ONLY BIT ON? |
| 406 | BRU | ACT2 | | | | NO/BRANCH TO ACT(CONTINUOUS CW TORQUE) |
| 407 | SK47 | MASK=1 | 04 | A | | IS DIRECTION BIT ON(CW)? |
| 408 | BRU | PS | | | | NO/BRANCH TO POSITIVE SLOPE ROUTINE |
| 409 | BRU | ENT | | | | YES/BRANCH TO ENTRY PT. IN FINE HOME ROUTINE |
| 410 AFLT2 | SB47 | MASK=8 | 08 | OR | | SET THE SLU FLOAT BIT |
| 411 ACT2 | SK47 | MASK=1 | 04 | A | | DOES DIRECTION BIT SHOW CW? |
| 412 | BRU | NOW2 | | | | NO/BRANCH TO NOW |
| 413 | SB47 | MASK=1 | 03 | X | | YES/SELECT CW TORQUE |
| 414 | BRU | CCWDC | | | | BRANCH TO CCW DRIVER CONTROL |
| 415 NOW2 | SB47 | MASK=2 | 03 | X | | SELECT CCW TORQUE |

TABLE H

| STEPS | OP COL 1 | OP CODE | OP 1 | OP 2 | OP 3 | COMMENTS |
|---|---|---|---|---|---|---|
| 416 | \*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\* | | | | | |
| 417 | * | | | | | * |
| 418 | * | DRIVER SELECT CONTROL -- COUNTERCLOCKWISE ROTATION | | | | * |
| 419 | * | | | | | * |
| 420 | \*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\* | | | | | |
| 421 CCWDC | SK47 | MASK=2 | 03 | A | | WHICH DIRECTION IS DESIRED |
| 422 | BRU | LCW | | | | BRANCH TO LOAD CW - CW OR NONE |
| 423 | LDX | MSM10 | 11 | NO | | CCW/LOAD CCW DRIVER BITS |
| 424 | SB03 | MASK=0 | 3A | X | | SAME |
| 425 | SK47 | MASK=1 | 03 | A | | CW ALSO? |
| 426 | BRU | TBR | | | | NO/BRANCH TO TBR |
| 427 | LDX | MSM1 | 11 | NO | | YES/LOAD CW DRIVER BITS |
| 428 | SB03 | MASK=0 | 3A | OR | | ADD CW AND CCW DRIVER BITS |
| 429 | BRU | TBR | | | | BRANCH TO TBR |
| 430 LCW | SK47 | MASK=1 | 03 | A | | CW OR NONE? |
| 431 | BRU | OFF | | | | BRANCH TO OFF ROUTINE - NONE |
| 432 | LDX | MSM1 | 11 | NO | | LOAD CW BITS |
| 433 | SB03 | MASK=0 | 3A | X | | LOAD CW BITS |
| 434 | BRU | TBR | | | | BRANCH TO TEST BIT ROUTINE |

TABLE I

| STEPS 1 | OP CODE | OP 1 | OP 2 | OP 3 | COMMENTS |
|---|---|---|---|---|---|
| 435 | ************************************************************** |
| 436 | * | | | | * |
| 437 | * THE FOLLOWING TWO SUBPROGRAMS ARE USED TO LOAD DRIVE CONTROL | | | | * |
| 438 | * INFORMATION INTO MAIN STORE FOR USE BY DRIVER SWITCHING ROUTINES | | | | * |
| 439 | * | | | | * |
| 440 | * REGISTER 10 - COUNTER FOR LOADING MAIN STORE WITH DATA | | | | * |
| 441 | * REGISTER 23 - SWITCH INPUT FOR MICRO-PROGRAM UNIT CONTROL PANEL | | | | * |
| 442 | * REGISTER 27 (BIT 1) - READER DATA VALID | | | | * |
| 443 | * REGISTER 28 - CARD READER INPUT BYTE | | | | * |
| 444 | * | | | | * |
| 445 | ************************************************************** |
| 446 | ************************************************************** |
| 447 | * | | | | * |
| 448 | * LOAD MAIN STORE MODULE 0 | | | | * |
| 449 | * | | | | * |
| 450 | ************************************************************** |
| 451 | | MODR | +0 | 28 NO | CLEAR REGISTER 28 |
| 452 | | MODR | +0 | 27 NO | CLEAR REGISTER 27 |
| 453 | | MODR | +0 | 10 NO | CLEAR REGISTER 10 |
| 454 | START | SK03 | MASK=4 | 27 A | TEST FOR READER DATA VALID |
| 455 | | BRU | START | | BRANCH TO START ON READER DATA NOT VALID |
| 456 | | MODR | +0 | 28 Y | LOAD CONTENTS OF REG 28 INTO YREG |
| 457 | | ST | MSM0 | 10 Y | STORE CONTENTS OF YREG IN MAIN STORE |
| 458 | | MODR | +1 | 10 Y | INCREMENT REGISTER 10 BY 1 |
| 459 | | SB03 | MASK=4 | 27 NX | RESET BIT 1 OF REGISTER 27 |
| 460 | | BRU | START | | BRANCH BACK TO READ MORE DATA INTO STORE |
| 461 | ************************************************************** |
| 462 | * | | | | * |
| 463 | * LOAD MAIN STORE MODULE 1 | | | | * |
| 464 | * | | | | * |
| 465 | ************************************************************** |
| 466 | | MODR | +0 | 28 NO | CLEAR REGISTER 28 |
| 467 | | MODR | +0 | 27 NO | CLEAR REGISTER 27 |
| 468 | | MODR | +0 | 10 NO | CLEAR REGISTER 10 |
| 469 | STAR | SK03 | MASK=4 | 27 A | TEST FOR READER DATA VALID |
| 470 | | BRU | STAR | | BRANCH TO START ON READER DATA NOT VALID |
| 471 | | MODR | +0 | 28 Y | LOAD CONTENTS OF REG 28 INTO YREG |
| 472 | | ST | MSM1 | 10 Y | STORE CONTENTS OF YREG IN MAIN STORE |
| 473 | | MODR | +1 | 10 Y | INCREMENT REGISTER 10 BY 1 |
| 474 | | SB03 | MASK=4 | 27 NX | RESET BIT 1 OF REGISTER 27 |
| 475 | | BRU | STAR | | BRANCH BACK TO READ MORE DATA INTO STORE |
| 476 | ************************************************************** |
| 477 | * | | | | * |
| 478 | * UPDATE MAIN STORE MODULE 0 | | | | * |
| 479 | * | | | | * |
| 480 | ************************************************************** |
| 481 | | MODR | +0 | 27 NO | CLEAR REG 27 |
| 482 | CMS0 | SK03 | MASK=8 | 27 A | TEST FOR START BIT |
| 483 | | BRU | CMS0 | | BRANCH TO CMS0 |
| 484 | | MODR | +0 | 27 NO | CLEAR REG 27 |
| 485 | | MODR | +0 | 23 Y | LOAD Y REG WITH ADDRESS OF DATA TO BE CHANGED |
| 486 | | STRG | +0 | 10 Y | STORE ADDRESS IN REG 10 |
| 487 | CMS00 | SK03 | MASK=8 | 27 A | TEST FOR START BIT |
| 488 | | BRU | CMS00 | | BRANCH TO CMS00 |
| 489 | | MODR | +0 | 23 Y | LOAD NEW DATA INTO Y REG |
| 490 | | ST | MSM0 | 10 Y | STORE NEW DATA IN MAIN STORE |
| 491 | | MODR | +0 | 27 NO | CLEAR REG 27 |
| 492 | | BRU | CMS0 | | BRANCH TO CMS0 |
| 493 | | END | | | |

TABLE J

Referring now to Table A which shows the register assignments used in connection with the microprogramming, it will be observed that register 00 is the low order 8 bits of the master position counter, and register 01 is the high order 4 bits of the master position counter. The master position counter counts up to the count of 3599 and is then reset to 0. The master position counter is responsive to the emitter 526 and makes one count for each tenth degree of rotation of the rotor 500R. For a clockwise pulse, the master position counter counts up; and, for a counterclockwise pulse, the master position counter counts down.

Register 03 as shown in Table A is used for controlling the drivers 714a, 714b and 714c, and the bit pattern in register 03 has one of the three value 0, 1 or 2. The value of 0 in register 03 indicates that all of the drivers should be off so that there is no torque on rotor 500R; the count of 1 in register 03 indicates that those of the drivers producing clockwise torque on rotor 500R should be turned on; and the count of 2 in register 03 indicates that those of the drivers producing counterclockwise torque should be turned on. The length of the 03 register is 8 bits; however, only the last two bits are used.

Register 05 is the fine home mode position counter, and this counter has a function comparable to that of the counter of registers 00 and 01 except that only 8 bits of register 05 are used. The use of the separate register 05 for fine home mode allows faster operation, since the high order 4 bits of the master position counter need thus not be considered during fine home mode of operation. Register 05 begins its counting action when rotor 500R crosses its desired, zero position; and as rotor 500R moves away from the desired position, the fine home mode position counter, register 05, counts up. The counter, register 05, counts down as the rotor 500R returns toward the desired, zero position thereof. This action in counting up and counting down as the rotor 500R moves away from and toward the desired position occurs for either clockwise rotation or counterclockwise rotation of the rotor. The contents of the counter, register 5, is used for calculating the "switch point" previously referred to in connection with the embodiment shown in FIGS. 3a to 3f. Register 05 counts up to the count of 255, plus or minus, more than sufficient to carry out its intended function.

Register 09, as shown by Table A, constitutes a slew counter which counts along with the master position counter made up of registers 00 and 01. The slew counter counts the travel of the rotor 500R between its initial position, at the beginning of a slewing operation, until the rotor first crosses its desired or home position. Essentially the slew counter determines the home or desired position, inasmuch as the slew counter contains a certain number of counts.

Registers 11 and 12 provide complementary functions, register 11 being designated as the boundary counter and register 12 as the boundary counter +1. The boundary counter, register 11, counts by 2's, 0, 2, 4, 6, etc.; and register 12 counts in the same manner but with alternate counts 1, 3, 5, 7, 9, etc. The boundary counters, registers 11 and 12, are used in connection with register 03 (bit pattern for desired torque) for turning on the particular drivers 714a, 714b and 714c that must be turned on to provide the proper torque on the rotor 500R. In particular, the contents of the boundary counters (registers 11 and 12) is used for addressing main storage 900, main storage containing bits for indicating the proper driver energization configuration for providing the desired torque on rotor 500R. In addition, a comparison of the contents of the boundary counter with the contents of the master position counter, is made to indicate whether or not the contents of the boundary counters should be updated. This information is also preloaded into main storage 900. The boundary counters (registers 11 and 12) thus are used to keep track of exactly what driver should be energized to produce maximum torque in either the clockwise or counterclockwise direction. The boundary counters address main storage 900, and the location thus addressed yields the driver bit pattern necessary to produce maximum torque on the rotor 500R and also yields the value of the master position counter (registers 00 and 01) at which the boundary counters are to be change in content.

The approximate torque versus rotor position curves for a particular motor 500 are set forth in FIG. 9, and table K given below very briefly sets forth the critical values for this motor.

| Counter | Main Store Module φ (CW) | | Main Store Module 1 (CCW) | |
|---|---|---|---|---|
| | Driver for CW Torque | Increment BC by 2 at this Value | Driver for CCW Torque | Increment BC by 2 at this Value |
| 0 & 1 | 1 | 36 | 2 | 3565 |
| 2 & 3 | 1 | 66 | 3 | 35 |
| 4 & 5 | 2 | 136 | 3 | 65 |
| 6 & 7 | 2 | 166 | 1 | 135 |
| 8 & 9 | 3 | 236 | 1 | 165 |
| etc. | 3 | 266 | 2 | 235 |

TABLE K

There are two sets of preloaded data in main storage 900, one for clockwise and one for counterclockwise rotation. This data is contained in main storage 900, particularly in two modules, module 0 and module 1. The contents of module 0 are for clockwise rotation of the rotor 500R, and the contents of module 1 are for counterclockwise roation of the rotor.

Some of the instructions reference main store 900, such as an instruction "load X from main store," and part of each of these instruction is the main store module number (module 0 or module 1). Certain areas are defined in each of these modules; for example, the area between 3565 and 35 in module 1 (see Table K). In this range, the content of the boundary counter is equal to 0, and the content of the boundary counter +1 is equal to 1. The numeral 3565 in the table corresponds to a rotor rotation of 356.5°, and the numerals 35 in the table correspond to the rotor rotation of 3.5°. The other numerals in the third and fifth columns of the chart have the same significance.

Figure 9:
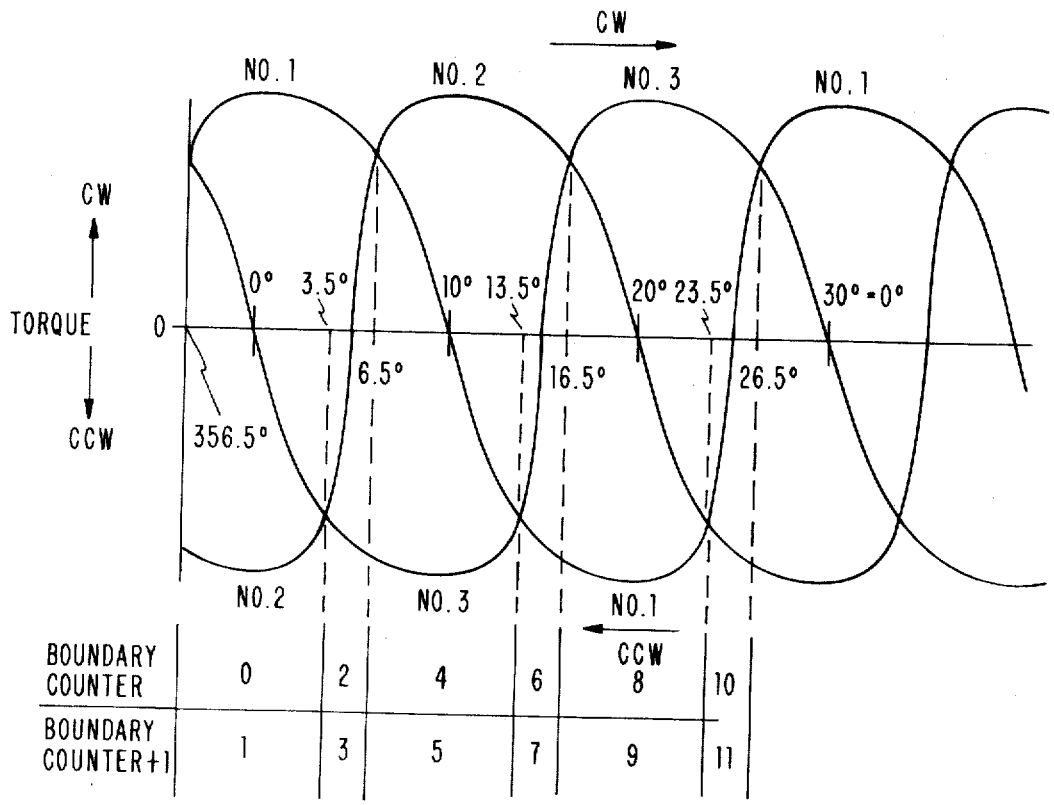
FIG. 9 is a graph showing the particular drivers that should be energized for securing maximum torque in the stepping motor illustrated in FIGS. 1 and 2.

Referring to the FIG. 9 graph, the curves labeled No. 1, 2, 3, 1, etc., refer to the particular drivers 714a, 714b and 714c that are on for applying either clockwise or counterclockwise torque on the rotor 500R. For portions of the curves above the abscissa, clockwise torque is applied onto the rotor. As rotor travel occurs along the abscissa, a movement to the rith in the graph of FIG. 9 indicates clockwise rotor direction which a movement to the left in the graph indicates counterclockwise rotor direction. Thus the abscissa refers to rotor position, and the ordinates refer to torque on the rotor 500R.

Referring to the graph of FIG. 9, in the first range between 356.5° and 3.5°, the graph indicates the driver No. 1 shall be energized for clockwise torque on the rotor and driver No. 2 shall be energized for counterclockwise torque on the rotor. The FIG. 9 chart at the bottom of the figure further indicates that at this time the boundary counter has a content of 0 while the boundary counter +1 has a content of 1.

In the second range between 3.5° and 6.5°, driver No. 1 is energized for clockwise torque on the rotor, and driver No. 3 is energized for counterclockwise torque on the rotor. In this range, the boundary counter has a content of 2, and the boundary counter +1 has a content of 3. The third range is between 6.5° and 13.5°. In this range, the No. 2 driver is energized for clockwise torque on the rotor, and the No. 3 driver is energized for a counterclockwise torque on the rotor. The boundary counter has a content of 4 in this range, and the boundary counter +1 has a content of 5 in this range.

The next range is between 13.5° and 16.5°; and, in this range the No. 2 driver is energized for a clockwise torque on the rotor, and the No. 1 driver is energized for a counterclockwise torque on the rotor. In this range, the boundary counter has a content of 6, and the boundary counter +1 has a content of 7. Drivers Nos. 1, 2, and 3 are successively energized as the rotor 500R moves from its 16.5° position to a 356.5° position, and the contents of the boundary counter and the coundary counter +1 increase likewise. In this connection, the boundary counter may have a full content of 142, and the boundary counter +1 may have a full content of 143. These contents correspond to the final range of the rotor just before it reaches its 0 position, namely, in the range bounded by the 356.5° rotor position.

Modules 0 and 1 of main store 900 respectively contain clockwise and counterclockwise information, and each of these modules is addressed separately by sepcial instructions. For each set of data withdrawn from either of these modules, two words of instruction are used. If, for example, main store module 0 is addressed, using the boundary counter contents as an address, this address points to the position in module 0 of store 900 containing the information necessary at the time and indicating which driver should be turned off for the desired torque in addition to other additional, boundary counter updating information later to be discussed in greater detail. In order to obtain all of the necessary information at each addressing operation, 16 bits are required. The system, however, is only 8 bits wide; and, therefore, for each of the 16 bit words, main store 900 is addressed twice. One of the two eight bit words has the driver information plus 4 bits of the additional required information for boundary counter updating, and the other 8 bits in the other 8 bit word is information of the later category also. The 16 bits requirement necessitated the use of thw two complementary registers 11 and 12, the boundary counter and the boundary counter +1. During the double addressing of main store 900 for securing the 16 bits of information, module 0, for example, is addressed first by the contents of the boundary counter and then is addressed by the contents of the boundary counter +1 so as to obtain as a result of the double addressing, a 16 bit word of clockwise information.

A second usage of the boundary counter and boundary counter +1 is that previously mentioned, essentially to count in order to keep track of the position in which the rotor 500R is located and to change in count as the rotor position changes. The position of the rotor is indicated particularly by the numbers 36 and 3565 in the first line of Table K just above given, the numbers 66 and 35 in the second line of the table, etc.

The incrementing and decrementing of the boundary counter and boundary counter +1 will be hereinafter described in connection with the microprogram, and this incrementing and decrementing takes place with the reception of clockwise and counterclockwise pulses from the encoder 526. For instance, if there is a clockwise pulse from the emitter 526, assuming that the contents of the boundary counter and boundary counter +1 are resepctively 0 and 1, the numeral 36 is stored in module 0, and this is also the content of the master position counter at the time, the rotor 500R being at its 3.6° position. A clockwise pulse functions at this time, as the rotor reaches its 3.6 degree position, to update both the boundary counter and boundary counter +1 so that they contain the contents of 2 and 3 respectively. This content of the boundary counter and boundary counter +1 correspond to the second range above mentioned which starts at a rotor position of 3.5 degrees. At this time, the 2 and 3 contents of the boundary counters are used to address main store 900. The 0 and 1 boundary counter content previously provided the proper driver information (No. 1 driver for clockwise direction of rotation, for example) in the first range; and, likewise the proper driver, No. 2 for clockwise torque, and No. 3 for counterclockwise torque, is indicated utilizing the 2 and 3 boundary counter contents in the second line of Table K. The encoder 526 provides a pulse for each tenth degree of rotation or rotor 500R, and the boundary counter and boundary counter +1 are only updated by the clockwise or counterclockwise pulses occurring at the particular contents of the modules in the third and fifth columns of Table K. The contents of the master position counter are compared with the values in the third and fifth columns of Table K contained in the modules so that the corresponding updating of the boundary counter takes place. On this updating, additional driver information becomes available, so that the proper driver as set forth in the FIG. 9 graph is energized to produce the appropriate torque on the rotor 500R.

Register 13, address register for main store, constitutes a register for containing a dummy address. The purpose of the address register 13 will become apparent from the following description of programming and has to do with the particular configuration of the microcontrol unit which is used and which is shown in FIG. 11. The contents of the address register 13 is hexadecimal *ff* (all 1's) so that if main store 900 is addressed with the contents of register 13, the last position in the main store 900 is addressed. The notation MSMO =FF in Table A implies that location FF in the 0 module of main store has the all 1's content.

Register 27 (input register) is used in connection with the start button of the microcontroller. When the contents of bit 0 in this register changes from 0 to 1, the program thereby begins operation.

Register 30, also designated as an input register, contains certain bits for specific purposes. Bits 5 and 7 are from the encoder 526, bit 5 indicating counterclockwise bits and bit 7 indicating clockwise bits. Bit 3 of register 30 is a move bit, and this bit is provided under the control of an external actuator and indicates that a peripheral device has completed its action. Bit 2 of register 30 is a bit provided from an external device indicating that rotor 500R is beginning to overspeed. Bit 6 of register 30 is a direction signal bit from the analog control circuit of FIGS. 7a and 7b with logical 1 indicating the clockwise direction and logical 0 indicating the counterclockwise direction.

Register 3A is the output register. Bits 1, 2 and 3 of this register go directly to the various drivers 1, 2 and 3 (714a, 714b and 714c). Bit 0 in this register constitutes a signal that a move by a part of an external device (such as a document card punch) is complete. Additional punching action then is in order. Bit 4 of register 3A constitutes a signal that the analog controller of FIGS. 7a and 7b should take over.

Register 04 contains status bits. Bit 0 of this register is termed the "two bit" which indicates that there has been an overshoot by the rotor 500R from its desired position of two-tenths of a degree with two counts from the encoder 526. As will be apparent from the following description, different routines are then in order. The change limit bit, bit 2 of register 04, is a flag bit connected with the fine home routine, and it use will be apparent. Bit 3, fine home mode bit, when present indicates that slewing has been completed on a crossing of the desired position of rotor 500R, so that a change is then made to fine home mode. Bit 4 of register 04 is a so called "once only" bit indicating that the rotor 500R has crossed its desired position and that the direction of the rotor has then been reversed for the first time. Bit 5 is the so called "first time through" bit and is set by the first pulse from the emitter 526 after an initial change in direction of the rotor. Bit 6 is a "coast" bit which indicates that all of the drivers 714a, 714b and 714c should be de-energized. Bit 7 is a so called "direction" bit and indicates that, at the last time that the rotor 500R crossed its desired position, the rotor was rotating in either its clockwise or counterclockwise direction.

Register 08 contains additional status bits. Bit 4 is a slew mode float indicator, and the contents of this bit position indicates that rotor torque should be reversed. Bit 6 of register 08 causes a doubling up of opposing drivers which are energized at the same time in this doubling up as will be subsequently described. Bit zero of register 08 is a ready to punch bit indicating that punching may now proceed, assuming that it is a punching machine that is used in connection with the mechanism 520.

Register 02 contains additional status bits. Bits 5 is a digital mode bit with logical zero indicating an analog mode of control and a logical 1 indicating the digital fine home mode of control. Bit 7 of register 02 is a memory bit which monitors directional changes during analog mode.

Register 0 0F is a dummy register used for a NOOP (no operation) instruction, and register 14 is used for addressing main store 900 for loading a switch limit therein.

Figure 13:
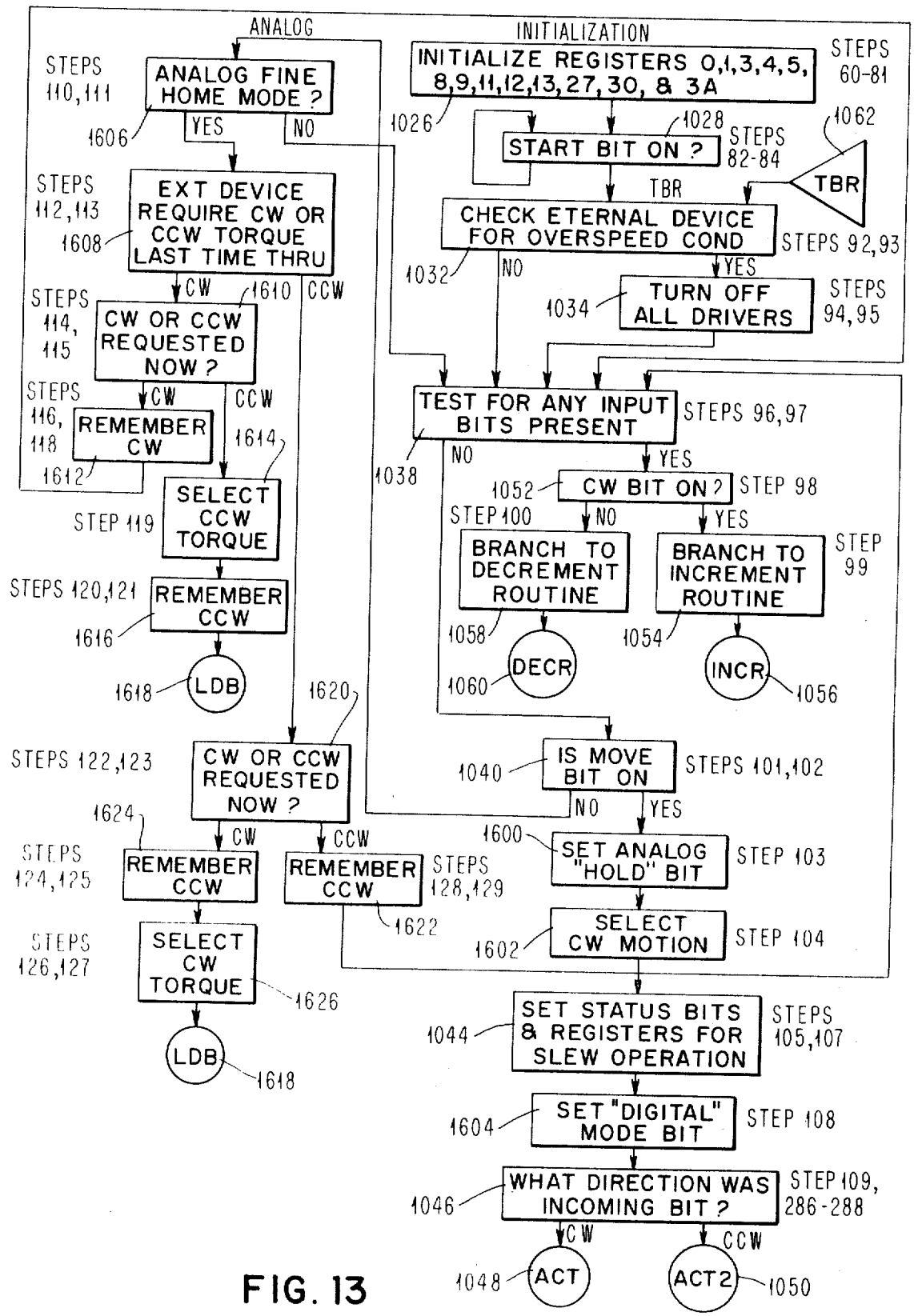
FIG. 13 is a flowchart illustrating an initialization routine for use with the microcontrol program unit of FIG. 11.
Figure 14:
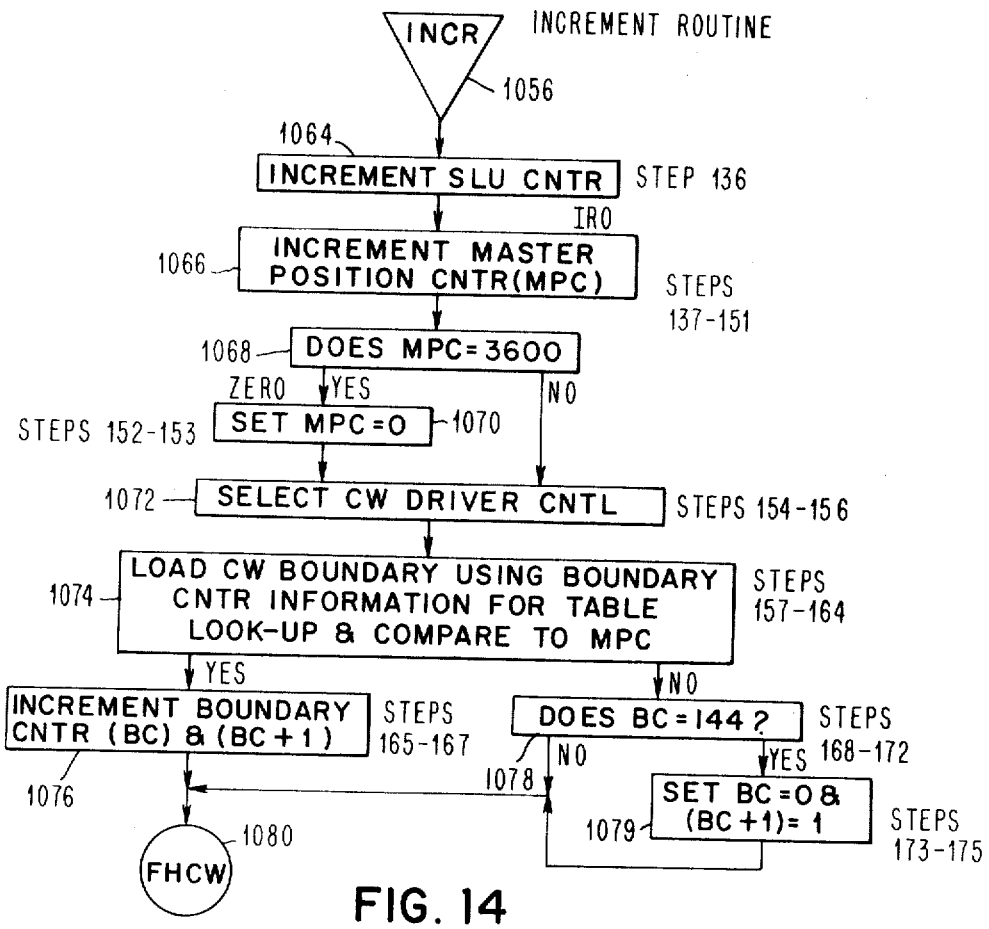
FIG. 14 is a flowchart illustrating an increment routine.
Figure 22:
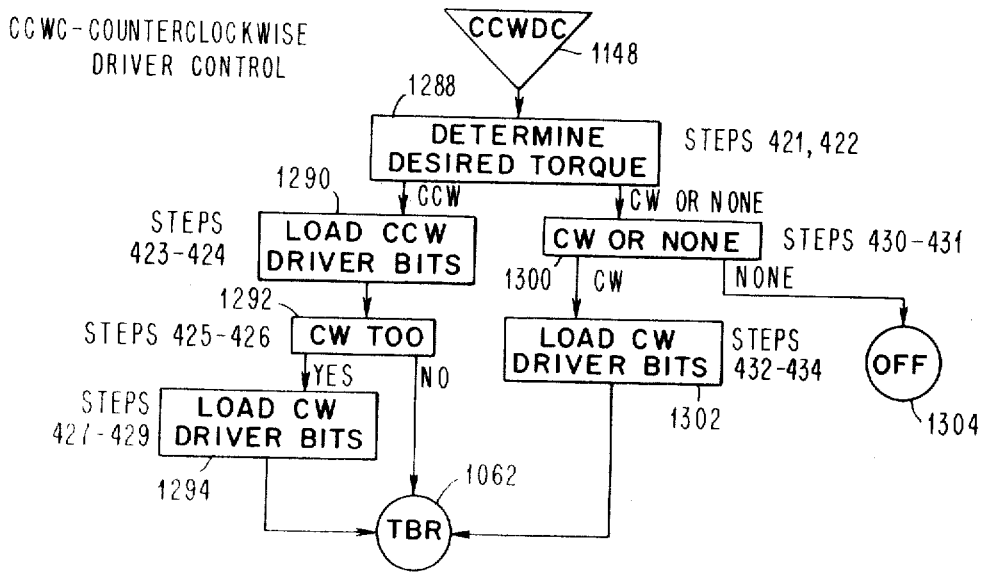
FIG. 22 is a flowchart illustrating a counterclockwise driver control routine, the routines of FIGS. 14 to 22 being usable with that of FIG. 13 in connection with the microcontrol unit of FIG. 11.
Figure 15:
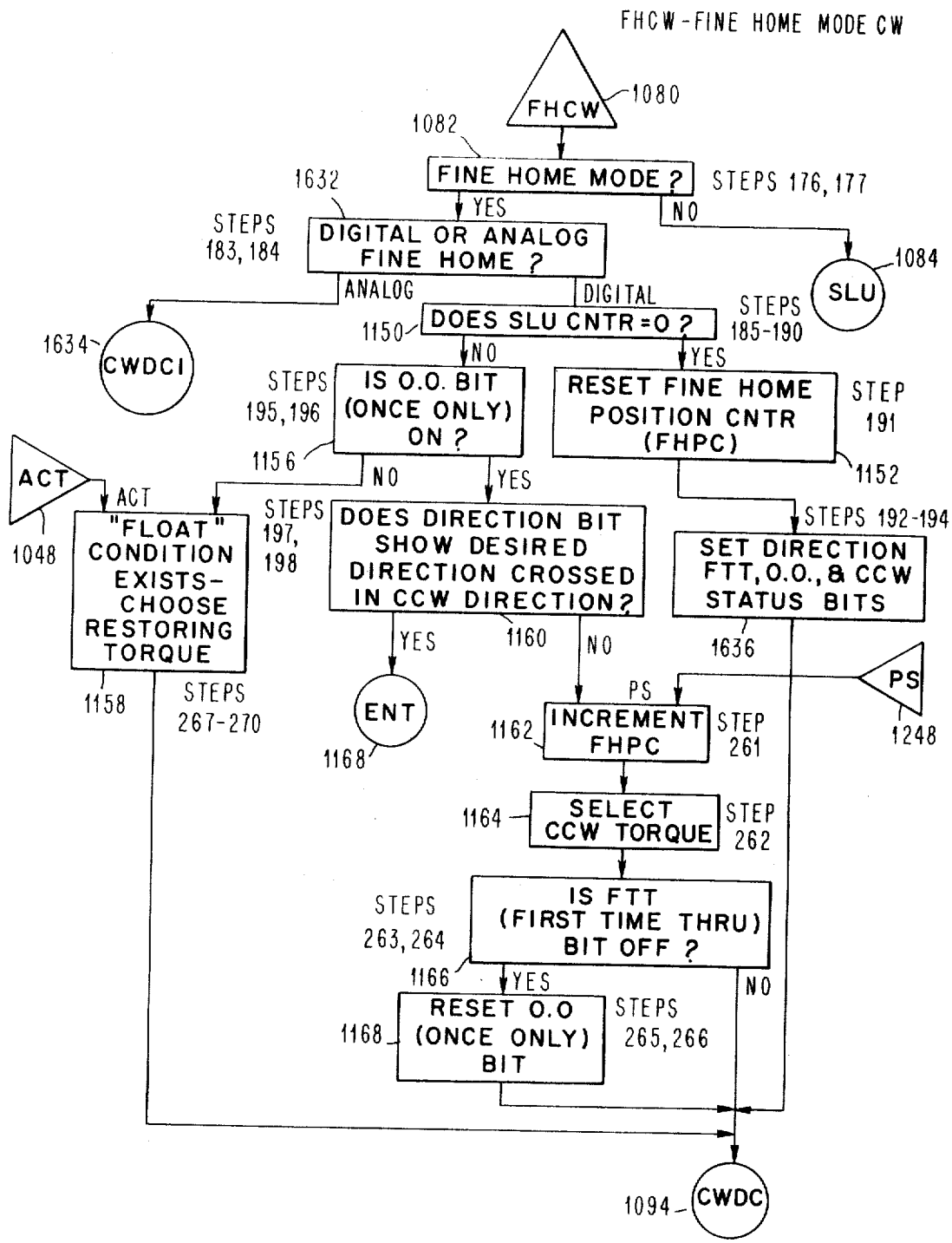
FIG. 15 is a flowchart illustrating a fine home mode CW routine.
Figure 16:
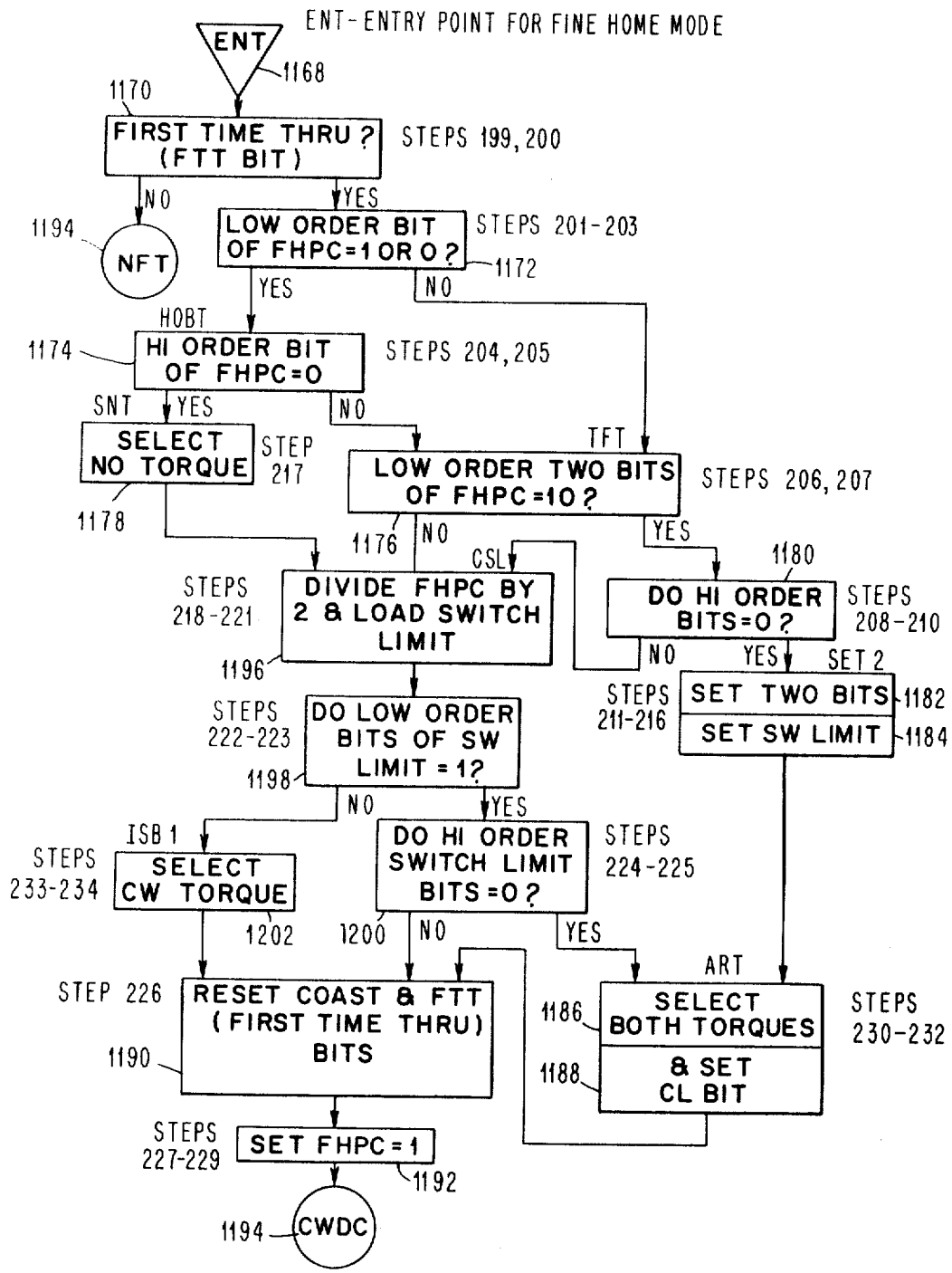
FIG. 16 is a flowchart illustrating an entry point for fine home mode routine.
Figure 17:
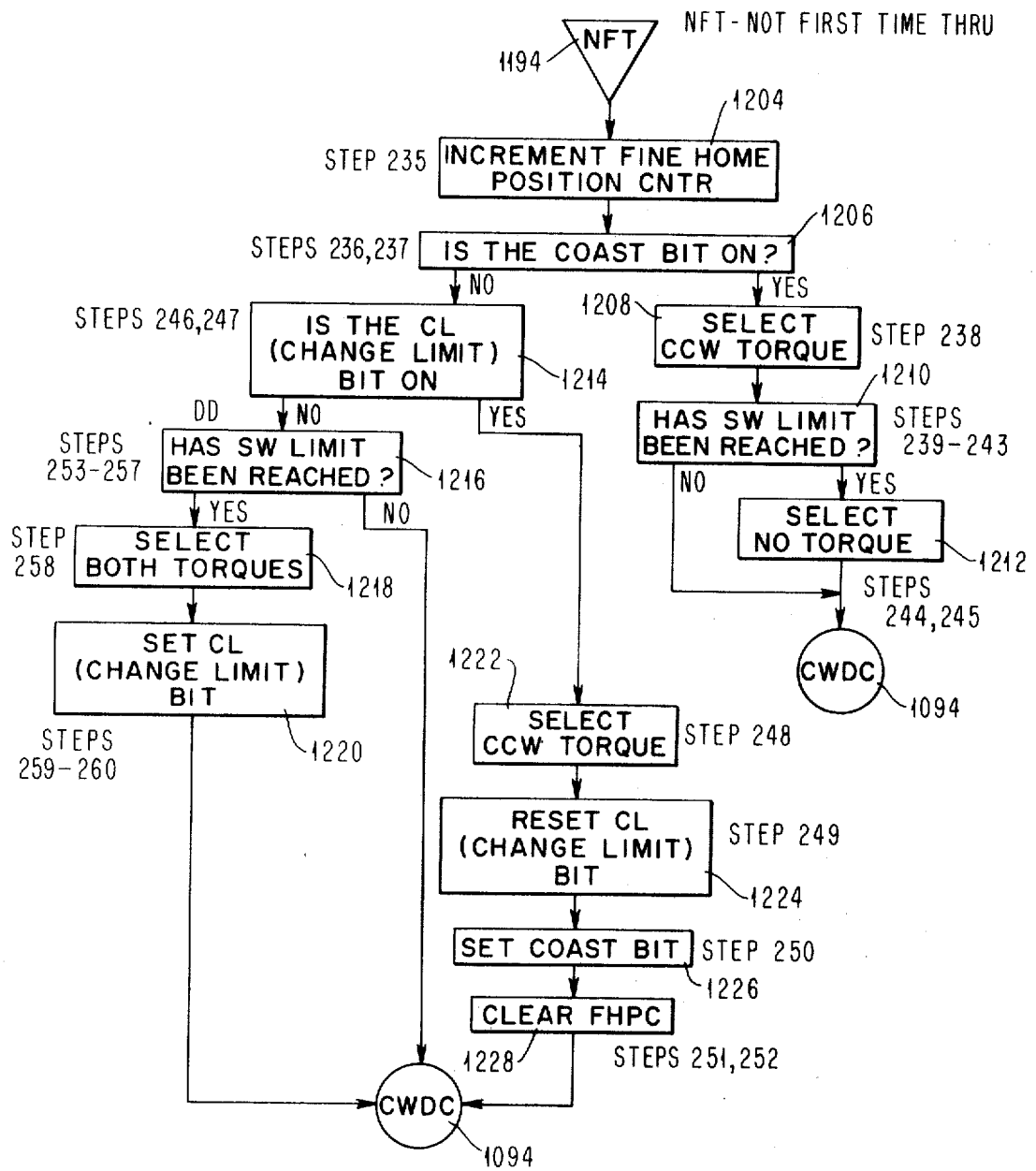
FIG. 17 is a flowchart illustrating a not first time through routine.
Figure 18:
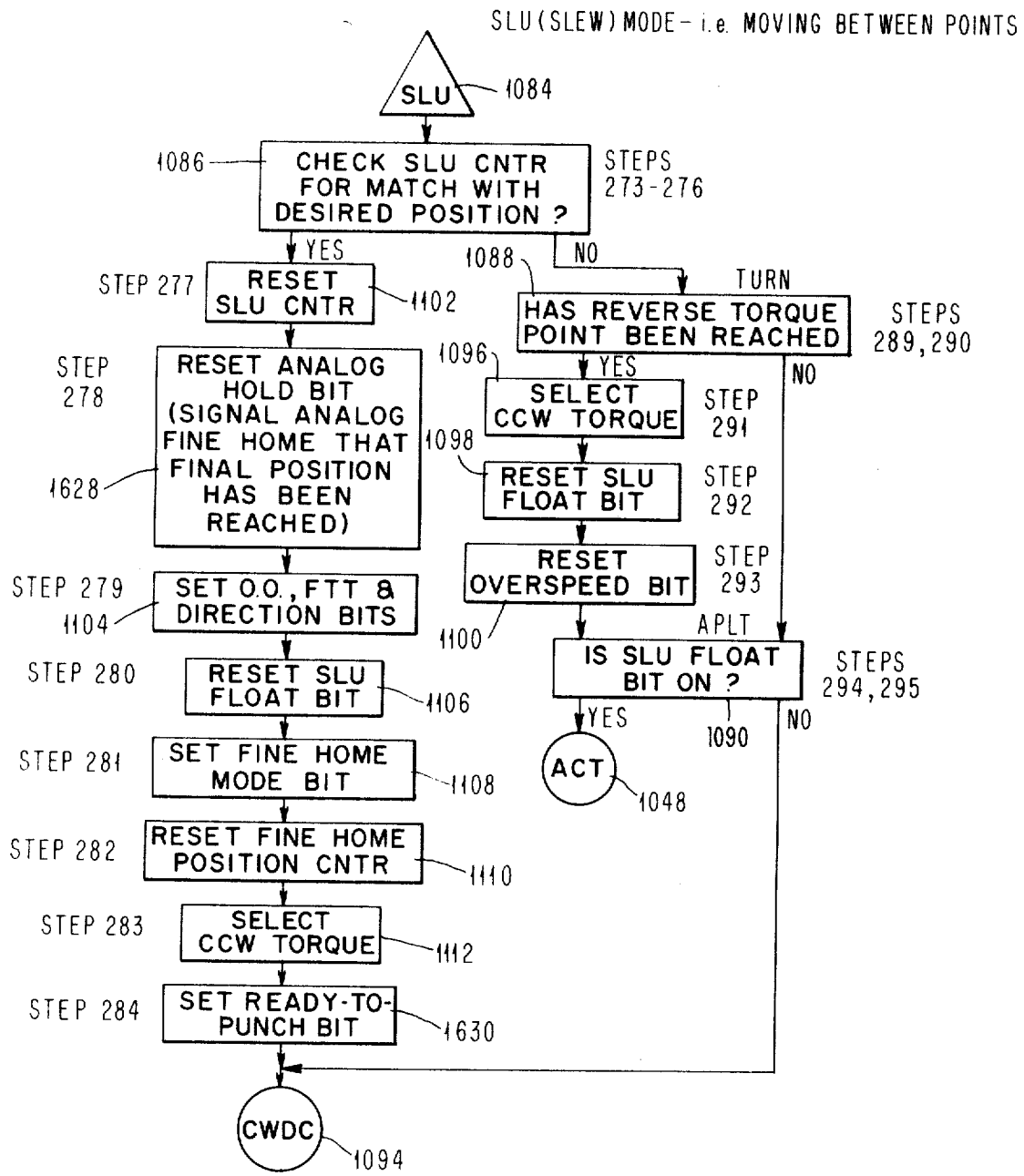
FIG. 18 is a flowchart illustrating a slew mode routine.
Figure 19:
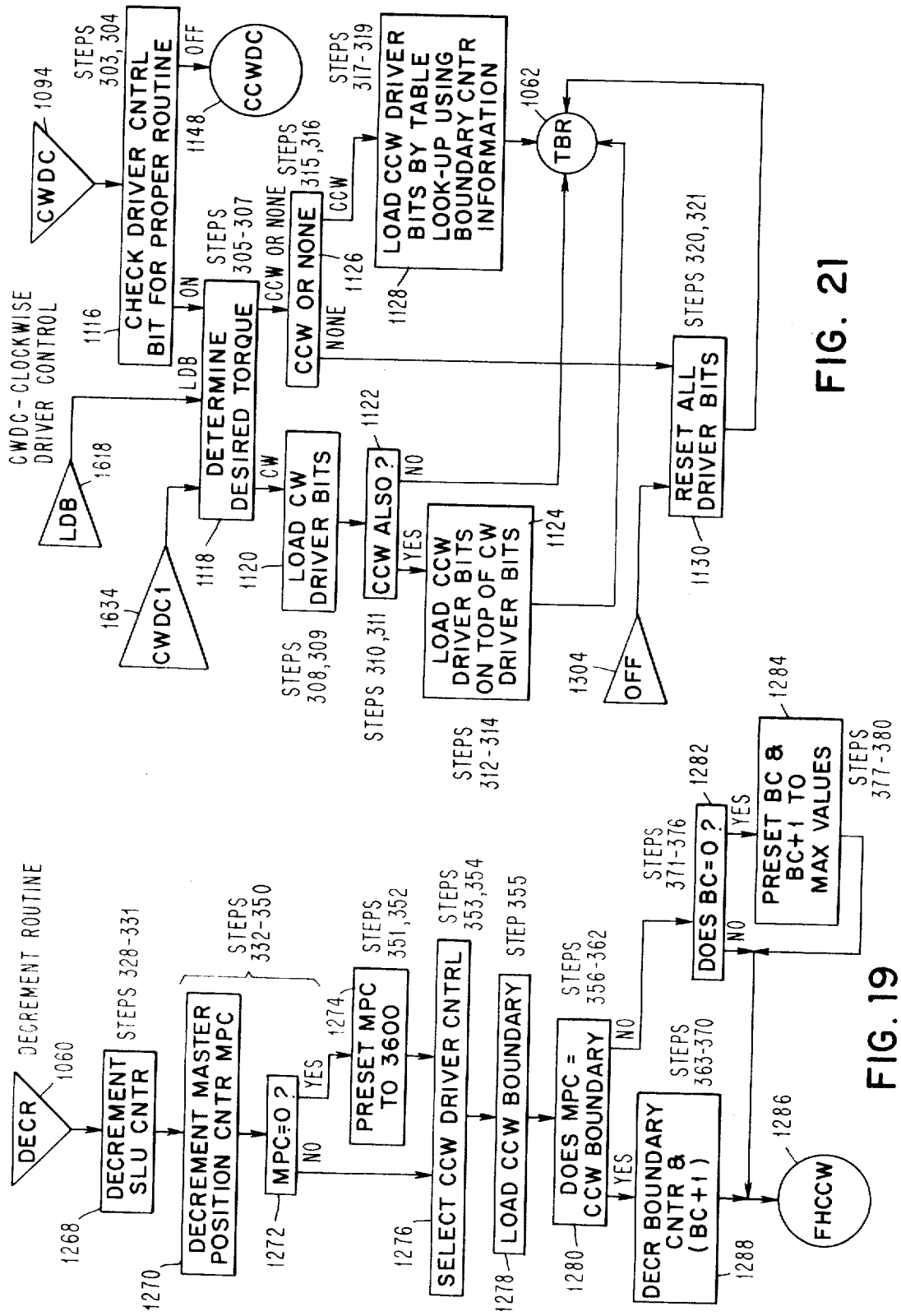
FIG. 19 is a flowchart illustrating a decrement routine.
Figure 20:
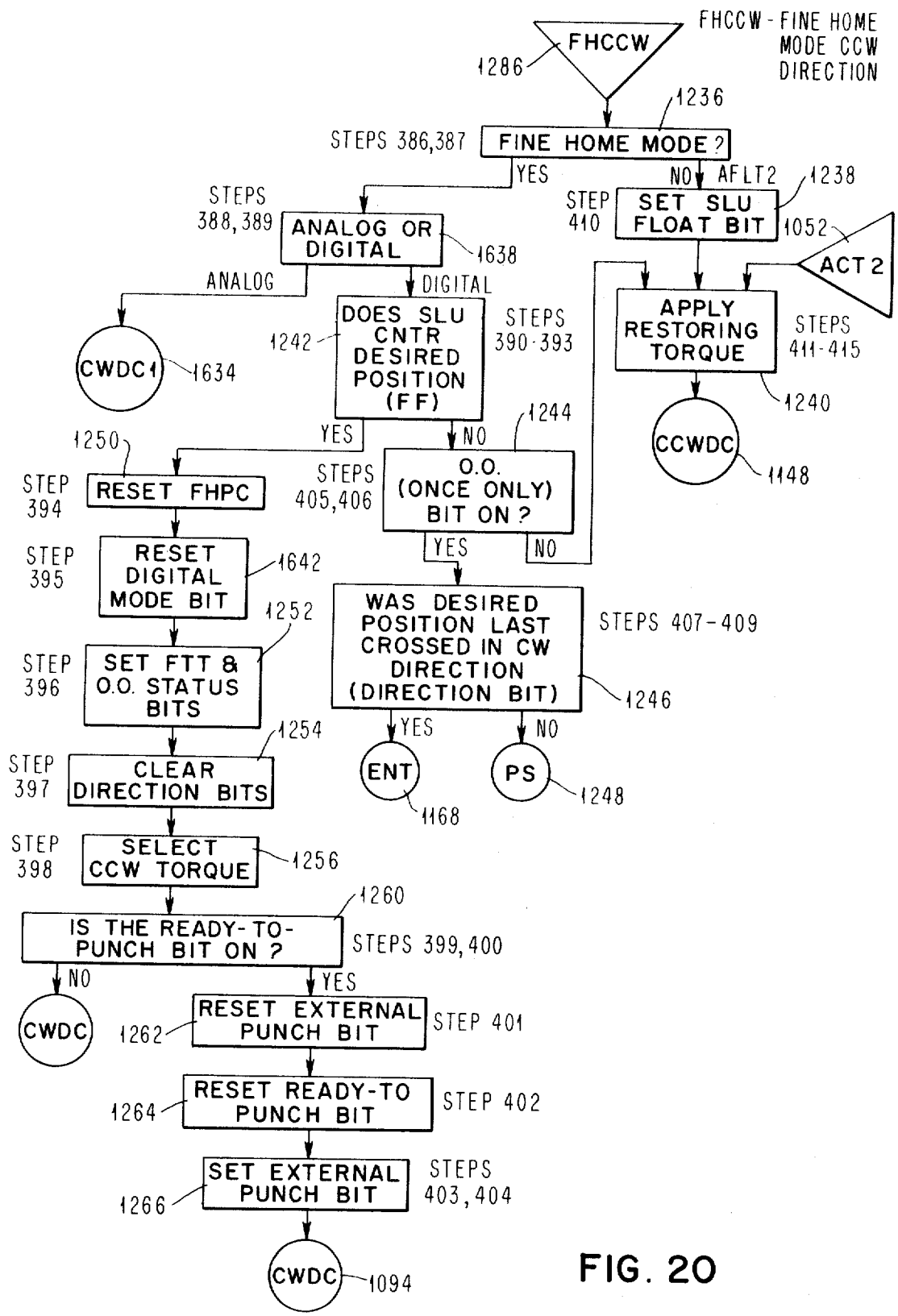
FIG. 20 is a flowchart illustrating a fine home mode CCW direction routine.

The microprogram includes a number of routines which are shown in chart form in FIGS. 13 to 22. FIG. 13 shows an initialization routine; FIG. 14 shows an increment routine; FIG. 15 disloses a fine home mode clockwise routine; FIG. 16 discloses an entry point for fine home mode routine; FIG. 17 shows a not first time through routine; FIG. 18 shows a slew mode routine; FIG. 19 shows a decrement routine; FIG. 20 shows a fine home mode counterclockwise direction routine; FIG. 21 shows a clockwise driver control routine; and FIG. 22 shows a counterclockwise driver control routine.

Referring now to FIG. 13, block 1026 indicates that registers 0, 1, 3, 4, 5, 8, 9, 11, 12, 13, 27, 30 and 3A are initialized. These are registers listed in Table A; and, as indicated on FIG. 13 adjacent to block 1026, tle initialization according to block 1026 is carried out by means of steps 60 to 81. These steps are set forth in Table B; and, likewise, the other steps in the microprogram set forth in tables B-J are indicated for each of the other blocks of FIGS. 13 to 22 in the same manner. In brief, by means of steps 60–81, registers 00 and 01 are set to zero; register 3 is first set to zero and is then incremented so that it then has a count of one therein; registers 4 and 5 are set to zero; register 3A has a count of 1 provided therein so as to turn on the number 3 driver 714c which causes the rotor 500R to move to the position indicated by energization of driver number 3 alone, setting the rotor 500R in its initial position; registers 8, 9 and 11 are set to zero; register 12 is reset to zero and is then incremented so that it has the count of one therein; and register 13 is set to have a count of hexadecimal FF therein. Then, as indicated by step 75, in main store module zero, the stored contents is hexadecimal FF or all ones. In addition, register 27 is cleared so as to reset the start bit, and register 30 is cleared to have zero contents. At this time, the program temporarily halts, awaiting the raising of the start bit.

The start bit, which is in the input register 27, is raised by depressing the start button of the microcontrol unit. The loop on the block 1028 indicates that tests are continually made for the existance of the start bit; and, when the program determines that the start bit is raised, the subroutine in block 1032 is then effective.

At this time, according to block 1032, the overspeed bit (bit 2 of input register 30) is checked so as to determine whether or not the speed of the driving motor of the attached external device (such as a document card punch) is overspeed. If this bit is raised, according to block 1034, all of the drivers 714a–714c are turned off which causes a slowing down of the motor 500. If the speed of the driving motor of the external device is not excessive, a test is made for any clockwise or counterclockwise bits from the emitter 526. In the event that there are no emitter bits, the subroutine in block 1040 is effective to determine if the move bit (bit 3 of register 30) is raised. If there is a raised move bit, then the analog hold bit (bit 7 of register 02) is raised according to block 1600. Under these conditions, clockwise rotation of rotor 500R is in order; and, according to block 1602, clockwise motion is selected. In addition, according to block 1044, the status bits for slewing are set; and, according to block 1604, the digital mode bit (bit 5 of register 02) is set. Then, according to block 1046, the direction of the incoming bit from the emitter 526 is determined. The act block 1048 and act 2 block 1050 constitute outputs with respect to the block 1046, and these constitute inputs for the fine home mode clockwise routine illustrated in FIG. 15 and the fine home mode counterclockwise routine illustrated in FIG. 20, both of these latter two routines being for digital operation.

In the event that a move bit is not raised in accordance with block 1040; according to block 1606, a determination is made as to whether the system in an analog fine home mode. If not, a branch is made back again to block 1038. If the system is in analog fine home mode, a determination is made according to block 1608 as to whether the external device, such as the punching machine, for example, required clockwise or counterclockwise torque the last time through. If clockwise, then according to block 1610 the question is answered as to whether clockwise or counterclockwise torque is requested now. If the answer is "clockwise" then according to clock 1612, this information is remembered (by means of the signal bit and memory bit, bit 4 of register 3A and bit 7 of register 02); and the analog controller of FIGS. 7a and 7b takes over at this point. At the same time, a loop is made from block 1612 to block 1038.

If, as the result of the subroutine set forth in block 1610, it is determined that counterclockwise rotation of rotor 500R is requested at present, then counterclockwise torque is selected according to block 1614. The counterclockwise direction of rotation is remembered according to block 1616, and then the program proceeds to the LDB block 1618 which constitutes an input to the clockwise driver control routine of FIG. 21.

If the external device required a counterclockwise torque the last time through, the subroutine set forth in block 1620 is effective according to which it is determined whether clockwise or counterclockwise torque is requested at present. If counterclockwise torque is presently requested, this torque is remembered according to block 1622; and the analog circuitry of FIGS. 7a and 7b is then effective as previously described. Also, a loop is made from block 1622 to block 1038. In the event that clockwise torque is requested in subroutine 1620, this torque requirement is remembered according to block 1624; and clockwise torque is selected according to block 1626. Subsequently, the clockwise driver control routine of FIG. 21 is entered by means of the entry block 1618.

The initialization routine illustrated in FIG. 13 is entered at times by means of the entry block 1062 relating to a test bit routine, as will be hereinafter described.

As is apparent from the previous description of the FIG. 13 routine, the subroutine set forth in block 1038 is effective under a number of conditions, such as when the analog fine home mode is not effective according to block 1606; and, according to block 1038, a test is made for any input bits from the emitter 526. If there are such bits with the movement of the rotor 500R, testing is made to determine the direction of the bits, clockwise or counterclockwise, in accordance with the subroutine of block 1052. If the input bit is clockwise, the increment routine of FIG. 14 occurs while, on the other hand, if the input bit is counterclockwise, the decrement routine of FIG. 19 is effective.

The increment routine of FIG. 14 is made effective from block 1056 derived from FIG. 13, and the first action in the increment routine is indicated by block 1064 in which the slew counter (register 09), which indicates the amount of movement of the rotor 500R, is incremented. At the same time, the master position counter (registers 00 and 01) is incremented according to the subroutine indicated by block 1066. The count in the master position counter is then tested to determine if it amounts to 3600 (corresponding to 360° of rotation of rotor 500R); and, if the count therein does amount to 3600, the master position counter is then set to 0 in accordance with the subroutine set forth in block 1070. If the event that the count is less than 3600 in the master position counter, the clockwise driver control is selected according to block 1072, and this has a subsequent effect on the clockwise and counterclockwise driver control subroutines illustrated in FIGS. 21 and 22.

The boundary counter (registers 11 and 12) is then checked, and the clockwise boundary is loaded into the boundary counter, with a compare then being made to the contents of the master position counter as set forth in subroutine 1074. If the comparison is successful, boundary counter contents should be updated. This is done according to subroutine 1076.

If the contents of the boundary counter does not equal the contents of the master position counter, then the contents of the boundary counter is checked for its maximum value of 144 according to block 1078 (a count of 144 is the same as 0). If the count is 144, boundary counter register 11 is set to zero, and boundary counter register 12 is set to the count of 1 according to block 1079. In all cases, transfer is subsequently made by block 1080 to the fine home mode clockwise routine as shown in FIG. 15.

Referring to FIG. 15, the program determines whether or not the system is in fine home mode as set forth by the subroutine in block 1082. If the system is not in fine home mode, transfer is made to the slew mode routine shown in FIG. 18 which will now be described.

In slew mode, according to block 1086 of FIG. 18, the contents of the slew counter (register 09) are checked for a match with the desired position. The desired position is represented by a fixed number and is contained in an instruction. If there is no match, then a determination is made as to whether the reverse torque point has been reached in accordance with block 1088. If, for example, the rotor 500R should be moved through 70 counts or pulses from emitter 526, then the reverse torque point may amount to 60 counts at which reverse torque is applied unto the rotor. If the reverse torque point has not been reached, such as if, for example, the friction on the shaft 502 is too great, and the rotor 500R turns around before it reaches the reverse torque point, the slew float bit (bit 4 of register 08) is raised in accordance with block 1090. If the slew float bit is raised, the program proceeds to block 1048 which specifies transfer to fine home mode clockwise subroutine illustrated in FIG. 15. If the program is at block 1048, this indicates that the rotor should reverse. If the slew float bit is not raised, no additional action need be taken at this point; and the program proceeds to the clockwise driver control block 1094 which specifies transfer to the clockwise driver control routine illustrated in FIG. 21.

If the system is at the point of rotor rotation at which the torque on the rotor should be reversed, the subroutine indicated by block 1096 is effective indicating that restoring torque, that torque which will drive the rotor toward the desired position, should be applied to the rotor 500R. Thereupon the slew float bit (bit 4 of register 08) is reset to 0 according to block 1098, and the same action occurs with respect to the overspeed bit as indicated by block 1100, assuming that these bits have previously been raised. The subroutine in block 1090 is then effective as indicated in FIG. 18.

If the slew counter (register 09) matches with the desired position, referring to block 1086, then the system should change from slew mode to fine home mode. At this time, the slew counter is reset as indicated by block 1102; the analog hold bit (bit 4 of register 3A is reset, signalling that the fine home mode position of the rotor 500R has been reached, according to block 1628; the status bits (bits 4, 5 and 7 of register 04) are set according to block 1104; the slew float bit (bit 4 of register 08) is reset according to block 1106; the fine home mode bit (bit 3 of register 04) is set according to block 1108; the fine home position counter (register 05) is reset according to block 1110; counterclockwise torque, the desired torque at the time for rotor 500R, is selected according to block 1112; and a ready to punch bit is set according to block 1630. Execution of block 1094 subsequent to the setting of the ready to punch bit, as well as after a determination according to block 1090 that the slew float bit is not on, provides transfer to the clockwise driver control routine set forth in FIG. 21 which will now be referred to.

According to block 1116 in FIG. 21, initially a check is made to determine which of the clockwise and counterclockwise driver routines is appropriate. This is done by checking the driver control bit (bit 6 of register 08). If the driver control bit is raised, the program proceeds to block 1118 where the clockwise routine really begins. In routine 1118, it is first determined whether clockwise torque is appropriate or whether counterclockwise or no torque is appropriate. If clockwise torque is appropriate, the clockwise driver bits are loaded into main store as indicated by block 1120. The program then determines whether counterclockwise torque is also appropriate as indicated by block 1122. There are cases, as has been previously described, in which both clockwise and counterclockwise torque are applied onto the rotor 500R. If counterclockwise torque is also appropriate at the time, the counterclockwise driver bits are loaded on top of the clockwise driver bits as indicated by block 1124.

Referring again to block 1118, in the event that it is determined, according to this block, that the proper torque is in the counterclockwise direction or that no torque should be applied, the subroutine in block 1126 is effective. Subroutine 1126 determines whether the proper torque is in the counterclockwise direction or that none should be applied; and, if the counterclockwise torque is proper, subroutine 1128 is in effect by means of which counterclockwise dirver bits are loaded. If no rotor torque is proper, all of the driver bits are reset in accordance with block 1130. The test bit routine having input 1062 and shown on FIG. 13 is effective after blocks 1128, 1130 and 1124 and after the "No" option of block 1122.

The system then idles, waiting for the next emitter bit. Referring again to block 1116, if the driver control bit (bit 6 of register 08) is off, the counterclockwise driver control programming shown in FIG. 22 is effective, entry being made through block 1148.

Slew mode has thus been accomplished by means of the programming illustrated in FIG. 21; and fine home mode follows slew mode, fine home mode for the clockwise direction being illustrated by means of FIG. 15.

As previously described, the existence of fine home mode was checked by means of subroutine 1082 shown in FIG. 15; and, if existing, a check is made according to block 1632 to determine if digital or analog fine home mode is in effect. If analog is in effect, the clockwise driver control routine is entered by means of entry block 1634. If fine home digital mode for clockwise direction is effective, the slew counter (register 09) is checked to determine if its content is 0 according to subroutine 1150. If the slew counter contains a count of 0, the fine home position counter (register 05) is reset as is indicated by block 1152; and this occurs at just the time that the rotor 500R crosses the desired rotor position and begins moving away from the desired position. An initialization then occurs as set forth in block 1636 and the direction, first time through, once only, and CCW status bits are set. These are respectively bits 7, 5, 4 of register 04 and bit 6 of register 08.

On the other hand, if the contents of the slew counter does not equal 0, then a determination is made as to whether the once only bit is on according to subroutine 1156. This bit is on if the rotor 500R has changed direction, and the rotor is moving away from the desired position. If these conditions do not exist and the once only bit is not on, a float condition exists as indicated by block 1158; and action must be taken so as to provide a restoring torque on the rotor 500R to bring it back toward the desired position. Blocks 1158 and 1636 provide transfer to the CWDC routine block 1094 of FIG. 21; and as previously descried, in the FIG. 21 routine, the proper direction of torque application is determined.

If the once only bit is on, then determination is made whether the direction bit (bit 7 of register 04) shows that the desired position crossed by the rotor 500R was in the counterclockwise direction, according to block 1160. At this point, the basic fine home mode is in effect entered; and one routine exists for the condition in which the rotor 500R is moving away from the desired position (positive slope), and another routine exists for the condition in which the rotor is moving toward the desired position. If the rotor 500R is moving away from the desired position, there are in effect no decisions to be made. In this case, the "No" output of block 1160 exists, and subroutine 1162 becomes operative. This condition would exist, for example, if the driver control indicator (bit 6 of register 08) is one and the rotor is moving in a clockwise direction, indicating that the rotor is going away from the desired position. In this case, the fine home position counter (register 05) is incremented according to block 1162; counterclockwise torque is selected for the restoring torque according to block 1164; and a check is made to determine if the first time through bit (bit 5 of register 04) is off according to block 1166. If this bit is raised, conditions are normal; however, if the first time through bit is off, in this case the once only bit is reset as indicated by block 1168. In either case, a transfer through block 1094 is made to the clockwise driver control routine shown in FIG. 21.

Referring again to block 1160, if the rotor 500R has changed direction and is coming back toward its desired position, then the routine shown in FIG. 16 is entered, this being by means of the entry point 1168 from block 1160.

Referring to FIG. 16, the first action in this entry routine is to check the first time through bit (bit 5 of register 04) according to block 1170, determining whether this is the first time that the rotor 500R has changed direction. If so, subroutines 1172, 1174 and 1176 are operative to select between three different conditions. These three conditions correspond to the 0, 1 or 2 content of the first home mode position counter (register 05). The subroutine in the block 1172 determines whether the low order bits of the fine home mode position counter amounts to 1 or 0. The fine home mode position counter includes 8 bits altogether, and the subroutine 1172 this in effect checks to determine whether the four lower bits in this counter are either 0000 or 0001. If so, the subroutine shown in block 1174 is operative to determine whether the high order 4 bits of the fine home mode position counter euqal 0, that is, whether the 4 higher order bits are all zeros. If so, the select no torque subroutine shown by block 1178 is effective. It has thus been determined that the overshoot of the rotor 500R is either 0 or 1 counts (1 corresponds to one-tenth degree rotation of shaft 502); and, under these conditions, no torque is desired on rotor 500R.

In the case in which the four low order bits in the fine home mode position counter amount to more than 0 or 1, in this case the low order 2 bits in the fime home mode position counter are checked to determine if they are respectively 1 and 0, this being done by means of subroutine 1176. This amounts to a special condition in which the rotor 500R has overshot its desired position by 2 counts, but this again necessitates a checking of the four high order bits in the fine home mode position counter; and this is done by the subroutine in block 1180. If the four high order bits in this counter amount to 0, the count of 2 (00000010) does indeed exist in the fine home mode position counter. Thereupon, as indicated by block 1182, the two bit (bit 0 of register 04) is set, and the switch point is set as indicated by block 1184. The switch point may be either 0 or 1, and this limit is first retained in the Y register 920 and then is loaded into main store 900. The switch point corresponds to that point at which the drivers are initially switched and at which both clockwise and counterclockwise torques are effective on the rotor 500R. Then, a selection of both torques (clockwise and counterclockwise) is made as indicated by block 1186; and the change limit bit (bit 2 of register 04) is set as indicated by block 1188. Thereupon, the coast and first time through bits (bits 6 and 5 of register 04) are reset as indicated by block 1190, and the fine home mode position counter (register 05) is set to 1 as indicated by block 1192. As has been previously mentioned, the count of 1 is added to the content of the fine home mode position counter before a division by 2 is made of the contents of this counter, and subroutine 1192 causes this addition of 1 to the contents of the counter. Routine 1192 results in a transfer through block 1094 to the clockwise driver control routine set forth in FIG. 21.

It will be noted that the first time through bit (bit 5 of register 04) is reset by subroutine 1190; and, therefore, the routine just described takes effect only one time, since subsequently the decision made in accordance with block 1170 is negative so that a branching by means of block 1194 is made to the routine shown in FIG. 17.

In the event that the contents of the fine home mode position counter is greater than 2, the subroutine in block 1196 is effective to divide the contents of the fine home position counter by 2 and to load the switch point into the main store 900. The switch point amounts to the overshoot by the rotor 500R from its desired position plus 1 divided by 2. For example, if the rotor overshoots its desired home position by 7 counts or seven-tenths degree, the switch point will (7+1)÷2=4. The subroutine indicated by block 1196 is also shown in FIG. 16 to be rendered effective by the subroutine in block 1178; however, since subroutine 1178 is only effective for counts of 0 and 1 in the fine home mode position counter, there is no division by 2 as this time. Then, according to block 1198, the low order bits of the switch limit are checked to determine if they equal 1. Of so, the high four bits of the switch limit are checked to determine if they equal 0 by the subroutine indicated by block 1200, thus indicating that the switch point indeed is a 1. In this case, the subroutine 1186 is then again effective. If, on the other hand, the switch limit is not 1, clockwise torque is selected by subroutine 1202; and both subroutines 1200 and 1202 cause subroutine 1190 to be effective as previously described.

Thus, the FIG. 16 routine in effect takes care of the special cases in which tHe fine home position counter has a count of 0, 1 or 2 corresponding to an overshoot of the desired position by the rotor of 0, 1 or 2 tenths of a degree. In other cases, when the overshoot count is greater than 2, this count is divided by 2, as previously mentioned, according to subroutine 1196.

It will now be assumed that the rotor 500R has crossed its desired position once in digital fine home mode and is on its way back toward the desired position. Under these circumstances, the not first time through routine of FIG. 17 is effective. Referring to FIG. 17, the fine home mode position counter (register 05) is again incremented as indicated by block 1204, and then a check is made to determine if the coast bit (bit 6 of register 04) is on as is indicated by block 1206. If the coast bit is on, counterclockwise torque is selected as indicated by block 1208. Then a check is made to determine if the switch point has been reached in the fine home mode position counter as indicated by block 1210. As previously mentioned, the switch point is the original rotor overshoot in counts plus 1, with this sum divided by 2; and the switch point is stored in main store 900. If, according to block 1210, the switch point has not been reached, the program simply proceeds to energize the drivers, providing a signal in input block 1094; while, if the switch point has been reached, no torque is selected according to block 1212.

If the coast bit (bit 6 of register 04) is not on, a check is then made according to block 1214 to determine if the change limit bit is on. The coast bit has been previously reset, and the change limit bit has been previously reset to be off. Under these conditions, the switch point is checked in accordance with block 1216 to determine if the switch point has been reached. Assuming that the switch point has not been reached, the torque on the rotor reamins the same as previously, and a transfer is provided from subroutine 1216 through block 1094 to the clockwise driver control routine shown in FIG. 21.

Eventually, the switch point on continued rotation of the rotor 500B will be reached; and both torques (both clockwise and counterclockwise) are selected in accordance with block 1218. Thereupon, the change limit bit is set in accordance with block 1220; and, at the time of the next passage through the FIG. 17 routine, subroutine 1214 recognizes that the change limit bit is now on. At this time, a selection is made according to block 1222 to counterclockwise torque only, so as to change the torque application on the rotor 500R from both torques (note block 1218) to only the counterclockwise torque. The change limit bit is then reset in accordance with block 1224, and the coast bit is set in accordance with block 1226. The fine home mode position counter (register 05) is then cleared in accordance with block 1228, and the program proceeds to the clockwise driver control routine of FIG. 21 by means of entry block 1094. Incidentally, a passage through the subroutines 1222, 1224, 1226, 1228 and 1230 is made only once during each homing movement of the rotor 500R.

Consideration will now be given to the gine home mode counterclockwise direction routine illustrated in FIG. 20. The program steps for the fine home mode counterclockwise direction parallel to some extent those in the fine home mode clockwise direction routine shown in FIG. 15. First, a check is made to determine if the system is in fine home mode according to block 1236. If not, the slew float bit (bit 4 of register 08) is set according to block 1238, and restoring torque is applied according to block 1240. An input signal is thus applied on to the input block 1148 of the FIG. 22 routine.

Incidentally, with respect to the driver control routine in the counterclockwise direction shown in FIG. 22 and which will be more fully subsequently described herein, slewing according to the illustrated program occurs only in the clockwise direction. This is due to the fact that the general direction of movement of the rotor 500R is in a clockwise direction, and there is no need to have a slew mode in the counterclockwise direction. Assuming, for example, that the motor 500 is driving a document card in a punching machine, the general direction of movement of the card corresponds with the clockwise movement of the rotor 500; and, after the card 524 reaches its approximate desired position, it is only necessary to finally position the card with small movements of the rotor 500R. Thus, if the program is not in fine home mode, a direct passage to the counterclockwise driver control routine of FIG. 22 is made by means of subroutines 1238 and 1240 of FIG. 20.

If the system is in fine home mode, referring again to block 1236, and this can occur only for counterclockwise direction of movement of the rotor 500R in the FIG. 20 routine; a determination is made according to block 1638 whether the system is in analog or digital mode. If in analog mode, the clockwise driver control routine of FIG. 21 is entered by means of block 1634. If the system is in digital mode, a determination is made according to block 1242 whether the contents of the slew counter (register 09) equals FF, which indicates the desired position. The desired position is at this time equal to hexadecimal FF (all one's ), since the time the fine home mode was initiated, this counter was reset and has been continually updated since that time. If the contents of the slew counter does not equal hexadecimal FF, the once only bit is checked to determine if this bit is on in accordance with block 1244. If the once only bit is not on, a float condition exists and restoring torque is applied in accordance with block 1240.

If the once only bit is on, a determination is made as to whether the desired position of the rotor 500R was last crossed in the clockwise direction in accordance with block 1246. The direction bit (bit 7 of register 04) is checked for this determination. If the last crossing was in the clockwise direction, the fine home mode is entered by means of entry block 1168. If the desired rotor position was not crossed in the clockwise direction, the positive slope routine set forth in FIG. 15 comes into action through he entry block 1248. Both the FIG. 16 and FIG. 15 routines are basic fine home mode routines as previously described.

If the slew counter does in content equal hexadecimal ff which occurs when the rotor is on the counterclockwise side of the desired position, the fine home mode position counter is reset in accordance with block 1250. The digital mode bit (bit 5 of register 02) is then reset as indicated by block 1642. Subsequently, the first time through and once only status bits are set in accordance with block 1252. The direction bit is then cleared, referring to block 1254, to indicate counterclockwise rotation; and counterclockwise torque is selected in accordance with block 1256. Then a check is made to determine if the ready to punch bit is on in accordance with block 1260. This bit assumes that the peripheral device controlled by the motor 500 is a punching machine. If the punching machine is ready for operation, the external punch bit is reset in accordanc with block 1262; the ready to punch bit is reset in accordance with block 1264; and the external punch bit is set in accordance with block 1266. Thereupon, the clockwise driver control routine set forth in FIG. 21 is operative from the input block 1094. The ready to punch bit and the other bits referred to in blocks 1262, 1264 and 1266 simply determine the condition of the punching machine and give signals to operate if this is appropriate. While punching is taking place, the program idles until the next move bit (bit 3 of input register 30) occurs. If the ready to punch bit is not on, referring to block 1260, the program proceeds directly therefrom to the clockwise driver control routine of FIG. 21 by means of the input block 1094.

The fine home mode counterclockwise direction routine shown in FIG. 20 is under the control of the decrement routine shown in FIG. 19. The decrement routine includes the input block 1060 derived from the initialization routine of FIG. 13, and the first operation in the decrement routine is to decrement the slew counter in accordance with block 1268. The master position counter is then decremented in accordance with block 1270, and a determination is made whether the contents of the master position counter equals 0 in accordance with block 1272. If the master position counter contents are zero, the master position counter is then preset to have a content of 3600 in accordance with block 1274.

If the master position counter content is 0 or after the content of the master position counter is preset to 3600, the counterclockwise driver control is selected and the driver control indicator (bit 6 of register 08) is reset to 0 in accordance with block 1276. The counterclockwise boundary is then loaded in accordance with block 1278, and a check is made to determine if the contents of the master position counter equals the counterclockwise boundary as set forth in block 1280. If not, a determination is made according to block 1282 whether the contents of the boundary counter (registers 11 and 12) equals 0; if so, the boundary counter registers 11 and 12 are preset to their maximum values as indicated by block 1284. If the boundary counter content does not equal 0 or after such presetting, the fine home mode counterclockwise direction routine is entered by means of entry block 1286.

If the contents of the master position counter equals the counterclockwise boundary, referring to block 1280; the boundary counter, including both registers 11 and 12, is decremented in accordance with block 1288; and the fine home mode counterclockwise direction routine is entered through block 1286.

The counterclockwise driver control routine illustrated in FIG. 22 is very similar to parts of the FIG. 21 routine for clockwise driver control. The block 1148, constituting the first one in the FIG. 22 routine, is derived from block 1116 of the FIG. 21 routine, and the desired torque is first determined in the FIG. 22 routine according to block 1288. If the desired torque is in the counterclockwise direction, the CCW driver bits are loaded in accordance with block 1290; and, thereupon a determination is made as to whether clockwise driver bits should also be loaded in accordance with block 1292. If not, a branch is made to the FIG. 13 initialization routine by means of block 1062. If so, the clockwise driver bits are loaded in accordance with block 1294, and the routine passes back to the initialization routine of FIG. 13 by means of block 1062.

If, according to block 1288, it is determined that the desired torque is in the clockwise direction or that none is appropriate, then, according to block 1300, a determination is made which of these conditions should be applied, clockwise on the one hand, or none on the other. If clockwise torque is appropriate, the clockwise driver bits are loaded in accordance with block 1302 and thereupon the routine proceeds to block 1062. If no torque is appropriate, the FIG. 22 routine proceeds through block 1304 to block 1130 of the FIG. 21 routine.

For a particular illustration of the operation of the program illustrated in FIGS. 13 to 22, it will be assumed that the rotor 500R is located in an initial position spaced 200 emitter counts (pulses from emitter 526) from the desired or home position of the rotor. It will be assumed that a move bit is utilized for beginning the operation; and, under these conditions, the registers will be initialized as indicated by block 1026 (FIG. 13), and the operations the forth by blocks 1028, 1032, 1036, 1038 and 1040 will take place. The analog hold bit is then set according to block 1600. It is assumed that the rotor will move clockwise initially; and, according to block 1602, a bit will be set to select clockwise motion for the rotor. The status bits and registers for slew operation are then set according to subroutine 1044; the digital mode bit (bit 5 of register 02) is set; and athe direction of an incoming or emitter bit is then determined according to block 1046, if there is such a bit.

It is assumed at this point that the rotor 500R has moved out of its at rest position; and, at this time, the move bit has been turned off, this being one of the operations performed according to block 1044 just above referred to. At this time, the system simply idles between blocks 1038 and 1040 until an input bit from the encoder 526 appears. If the system is functioning satisfactorily (without outside interference), the first bit from the encoder 526 is a clockwise bit; and, therefore, according to blocks 1052 and 1054, the increment routine on FIG. 14 is then entered. Basically, according to the increment routine; the slew counter, the master position counter and the boundary counter are incremented, this being accomplished by subroutines 1064, 1066 and 1074. In slew operation, the slew counter is utilized for making the count between the initial position of the rotor and its desired or home position; the boundary counter is utilized for properly controlling the various drivers 714a, 714b and 714c as above described; and the master position counter controls the boundary counter. The increment routine shown in FIG. 14 incidentally is used in both slew mode and also in fine home digital mode, and the operation starts in slew mode. The desired position of the rotor, rather than being contained in any of the counters, is contained in the program as shown on tables A to J, and this is 20° or 200 counts in the particular program illustrated in these charts (see steps 273-276). The differences in usage of the master position counter in the software as compared to the master position counter 536 in the hardware embodiment will be obvious. Also, in block 1072, the clockwise driver control is selected; and this is utilized later on in the program.

After the counters have then been incremented according to the FIG. 14 routine, the fine home clockwise routine of FIG. 15 is entered by means of block 1080; and then, according to block 1082, a test is made to determine if the system is in fine home mode. It is not at this time, and the slew mode routine of FIG. 18 is then entered by means of block 1084. A check of the slew counter with the desired position is made according to block 1086. The slew counter content goes up one count starting from zero for each clockwise pulse; and, after the first clockwise pulse has been produced by encoder 526 on the line 528, the slew counter content is one. At this time, the content of the slew counter does not match with the desired position of 200 counts.

Then, according to block 1088, a test is made to determine if the reverse torque point has been reached, and this point for the particular program given in Tables A to J is located 176 counts (see steps 289-291) corresponding to 17.6° in the clockwise direction from the initial rotor position. As will be hereinafter explained, reverse torque is applied onto the rotor 500R at this point when reached in slew mode so as to cause the rotor to slow to nearly zero velocity as the rotor first crosses its desired or home position.

A check is then made to determine if the slew float bit is on, according to block 1090. The slew float bit is not on at the reception of the first clockwise pulse from the encoder 526, since the slew float bit only goes on if for any reason the rotor 500R should reverse direction before actually reaching its desired or home position for the first time. The slew float bit, incidentally, is set by block 1238 of the fine home mode counterclockwise direction routine (FIG. 20) and results in the application of restoring torque according to block 1240 by means of the counterclockwise driver control routine of FIG. 22 to bring the rotor to its desired or home position.

Returning to FIG. 18 the slew float bit is not on with an initial movement of the rotor 500R from its initial position, and the clockwise driver control routine of FIG. 21 is entered by means of the entry block 1094. Then, according to block 1116, the driver control bit is checked to determine if it is on. The CW driver control bit has been previously set by means of subroutine 1072 (FIG. 14). The direction of the desired torque is then determined according to block 1118, and the CW driver bits are loaded, according to block 1120, from the boundary counters in main store 900. A determination is made then according to block 1122 if counterclockwise torque is also appropriate; and, during slew mode, this is not the case. Then, the initialization routine is re-entered by means of the TBR block 1062. Then the system continues to idle between blocks 1038 and 1040 until there is a succeeding input or encoder bit.

This operation continues until the rotor 500R has moved 17.6° producing 176 clockwise emitter pulses. At this time, during one of the passages through the subroutines as just mentioned; it is determined, according to block 1088 in FIG. 18, that the reverse torque point has been reached. At this time, the content of the slew counter equals 176. As has been described, the content of the slew counter increases one count for each clockwise pulse from the emitter 526. Counterclockwise torque is the selected according to block 1096, and the slew float bit is then reset according to block 1098 if it had been set previously. At this time, counterclockwise torque, exclusive of clockwise torque, is applied onto the rotor 500R. Then, the overspeed bit and the slew float bit are checked according to blocks 1100 and 1090, but both bits are off at this time; and the clockwise driver control routine of FIG. 21 is then entered by means of entry block 1094. Although, at this time, the clockwise driver control routine of FIG. 21 is utilized, nevertheless, the actual applied torque at this time is in the counterclockwise direction. Therefore, after determinations according to subroutines 1116, 1118 and 1126, the counterclockwise driver bits are loaded according to block 1128, utilizing boundary counter information in the manner previously described. The current initialization routine of FIG. 13 is then re-entered, whereupon the system idles between blocks 1038 and 1040 until an input bit from the encoder 526 appears.

Counterclockwise torque is now effective on the rotor 500R slowing the rotor down prior to its reaching its desired or home position after 20° of total rotation, and two situations may occur prior to the rotor reaching its home position. If the system is acting normally, the rotor 500R will continue rotating until the rotor passes through its home position for the first time, still traveling in the clockwise direction. On the other hand, the rotor 500R may reverse its direction of rotation prior to reaching home position if the system is not acting normally for some reason.

Assuming abnormal conditions and a premature reversal of rotor rotation, the encoder 526 produces a counterclockwise pulse as the rotor 500R reverses direction prior to reaching its home position for the first time; and, in this case, the subroutine set forth in block 1052 of FIG. 13 is effective to cause a branch to the decrement routine to be made according to block 1058. The decrement routine shown in FIG. 19 has the effect of decrementing the same counters that were incremented by the increment routine of FIG. 14 as previously described. As is apparent, the increment routine of FIG. 14 is effective for clockwise rotor rotation while the decrement routine of FIG. 19 is effective for counterclockwise rotor rotation. The counterclockwise driver control is selected according to block 1276 of FIG. 19, although as will appear, actually clockwise torque is applied onto the rotor at this time. Then the fine home mode CCW direction routine of FIG. 20 is entered by means of block 1286.

The fine home mode counterclockwise direction routine is illustrated in FIG. 20; and, again, a check is made according to block 1236 as to whether the system is in fine home mode. The system is still in slew mode, and then the slew float bit is set by means of block 1238, indicating that the rotor has reversed prematurely. Restoring torque is then applied according to block 1240 and the counterclockwise driver control routine of FIG. 22 is entered by means of block 1148.

Referring to FIG. 22, a determination of the desired torque direction is made according to block 1288; and, in this case, the proper direction is clockwise, so that the clockwise driver bits are loaded according to block 1302. The test bit routine of FIG. 13 is then entered by means of block 1062, and the system idles between blocks 1038, 1040 and 1606 as before. Since restoring torque (clockwise torque) has been selected according to block 1240, clockwise torque is applied onto the rotor (according to block 1288); and the rotor is urged toward its home position after this premature reversal of direction. With this reversal of motion of the rotor, additional clockwise pulses will be provided by the emitter 526, and the float bit has been raised as just described. The rotor is located at some position short of the full 20° rotation, and it probably is located beyond the 17.6° position. At this time, a check is made by means of block 1090 (FIG. 18) to determine if the slew float bit is on; it is; and a branch is made through entry block 1048 to block 1158 of the FIG. 15 fine home mode CW routine. Clockwise torque is maintained on the rotor 500R until the rotor reaches the home position by means of the FIG. 21 routine entered by means of block 1094 from the FIG. 15 routine.

Normal operation is slew mode will now be assumed in which rotor 500R is first crossing its desired or home position, moving in the clockwise direction. At this time, as the rotor crosses its home position, the system changes from slew mode to fine home mode. The program passes through the FIG. 13 initialization routine from the TBR input block 1062, and a check is made according to block 1052 to determine if a clockwise bit is on. A clockwise bit does exist, since the rotor is moving in a clockwise direction; and a branch to the increment routine is made by blocks 1054 and 1056. The increment routine of FIG. 14 increments the counters as previously described, and an entry is made to the FIG. 18 slew mode routine by means of blocks 1080, 1082 and 1084 as previously described. At this time, the content of the slew counter matches the desired position, having 200 counts in it; and the slew counter is reset to zero as indicated by block 1102. The analog hold bit is reset according to block 1628, and the various bits indicated by blocks 1104, 1106 and 1108 are set and reset as indicated,. In addition, the fine home mode position counter is reset according to block 1110. The system is then out of slew mode and is in fine home mode. Counterclockwise torque is then selected according to block 1112, since the rotor 500R has passed through the desired or home position. The ready for punch bit is then set according to block 1114 which will ready the system for punching when the rotor again crosses the home position (for the second time). This provides additional time for the document card to settle down before punching is actually initiated. Then, the clockwise driver control routine of FIG. 21 is re-entered through block 1094 which has the effect at this time of turning on the appropriate driver for the selected counterclockwise torque.

At this time, the rotor 500R is still rotating in the clockwise direction; but counterclockwise torque is effective by means of block 1128 on the rotor tending to move it back toward its home position, utilizing the clockwise driver control routine of FIG. 21. Return is made to the TBR block 1062 of FIG. 13, and at this time there will be no move bit. The system will then be idling between blocks 1038, 1040 and 1606 awaiting a bit from emitter 526.

It will be assumed that the rotor 500R overshoots its home position by a few clockwise emitter pulses. On each of these pulses, a branch is made to the increment routine of FIG. 14, and the various counters are incremented as previously described. An entry to the FIG. 15 fine home mode CW routine is then made through block 1080; and, as a result of the determination made by block 1082, the slew counter is checked to determine if it content is zero according to block 1150. The slew counter is still being updated even though the system is in fine home mode.

When the content of the slew counter is zero (referring to block 1150), this indicates that the rotor 500R is in the narrow band (betwen +0.1° and 0.0° about home position). When the rotor 500R first crosses the desired position in the clockwise direction, the slew counter is set to zero as indicated by block 1102 of FIG. 18. Therefore, when the rotor is actually in a position rotated clockwise with respect to the home position, the slew counter has a count in it corresponding to the number of tenth degrees the rotor is beyond the home position in the clockwise direction. The slew counter at this time thus keeps track of the position of the rotor 500R beyond the home position. When the rotor approaches the home position, going in the counterclockwise direction after having previously reversed its direction of rotation, the content of the slew counter is FF, and therefore the fine home position counter is reset according to block 1250 of FIG. 20.

The program proceeds from the FIG. 15 routine to the clockwise driver control routine of FIG. 21 through block 1094. The counterclockwise torque will be selected by means of subroutines 1118 and 1126, and the counterclockwise driver bits will be loaded as indicated by block 1128 so that counterclockwise torque is in rotor 500R. The program then returns to the intialization routine through entry block 1062, and the program idles between blocks 1038 and 1040 waiting for an emitter bit.

It will be assumed that the next emitter bit received is a clockwise bit, with the rotor having overshot its desired position, and the increment routine of FIG. 14 will again increment the various counters previously mentioned. These are the slew, the master position, and the boundary counters. The fine home mode CW routine of FIG. 15 is then effective, and the content of the slew counter does not equal zero, since this counter has just been incremented (referring to block 1150). Then a check is made according to block 1156 to determine if the once only bit is on; and, this bit is on at this time. The once only bit is on at this time, since it has been set previously according to block 1636 (FIG. 15). Then, according to block 1160, a check is made of the direction bit to determine if the rotor 500R last crossed the desired position in the counterclockwise direction. Utilizing this approach, the program allows the fine home position counter to be used for both sides of the home position, with the counter keeping track of the rotor and counting up and being incremented as the rotor moves away from its home position and counting down as the rotor moves toward its home position. It will be assumed that the rotor is moving away from the desired position; and, therefore, the subroutine in block 1162 is next effective. The fine home position counter is thus incremented, and counterclockwise torque is selected according to block 1164. Then, the first time through bit is checked to determine if it is off, according to block 1166. When the rotor 500R first crosses its desired position, this bit is set; therefore, the clockwise driver control routine of FIG. 21 is then effective in the same manner as has been previously described. Incidentally, the notation PS on block 1162 stands for Positive Slope which indicates that subroutine 1162, and the following subroutines just described are effective for a condition in which the rotor 500R is moving away from its desired or home position. At this time, The slew counter is set to zero when the rotor 500R passes through its home position; and, therefore, the content of the slew counter is all one's or hexadecimal FF on the counterclockwise side of the home position, between −0.1° and home position. According to block 1242 of the FIG. 20 routine, the slew counter is checked to determine if its contents are all one's or hexadecimal FF. Since the rotor 500R is on the clockwise side of the home position, the slew counter does not contain all one's, and the once only bit is then checked to determine if it is on according to block 1244. The once only bit has been previously set (according to block 1252), and the subroutine in block 1246 is then effective. The subroutine 1246 checks the direction bit to determine if the desired position was last crossed in the clockwise direction; and the crossing was in this direction, and hence the entry point for fine home mode routine of FIG. 16 is then entered by means of block 1168.

The time at which the FIG. 16 routine is entered is the time at which the program decides on various alternatives, insofar as the application of torque to rotor 500R is concerned. At this time, the first counterclockwise encoder bit has been received after the desired position has been crossed by the rotor then traveling in the clockwise direction and this may be termed the "decision point." This may also be the "switch point" depending on how far in the clockwise direction the rotor has moved initially. A determination is first made whether this is the first time that the rotor 500R has changed direction by checking the first time through bit according to block 1170. The first time through bit was set just previously according to block 1154. Counterclockwise torque has been applied to the rotor ever since the rotor passed through its home position for the first time, and this counterclockwise torque will be continued for a time. In addition, clockwise torque may be applied or all torque on the rotor may be discontinued depending on the amount the rotor has moved in the clockwise direction past its home position, substantially the same as has been previously described in connection with FIG. 10. In fine home mode, the program produces substantially the same applications of torque as is produced by the circuitry of FIGS. 3a to 3f, to which FIG. 10 has previously been particularly applied. In particular, at the time of the first counterclockwise pulse as the rotor 500R turns back toward its home position traveling in the counterclockwise direction, the program calculates the switch point or limit at which torque is switched and both torques are applied, and the contents of the fine home position counter is used for this purpose.

In this process, the low order bits of the fine home position counter are checked to determine if they amount to one or zero, nd both of these amount to special cases. In both of these special cases, the rotor 500R is between its home position and +0.1° or between +0.1° and +0.2 degree. It will be assumed at first that the rotor has oscillated farther than this in the clockwise direction; and, therefore, the subroutine of block 1176 is effective. According to block 1176, a determination is made as to whether the low order two bits of the fine home position counter equals 1 and 0. This is a special case also in which the rotor 500R has overshot to a position beyond +0.2°. It will be assumed also at this point that the rotor has overshot more than 0.2°; and, therefore, the subroutine of block 1196 is then effective. According to this subroutine, the contents of the fine home position counter are divided by two. The rotor may have overshot, for example, 5, 6 or 7 encoder counts; and half of this amount is determined according to block 1196, with the remainder from the division operation being disregarded. Therefore, if the rotor 500R overshot home position by 7 encoder counts, subroutine 1196 would produce the result of 3. This is the switch point or limit, and this amount is stored in main store 900. Then, according to block 1198, it is determined whether the low order bit of the switch limit (3, in the example given) equals 1. If the overshot was relatively large, such as seven encoder pulses, for example, the low order bits of the switch limit do equal 1; and then the high order switch limit bits are checked according to block 1200 to determine if these are zero. For a large overshoot, they are not; and, thereafter, the coast and first time through bits are reset in accordance with block 1190. The fine home position counter is then set equal to 1 according to block 1192; and, thereafter, the clockwise driver control routine of FIG. 21 is entered with block 1094 so as to maintain counterclockwise torque effective on the rotor. Referring to FIG. 10, it will be observed that counterclockwise torque is maintained on the rotor for large overshoots of the rotor after it initially passes through its home position. The switch point has thus been canculated at this time by the FIG. 16 routine, and the rotor continues to move back in the counterclockwise direction from its point of maximum oscillation toward its home position.

The program proceeds through the clockwise driver control routine of FIG. 21 back to the initialization routine of FIG. 13 through the entry block 1062; and, from thence, the program proceeds through the decrement routine by means of block 1058, since the clockwise bit is not on due to the reversal of direction of the rotor (see block 1052). From thence, the program proceeds to the fine home mode counterclockwise direction routine of FIG. 20. In the FIG. 20 routine, the program proceeds through the blocks 1236, 1638, 1242, 1244, 1246 and 1168 back to the entry point for fine home mode of FIG. 16. The rotor at this time is moving back from its point of maximum oscillation toward its home position, prior to the switch point being reached.

In the FIG. 16 routine at this time, according to block 1170, the first time through bit is checked. This bit has just previously been reset according to block 1190; and, therefore, at this time, a branch is made to the FIG. 17, not first time through, routine with entry block 1194. The FIG. 17 routine is effective when the rotor is moving back from its maximum point of oscillation toward home position, and a determination must be made now by the program as to whether or not the switch point that has been calculated is actually being reached. According to the FIG. 17 routine, initially the fine home position counter is incremented according to block 1204, the fine home mode position counter just previously having been reset to 1. The fine home position counter has been previously reset to 1, rather than 0; since this will result in the switch point being effective at the points illustrated in FIG. 10 and effective to cause the application of both clockwise and counterclockwise torques in the positions illustrated in FIG. 10. The coast bit is then checked according to block 1206. The coast bit was previously set in block 1190; and, therefore, the change limit bit is then checked according to block 1214. The change limit bit is not on at this time; and, therefore, the next determination made is whether the switch limit has been reached according to block 1216. In particular, at this point, it is determined whether the content of the fine home mode position counter equals the swithc limit that has just previously been calculated. If it does not, the torque on the rotor is allowed to remain as before, with the program proceeding through the clockwise driver control routine of FIG. 21 as previously. Eventually, after the rotor moves sufficiently back in the counterclockwise direction toward its home position, the switch limit will have been reached; and, accordingly, at this time both torques are selected in accordance with blocks 1216 and 1218. These are the switch points illustrated in FIG. 10 in which both clockwise and counterclockwise torques are effective on the rotor. The change limit bit is then set according to block 1220. The program then proceeds through the clockwise driver control routine of FIG. 21 and the decrement routine of FIG. 19; and, during this time, both clockwise and counterclockwise torques are applied on the rotor, this being by virtue of block 1122 of the FIG. 21 clockwise driver control routine.

On the next counterclockwise encoder pulse, a passage again is made through the not first time through routine in FIG. 17. Again, according to block 1204, the fine home position counter is incremented and the coast bit is checked according to block 1206. The coast bit is still not on, and then a determination is made according to block 1214 as to whether the change limit bit is on. The change limit bit has just previously been set; and, therefore, "counterclockwise" torque is then selected according to block 1222. This torque although labeled "counterclockwise" is actually, in every case in which the not first time through routine is effective, a torque in the direction tending to drive the rotor away from its home position. This is, therefore, in this particular case, actually a clockwise torque; and this results from the action of the clockwise driver control routine of FIG. 21 that follows. The change limit bit is then reset according to block 1224; the coast bit is set according to block 1236; and the fine home position counter is cleared according to block 1228. The program proceeds to the clockwise driver control routine of FIG. 21.

On the next counterclockwise encoder pulse, a return is again made back to the not first time through routine of FIG. 17. At this time, the fine home position counter, having been previously cleared (according to block 1228), is incremented according to block 1204 so that its count is again 1. The coast bit is now on, having been set according to block 1226; and, therefore, at this time counterclockwise torque is selected according to block 1208. The subroutine of block 1208 functions the same as that of block 1222 and causes a selection of the particular torque that is required to drive the rotor in a direction away from its home position and contrary to the direction in which it is moving. The switch limit is then checked according to block 1210, and this limit has been previously calculated as described. Once the switch limit has been reached, no torque is then selected according to block 1212, and the clockwise driver control routine of FIG. 21 is then re-entered. The subroutine of block 1212 results in the application of no torque onto the rotor in those places labeled "none" in FIG. 10.

Thus, in those places in which no torque should be applied onto the rotor, the switch limit is counted twice (in block 1208 and also in block 1222). The drivers are turned off, in order that there shall be no torque applied to the rotor, by means of the subroutines in blocks 1118, 1126, and 1130 of the clockwise driver control routine of FIG. 21. As is apparent from FIG. 10, no torque is selected in those cases in which the rotor 500R has previously oscillated just beyond an odd tenth degree such as +0.3°, and +0.5°. In the case of the +0.3 degree overshoot, the switch limit is counted at point 816a so that the fine home position counter counts 1 from +0.3° to +0.2° and then again counts 1 from +0.2° to +0.1°. Thereafter, no torque is effective on the rotor, from +0.1° to 0°. Likewise, when the overshoot is +0.5°, the fine home position counter counts to two from +0.5° to +0.3° and then again counts two from +0.3° to +0.1°. As the fine home position counter thus counts twice, first counterclockwise torque is applied to the rotor and then clockwise torque is applied, as above described.

Likewise, when the rotor overshoots by +0.4°, the fine home position counter counts two as the rotor moves from +0.4° to +0.2° and then again counts two as the rotor moves from +0.2° to 0°. Torque is therefore applied all the way to 0° so that there shall be a matching of the clockwise and counterclockwise torques. Similarly, when the overshoot initially is 0.6°, the fine home position counter makes a count of 3, as the rotor moves from +0.6° to +0.3° and then the fine home position counter makes another count of 3 as the rotor moves from +0.3° to 0°. Thus, in order to match the clockwise and counterclockwise torques, no torque is applied as the rotor nears its home position for initial overshoots of odd tenth degrees while torque is applied all the way to the 0° position of the rotor for even tenth degree initial overshoots.

In bringing the rotor 500R toward its home position, prior to the analog circuitry of FIGS. 7a and 7b taking control, rotor movement may be beyond the 0.1° position, and these may be considered special cases. If the rotor moves beyond a 0.3° position but less than 0.4°, in this case, at the 0.3° decision point (the point at which the first emitter pulse is provided after the rotor has reversed direction) a second driver, as well as a first driver, must be turned on. Thus, between points 816a and 816b in FIG. 10, for example, both drivers are fully on. For other cases with greater initial rotor overshoots, at the decision point no substantial changes are made, with the driver that has been on being allowed to remain on. The fine home position counter is set to 1 before counting is started, and this is done at the decision point — waiting until the point 816b would obviously be too late if both drivers are supposed to be on at the same time. As will be recalled, the low order bits of the switch limit are checked in block 1198 of FIG. 16 to determine if they are 1, and the high order switch limit bits are checked in block 1200 to determine if they are 0. If both blocks 1198 and 1200 are satisfied, the overshoot has been by 0.3°, so the switch limit is 1. Both torques are then selected, and the change limit bit is set according to block 1188. These subroutines have the effect of turning on both torques at the time (the decision point) of calculating the switch limit. This special case is the reason for the existence of the subroutines of blocks 1198 and 1200.

If the overshoot is by 0.2° (but less than 0.3°), in this case the subroutine of block 1176 is effective. If the low order 2 bits of the fine home position counter equals 1 and 0 (or a count of Arabic 2), the high order bits are checked according to block 1180; and the overshoot was by just 0.2° rather than more. Under these conditions, the 2 bit is then set according to block 1182. This is a special case, since, under these conditions the restoring torque is on. Similarly, if the overshoot is 0.3° the switch limit is set to some predetermine value (depending on the amount of overshoot) according to block 1182. Again, both torques are selected and the change limit bit is set according to block 1188. Thereupon, the same action takes place as if the overshoot was by 0.2°.

Another special case is when the overshoot is by 0.1° but less than 0.2°. In this case, the subroutine of block 1172 is effective, and then the high order bits of the fine home position counter are checked to determine if they are 0 in accordance with block 1174. No torque is selected in accordance with block 1178 under these conditions, and then the rest of the FIG. 16 routine is passed through but has no substantial effect on the operations.

The same basic principles of operation with respect to the application of the two opposing torques, apply for the cases of an overshoot of more than 0.4° as for the case of 0.3° overshoot; and some of these cases are illustrated in FIG. 10.

It will now be assumed that the rotor 500R has again overshot and has passed through its home position (for the second time and moving in the counterclockwise direction). At this time, the content of the slew counter changes from zero to all ones's or hexadecimal FF. Under these conditions, the subroutine of block 1052 (FIG. 13) is effective; and, since the rotor is traveling in the counterclockwise direction, the clockwise bit is not on. Therefore, from the subroutine of block 1052, a branch is made to the decrement routine of FIG. 19 by means of the subroutines of blocks 1058 and 1060.

In the FIG. 19 routine, the slew and master position counters are decremented, and the boundary counters are updated, as before. A return is then made to the fine home counterclockwise routine of FIG. 20 by means of entry block 1286. Then, a check is made according to block 1242 of the content of the slew counter, and, in this case, the content of the slew counter does equal hexadecimal FF. The subroutines of blocks 1250, 1642, 1252, 1254, 1256, 1258 and 1260 are then carried out. In particular, the fine home position counter is reset according to block 1250 of FIG. 20 and the digital mode bit (bit 5 of register 02) is reset according to block 1642. The resetting of the digital mode bit in block 1642 indicates that the digital mode of operation is complete, and control of the driver torque is transferred to the analog circuitry of FIGS. 7a and 7b through an external input to the microprogram controller of FIG. 11. The analog circuit of FIGS. 7a and 7b then functions to regulate the current through the stator coils 504, 510 and 512 by means of the drivers 714a, 714b and 714c the same as has been previously described in connection with the circuitry of FIGS. 3a to 3f.

As has been previously described, the first time that the rotor passes through its desired or home position, the analog hold bit is reset according to block 1628 (see FIG. 18). The analog hold bit functions in connection with the track and hold circuitry 1450 to switch the logic 1450 to its hold condition, in effect providing a plus signal onto the input lead 1414, causing the output on line 1462 to stay at the particular level of voltage that the input line 1460 had at the particular time that a change was made from − to + on the lead 1414. The analog hold bit, incidentally, is set by means of the subroutine in block 1600 (FIG. 13) just prior to going into slew mode.

Although the analog circuitry of FIGS. 7a and 7b is effective, exclusive of the digital circuitry, nevertheless it is necessary that the circuitry keep itself informed as to the position of the rotor during analog fine home mode so that the proper drivers can be energized and so that a subsequent move by the rotor 500R may be accurately made to another home position. A move to a second home position after reaching a first home position is under the control of a move bit which is checked according to block 1040 of the FIG. 13 initialization routine. Maintaining the various counters up-to-date with respect to present rotor positions is done particularly by the subroutine in block 1038 of FIG. 13 and the following subroutines.

When the system is in analog fine mode control due to a resetting of the digital mode bit according to block 1642 (FIG. 20), counterclockwise torque is selected in accordance with block 1256, since the rotor has crossed its home position going in the counterclockwise direction. The program then proceeds to the clockwise driver control routine of FIG. 21 through block 1094 and blocks 1262, 1264 and 1266. The latter subroutines prepare the external machine, such as the punch, for action. The program then proceeds through the FIG. 21 routine as before and passes to the test bit routine through block 1062. The overspeed condition does not occur in fine home mode (see block 1032), and the next pertinent operation is a test for any input bit in accordance with block 1038. If it is assumed that the rotor has not rotated far enough from its home position in the minus direction to produce an input bit from the encoder 526, then a check is made in accordance with block 1040 for a move bit, but this move bit is not on at this time. Punching has not yet been completed, so therefore the move bit cannot be on at this time. Then, the program enters the subroutine of block 1606, and at this time the program is in analog fine home mode and the program proceeds to block 1608 and subsequent blocks. It will be recalled that in digital fine home mode, idling occurred between blocks 1038, 1040 and 1606; however, at this time the change from digital to analog mode has been made so that this idling condition does not occur.

According to block 1608, an inquiry is made as to whether the analog controller of FIGS. 7a and 7b required counterclockwise or clockwise torque the last time that the program passed through block 1608 and subsequent blocks. If clockwise torque was required by the microcontroller previously, the last time through, the program would proceed to block 1612 while if counterclockwise torque was required by the microcontroller, the program would proceed to block 1620. Every time that the analog circuitry requests a new direction of rotor rotation, a bit is set to remember, and this bit is checked by means of subroutine 1608 to determine if this bit is on or off. An on condition of this bit indicates clockwise direction.

In the event that clockwise torque was requested by the analog circuitry of FIGS. 7a and 7b just previously, then an inquiry is made as to whether clockwise or counterclockwise torque is requested now, at this passage of the program through block 1608 and subsequent blocks. According to the subroutine in block 1610, the bit actually coming from the analog controller of FIGS. 7a and 7b is checked. This is bit 6 of register 30. Then, the fact that the analog controller of FIGS. 7a and 7b has requested a present clockwise rotation is remembered in accordance with block 1612. The program then proceeds from block 1612 to block 1038; and, assuming that the rotor 500R is still between 0° and −0.1° positions, the program will idle, with passages being made through blocks 1606, 1608, 1610, and 1612 back to block 1038.

As another condition, if it is assumed at this point that clockwise torque was requested the last time and that counterclockwise torque is now requested, at the present passage of the program through block 1610, then the program passes to block 1614. This indicates that the polarity of line 1438 from the analog controller of FIGS. 7a and 7b has changed levels and that a different driver must be energized, instead of maintaining the same driver energized as would be the case with the program passing through block 1612 as previously described. Thus, according to block 1614, counterclockwise torque is selected, and according to block 1612, the system remembers that counterclockwise torque was just requested. Then the driver bits are loaded, the program passing through the LDB (load driver bits) entry block 1618 to the clockwise driver control routine of FIG. 21. The FIGS. 21 routine functions as previously described, and then the program passes back to the test bit routine of FIG. 13 through entry block 1062.

Blocks 1620, 1624, 1626 and 1622 respectively correspond with the blocks 1610, 1612, 1614 and 1616, except that the operation is reversed, being for counterclockwise torque requested instead of clockwise torque. If the counterclockwise torque was previously requested and is still requested, then an idling condition takes place through blocks 1038, 1040, 1606, 1608, 1620 and 1622. On the other hand, if counterclockwise torque was previously requested but clockwise torque is now requested, the driver bits are loaded in accordance with blocks 1624, 1626 and 1618, passing to the FIG. 21 routine.

Thus, whenever pulses from the encoder 526 are not being received, the program is constantly checking the digital output bit from the analog controller of FIGS. 7a and 7b, indicating the direction in which the controller of FIGS. 7a and 7b desires torque. For each of the idling conditions, as has been explained, a test is made by means of the subroutine of block 1038 for any input bits from the digital encoder 526, and it is a usual occurrence that such bits shall occur particularly for the reason that the rotor overshoots the −0.1° position traveling in the counterclockwise direction in analog fine mode control. The first input bits would be a counterclockwise input bit and subsequent ones may be expected to be clockwise bits. These input bits will result in the proper updating of the boundary counter and master position counter and the other counters used by the program.

The receipt of an input bit from the digital encoder 526 causes the program to proceed to block 1052 to determine the direction of the input bit, clockwise or counterclockwise. If the bit is counterclockwise, a branch is made to the decrement routine through blocks 1058 and 1060. The decrement routine of FIG. 19 functions the same as has been previously described, with the slew counter and master position counter being decremented and with the boundary counter being checked. Then the program proceeds to the fine home mode counterclockwise routine through block 1286 and to blocks 1236 and 1638 of FIG. 20. The program is in analog mode, and therefore, the program proceeds through the block 1634 to the clockwise driver control routine of FIG. 21 which results in an expeditious passage to the test bit routine without calculating switch limits, etc., not required under the present conditions. This entry into the FIG. 21 routine is the same as in the idling routine utilizing the LDB entry blocks and results in a loading of the driver bits as in the idling routine. The boundary counter having been updated, results in a loading of the proper driver bits. In the test bit routine of FIG. 13, entered at this time by means of the entry block 1062 from FIG. 21, the move bit is still checked by means of block 1040, so that if there is a move bit, the analog hold bit it checked in accordance with block 1600, and the program operates again in slew mode.

If the input bit is clockwise, the program proceeds to the increment routine by means of block 1054, which is similar to the decrement routine and which has previously been described.

Figure 12:
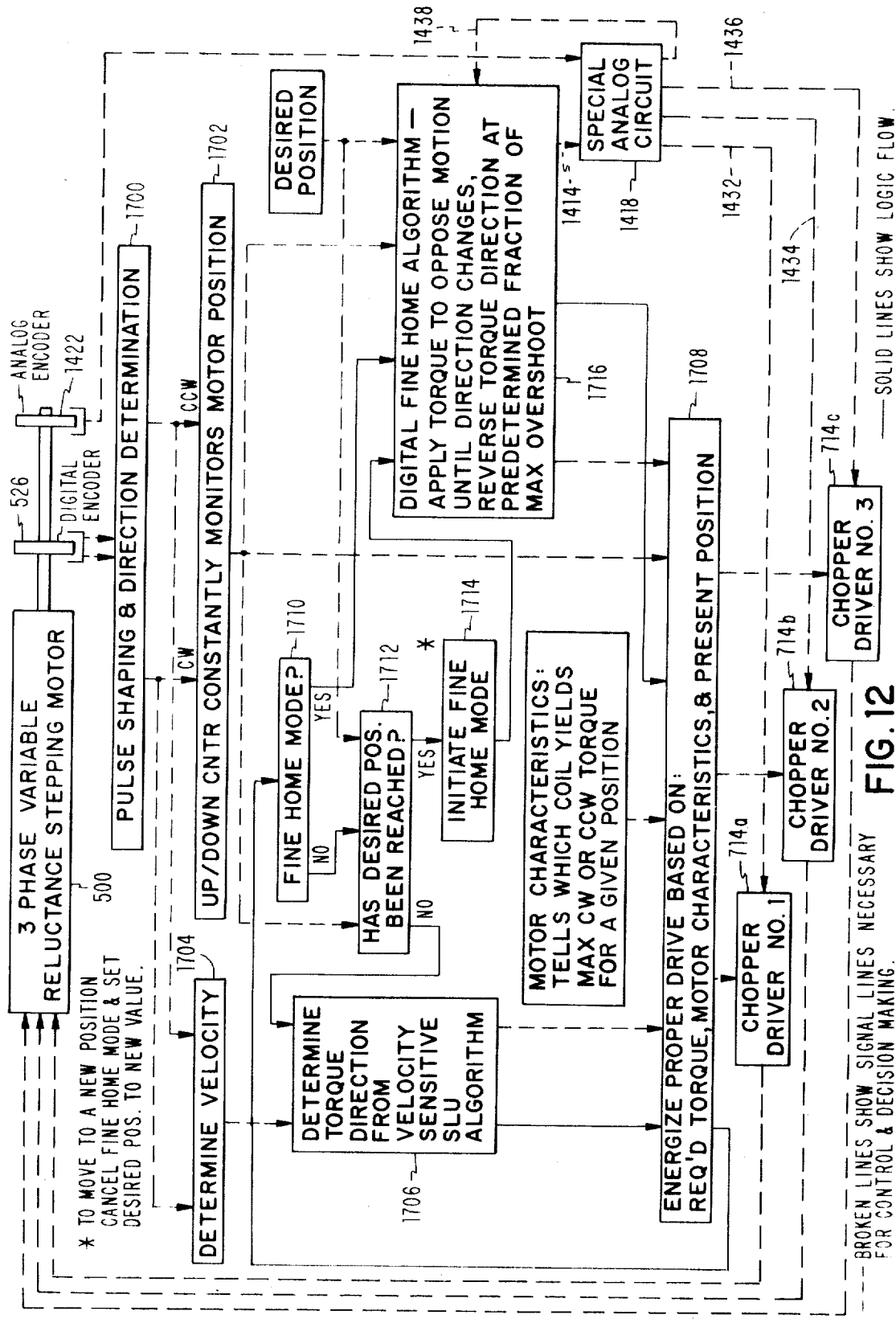
FIG. 12 is a diagram showing the manner in which a program usable with the microcontrol unit may function to cause a movement of the rotor of the stepping motor to a home position from an initial position.

The microprogram and its operations are shown briefly in FIG. 12. The motor 500 is shown as driving the digital encoder 526 and the analog encoder 1422.

The analog encoder 1422 directly controls the analog circuit 1418, and this in turn controls the chopper drivers 714a, 714b and 714c. Incidentally, in this figure, the solid lines show logic flow, while the broken lines show signal lines necessary for control and decision making. The digital encoder 526 controls pulse shaping and direction determination 1700, and an up/down counter shown in block 1702 constantly monitors the position of the rotor. The velocity of the rotor is determined in accordance with block 1704, and the torque direction is determined from a velocity sensitive slew algorithm as in block 1706. The proper driver is energized, based on the required torque, the motor characteristics (number of poles, etc.) and the present position of the rotor as indicated by block 1708. A determination is made according to block 1710 whether the rotor is being driven in fine home mode and if not, a determination is made according to block 1712 whether the desired position of the rotor has been reached. If not, the slew algorithm mentioned in block 1706 is effective. If the desired position has been reached, then the fine home mode is initiated as shown by block 1714. Thereupon, the digital fine home algorithm is effective as shown by block 1716 which applies torque to oppose the motion of the rotor until the direction of motion of the rotor changes. Also, the torque direction is reversed at a predetermined fraction of the maximum overshoot, subsequent to the rotor passing through its home position after slew mode has terminated. The analog circuit 1418 is made effective after termination of the digital fine home mode.

The manner in which the microprogram brings the rotor 500R to its final position substantially at 0°, which is the essence of the invention, is believed quite well illustrated in FIGS. 13 to 22. A number of methods may be used to start the rotor 500R in operation, after it has once settled at rest as the result of a previous incremental movement. Although this is not particularly illustrated in these figures, a good understanding of the manner in which this may be accomplished may be had from the description now to be given.

Under these conditions, all of the drivers are off, and there will be no emitter or input bits. The machine being controlled, such as a punching machine, provides a move bit; and the existence of this bit is determined by the subroutine of block 1040 (FIG. 13). When the move bit is on, with the accomplishment of the operation of the punching or other machine, clockwise motion is selected in accordance with block 1602. In accordance with step 104 (Table C), the driver control select bit is set for clockwise motion (this being bit 5 of register 8 which is set to a logical 1 value). No drivers are turned on at this point. Then, in accordance with block 1044, the status bits and registers are set for slew operation. The slew float bit is then set at a logical 1 value, since the system is about to go into slew mode; and register 04, which contains status bits for fine mode, is completely reset. In addition, the move bit is reset; and, therefore, the next time that the program proceeds through block 1040, the move bit will not be on as questioned by subroutine 1040.

The direction of the incoming bit from the encoder is then determined according to block 1046; and, since there was no incoming bit, the program proceeds through the "Act 2" block 1050 to the block 1240 (FIG. 20). Normally the rotor 500R has no motion at this time, but since conceivably the punching or other machine may give the document card a slight motion, the check of direction by means of block 1046 is made. The entry blocks 1048 and 1050, incidentally, both result in clockwise torque on the rotor.

As will be noted, block 1240 is labeled "apply restoring torque," and this title is logical for a float condition in fine home mode which has been previously described. Actually, steps 411 to 415 in Table H forming the foundation for block 1240 include additional instructions for the starting condition as will now be discussed. In these steps, first a check is made to determine if the direction bit shows clockwise movement. The direction bit in this case is bit 7 of register 04 and indicates the direction of the rotor when the desired position was last crossed. All of the bits in register 04 have just been reset so, therefore, the bit does not slow clockwise movement. The effect of these steps is thus to determine whether the rotor is on the clockwise side of its home position. In this case, the rotor is rather on the counterclockwise of the desired position, since clockwise movement of the rotor is necessary for the rotor to be on the clockwise side of home position, and such movement has not yet assumed. Then clockwise torque is selected in accordance with these steps, and bit 6 of register 03 is thus turned on. The counterclockwise driver control routine of FIG. 22 is then entered by means of block 1148; and according to block 1288, the bits 6 and 7 of register 3 are checked. Clockwise torque has been selected, and bit 6 of register 3 is on under these conditions. In this case, driver information is obtained out of main store module 0 which contains clockwise driver control information. Therefore, the proper driver for clockwise torque will be turned on under these conditions. The FIG. 22 routine is exited, and return is made to the FIG. 13 routine with the system waiting for encoder bits to be received. When an input encoder bit is received, the program proceeds in slew mode through block 1052, etc. as previously described.

When the machine is put into operation for the first time, as contrasted to the condition in which there have been previous incremental movements of the rotor 500R, the start button of the machine is depressed, raising the start bit. Then the program proceeds to block 1038 to await the reception of an input or encoder bit. After that, the operation is as previously described.

Advantageously, both embodiments of the invention utilize a bang-bang algorithm for initially putting the rotor 500R of the motor 500 in the immediate vicinity of the desired or home position of the rotor. The analog circuit 1418 is then effective for taking over control of the rotor and for accurately positioning the rotor with respect to its home position.

What is claimed is:

1. In combination,
an electric motor of the stepping type having a stator with a set of discrete poles and a rotor having a set of discrete poles with electrical windings on one of said sets of poles so that said rotor has a plurality of natural detent positions in which said rotor poles are aligned with poles of said stator or are between poles of said stator in a symmetrical relationship therewith when various of said windings are energized, means for energizing said windings to apply torque on said rotor in a foreward direction when supplied with a forward energization signal, means for energizing said windings to apply torque on said rotor in a reverse direction when supplied with a reverse energization signal, a first emitter driven by said rotor effective to produce output pulses as said rotor moves through successive increments each of Z° after passing through its desired or home position in the forward direction and producing the same output pulses at the same rotor positions as the rotor moves back in the reverse direction, a second emitter driven by said rotor effective to produce a gradually changing output signal as the rotor rotates having nodes which are substantially farther apart than Z° with rotor rotation, a first control means under the control of the output pulses of said first emitter for providing said reverse energization signal so as to thereby apply torque on said rotor in the reverse direction with constant average currents in said windings when said rotor passes through its home position moving in the forward direction until the point of maximum oscillation of the rotor and the control means including counting means under the control of the output pulses of said first emitter so as to maintain the reverse energization signal and the corresponding constant average currents in said windings producing reverse rotor torque until the rotor returns to a reverse torque termination point which is between said point of maximum oscillation and said home position, said first control means including means effective under the action of said counting means at a forward torque initiating point of rotor rotation lying between said point of maximum oscillation of the rotor and said home position for providing said forward energization signal and thereby applying torque on said rotor in the forward direction with corresponding constant average currents in said windings as said rotor is moving back in the reverse direction from said point of maximum oscillation toward home position.

second control means under the control of the gradually changing output signal of said second emitter effective to modulate the currents in said windings while said forward energization signal is applied so as to provide a forward torque on said rotor tending to move the rotor to its home position with said currents in the windings being so modulated that they are greater for greater spacing of said rotor with respect to its home position and are less as the rotor is closer to its home position, and means for switching from said first control means to said second control means under the action of said counting means when said rotor is closer to its said home position than said forward torque initiating point of rotor rotation.

2. The combination as set forth in claim 1, said counting means being so effective on said switching means that said switching means are responsive to a second crossing of said home position by said rotor as it travels in the reverse direction from its point of maximum oscillation so that said second control means is then effective to provide modulated currents through said windings under the control of said second emitter.

3. The combination as set forth in claim 1, said counting means including a master position counter responsive to the pulses from said first emitter for keeping track of the position of said rotor as it rotates,
a desired position register having a count therein indicative of said home position,
means for comparing the content of said master position counter and said desired position register so as to produce a match signal when the content of the counter and register are the same, and
means responsive to said match signal on the first crossing of said home position by said rotor travelling in the forward direction to render said first control means effective for energizing said windings to produce a reverse torque on the rotor after it initially crosses its home position travelling in the forward direction, said switching means being responsive also to said match signal when said rotor again crosses its home position travelling in the reverse direction for rendering said second control means effective for modulating the current through said windings as aforesaid.

4. The combination as set forth in claim 1, said second control means including a track and hold circuit maintaining an output which corresponds with the output of said second emitter at the time said rotor initially crosses its home position, and means for controlling the amount of current through said windings based on the difference between the output of said second emitter and the output of said track and hold circuit for thereby modulating the current through said windings as aforesaid.

5. The combination as set forth in claim 4, said means for controlling the amount of current through said windings based on the difference between the outputs of said second emitter and said track and hold circuit including a differential amplifier having the output signal from said second emitter and the output signal from said track and hold circuit impressed thereon.

6. The combination as set forth in claim 5, and including a variable current source modulator having the output of said differential amplifier impressed on it and effective for controlling the amount of current through said windings based on the difference between the outputs of said second emitter and said track and hold circuit.

* * * * *

PO-1050
(5/69)

UNITED STATES PATENT OFFICE
CERTIFICATE OF CORRECTION

Patent No. 3,845,378                Dated Oct. 29, 1974

Inventor(s) Kenneth E. Hendrickson; Steven D. Keidl; Warren A. Lopour; Larry F. Mattson and Lawrence P. Segar It is certified that error appears in the above-identified patent and that said Letters Patent are hereby corrected as shown below:

Larry F. Mattson and Lawrence P. Segar were omitted as inventors and should be added.

Column 4, line 2, after "506c" insert --and--.
          line 27, "523" should read --532--.
          line 40, delete "remains" and insert --of--.
Column 5, line 49, "524" should read --624--.
Column 8, line 63, after "is" insert an --a--.
Column 9, line 9, "FIgS." should read --FIGS.--.
Column 12, line 38, second occurrence, "the" should read --and--.
           line 66, "726" should read --736--.
Column 15, line 41, "passes" should read --passed--.
Column 16, line 44, "puls" should read --plus--.
Column 17, line 46, "1" should be omitted.
Column 19, line 53, "moned" should read --moved--.
Column 21, line 13, "54" should read --504--.
Column 22, line 8, "vide" should read --vided--.
           line 14, "outer" should read --other--.
           line 23, "914" should read --904--.
           line 62, "to" should be omitted.
Column 23, line 35, "0000" should read --ØØØØ--.
           line 49, "0000" should read --ØØØØ--.
Column 24, line 20, "throough" should read --through--.
Column 47, line 15, "value" should read --values--.
Column 48, line 30, "change" should read --changed--.
           line 54, "roation" should read --rotation--.
           line 57, "instruction" should read --instructions--.
Column 49, line 5, "ritht" should read --right--.
           line 6, "which" should read --while--.
           line 39, "coundary" should read --boundary--.
           line 67, "thu" should read --the--.
Column 50, line 25, "resepctively" should read --respectively--.

(continued on page 2)

PO-1050
(5/69)

UNITED STATES PATENT OFFICE
CERTIFICATE OF CORRECTION

Patent No. 3,845,378            Dated  Oct. 29, 1974

Inventor(s) Kenneth E. Hendrickson; Steven D. Keidl; Warren A. Lopour; Larry F. Mattson and Lawrence P. Segar It is certified that error appears in the above-identified patent and that said Letters Patent are hereby corrected as shown below:

PAGE 2 CONTINUED

Column 52, line 1, delete "0", first occurrence.
          line 1, delete "NOOP" and insert --NO OP--.
          line 20, "tle" should read --the--.
Column 54, line 17, "If" should read --In--.
Column 55, line 63, "dirver" should read --driver--.
Column 57, line 24, "this" should read --thus--.
          line 28, "euqual" should read --equal--.
Column 58, line 27, "Of", first occurrence, should read --If--.
Column 61, line 67, "athe" should read --the--.
Column 67, line 23, "nd" should read --and--.
Column 68, line 42, "swithc" should read --switch--.
Column 73, line 58, "it" should read --is--.

Signed and sealed this 11th day of February 1975.

(SEAL)
Attest:

RUTH C. MASON
Attesting Officer

C. MARSHALL DANN
Commissioner of Patents
and Trademarks